(12) United States Patent
Thimbleby

(10) Patent No.: US 10,089,056 B2
(45) Date of Patent: *Oct. 2, 2018

(54) DEVICE, METHOD, AND GRAPHICAL USER INTERFACE FOR COLLABORATIVE EDITING IN DOCUMENTS

(71) Applicant: Apple Inc., Cupertino, CA (US)

(72) Inventor: William J. Thimbleby, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 14/871,950

(22) Filed: Sep. 30, 2015

(65) Prior Publication Data
US 2016/0357496 A1 Dec. 8, 2016

Related U.S. Application Data

(63) Continuation of application No. 14/871,623, filed on Sep. 30, 2015.
(Continued)

(51) Int. Cl.
G06F 17/24 (2006.01)
G06F 3/0484 (2013.01)
(Continued)

(52) U.S. Cl.
CPC .......... *G06F 3/1454* (2013.01); *G06F 3/0481* (2013.01); *G06F 3/0484* (2013.01);
(Continued)

(58) Field of Classification Search
CPC ..... G06F 17/24; G06F 11/206; H04L 65/4015
See application file for complete search history.

(56) References Cited

U.S. PATENT DOCUMENTS 7,756,806 B1  7/2010 Heidenreich et al.
8,539,385 B2  9/2013 Capela et al.
(Continued)

OTHER PUBLICATIONS

Notice of Allowance, dated Sep. 22, 2017, received in U.S. Appl. No. 14/871,904, 7 pages.

*Primary Examiner* — William L Bashore
*Assistant Examiner* — Daniel W Parcher
(74) *Attorney, Agent, or Firm* — Morgan, Lewis & Bockius LLP

(57) ABSTRACT

A first electronic device maintains a directed acyclic graph to represent content collaboratively edited by the first device and one or more second devices of multiple collaborating devices. The first device receives one or more editing inputs from one or more devices of the multiple collaborating devices. The first device modifies the directed acyclic graph based on relationships between the editing inputs and existing content objects embodied in the directed acyclic graph, traverses the directed acyclic graph in accordance with a predetermined ordering rule to obtain an object sequence, and, if a first editing input of the one or more editing inputs modifies a first existing sketch content object represented in the directed acyclic graph, updates a command sequence associated with the first existing sketch content object by merging each individual drawing command included the first editing input with a command sequence associated with the first existing sketch content object.

28 Claims, 48 Drawing Sheets

Related U.S. Application Data

(60) Provisional application No. 62/172,225, filed on Jun. 7, 2015.

(51) Int. Cl.

| | |
|---|---|
| *G06F 3/0481* | (2013.01) |
| *G09G 5/12* | (2006.01) |
| *G06F 3/0488* | (2013.01) |
| *G09G 5/14* | (2006.01) |
| *G06F 8/34* | (2018.01) |
| *G06Q 10/06* | (2012.01) |
| *G06F 3/14* | (2006.01) |
| *G06T 11/20* | (2006.01) |
| *G06F 17/22* | (2006.01) |
| *H04L 29/06* | (2006.01) |
| *H04L 12/26* | (2006.01) |
| *G09G 5/02* | (2006.01) |

(52) U.S. Cl.
CPC ........ *G06F 3/0488* (2013.01); *G06F 3/1423* (2013.01); *G06F 8/34* (2013.01); *G06F 17/2288* (2013.01); *G06F 17/24* (2013.01); *G06Q 10/06* (2013.01); *G06T 11/203* (2013.01); *G06T 11/206* (2013.01); *G09G 5/026* (2013.01); *G09G 5/12* (2013.01); *G09G 5/14* (2013.01); *H04L 43/045* (2013.01); *H04L 65/4015* (2013.01); *G06T 2200/24* (2013.01); *G09G 2370/10* (2013.01); *G09G 2370/16* (2013.01)

(56) References Cited

U.S. PATENT DOCUMENTS

| | | | |
|---|---|---|---|
| 8,593,488 | B1 | 11/2013 | Thimbleby |
| 8,612,884 | B2 | 12/2013 | Capela et al. |
| 8,972,879 | B2 | 3/2015 | Migos et al. |
| 9,098,182 | B2 | 8/2015 | Migos et al. |
| 9,292,261 | B1* | 3/2016 | Bouldin .............. G06F 8/20 |
| 9,292,482 | B1* | 3/2016 | Thiesen ............. G06F 17/24 |
| 9,396,581 | B2 | 7/2016 | Thimbleby et al. |
| 9,729,589 | B2 | 8/2017 | Offenhartz |
| 2004/0230447 | A1 | 11/2004 | Schwerin-Wenzel et al. |
| 2009/0157811 | A1* | 6/2009 | Bailor ............ G06F 17/30168 709/204 |
| 2011/0098982 | A1* | 4/2011 | Artur .................. G06F 17/50 703/1 |
| 2012/0317497 | A1* | 12/2012 | Red ..................... G06F 17/50 715/751 |
| 2013/0120368 | A1* | 5/2013 | Miller .................. G06T 15/00 345/419 |
| 2015/0154291 | A1 | 6/2015 | Shepherd et al. |
| 2016/0357377 | A1 | 12/2016 | Thimbleby |
| 2016/0357720 | A1 | 12/2016 | Thimbleby |
| 2017/0199750 | A1 | 7/2017 | Reuschel et al. |
| 2017/0220546 | A1 | 8/2017 | Codrington et al. |
| 2017/0224140 | A1 | 8/2017 | Vertegaal et al. |
| 2017/0230433 | A1 | 8/2017 | Carlos et al. |
| 2017/0249745 | A1 | 8/2017 | Fiala |
| 2017/0264706 | A1 | 9/2017 | Offenhartz |

* cited by examiner

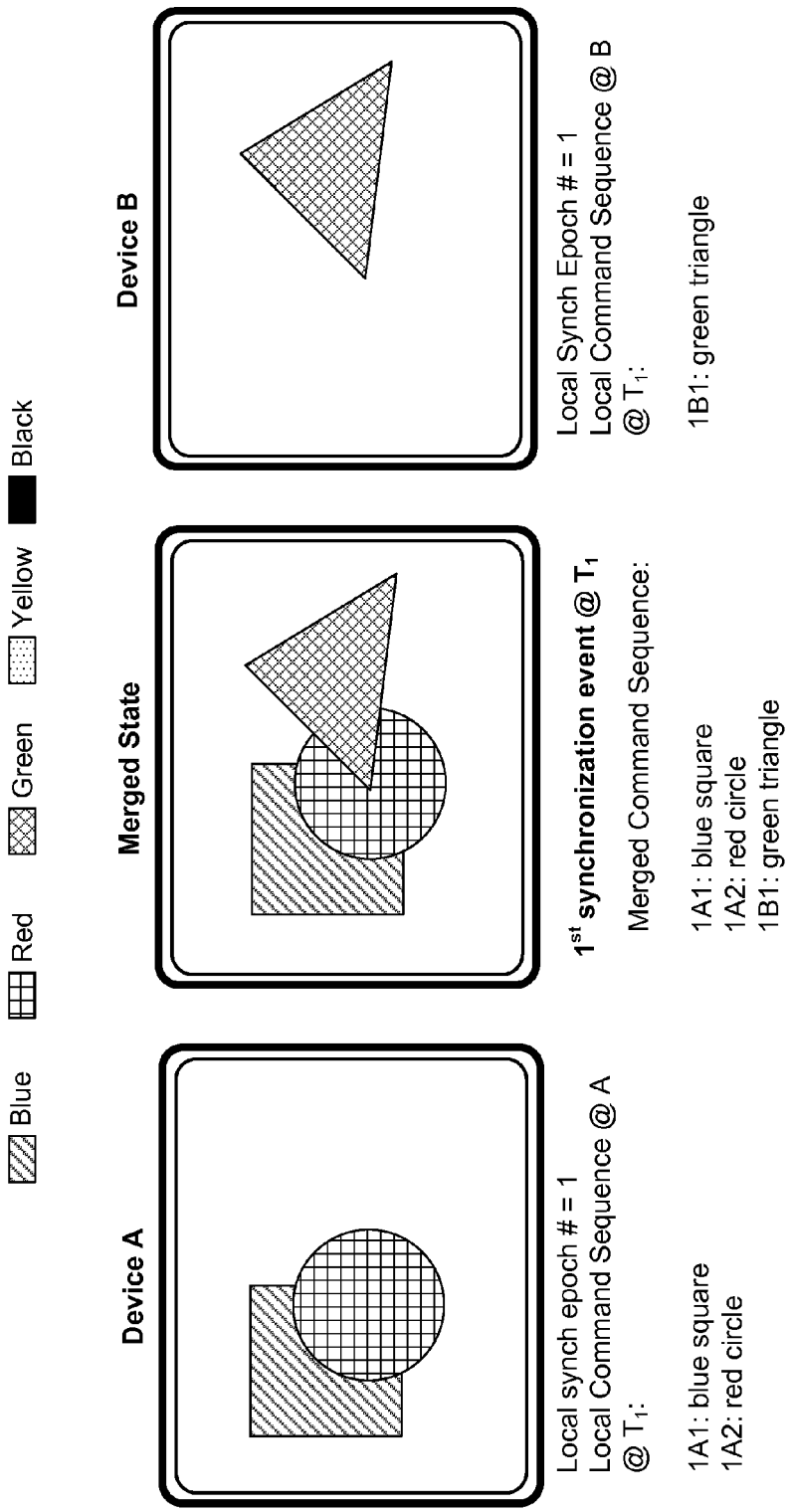

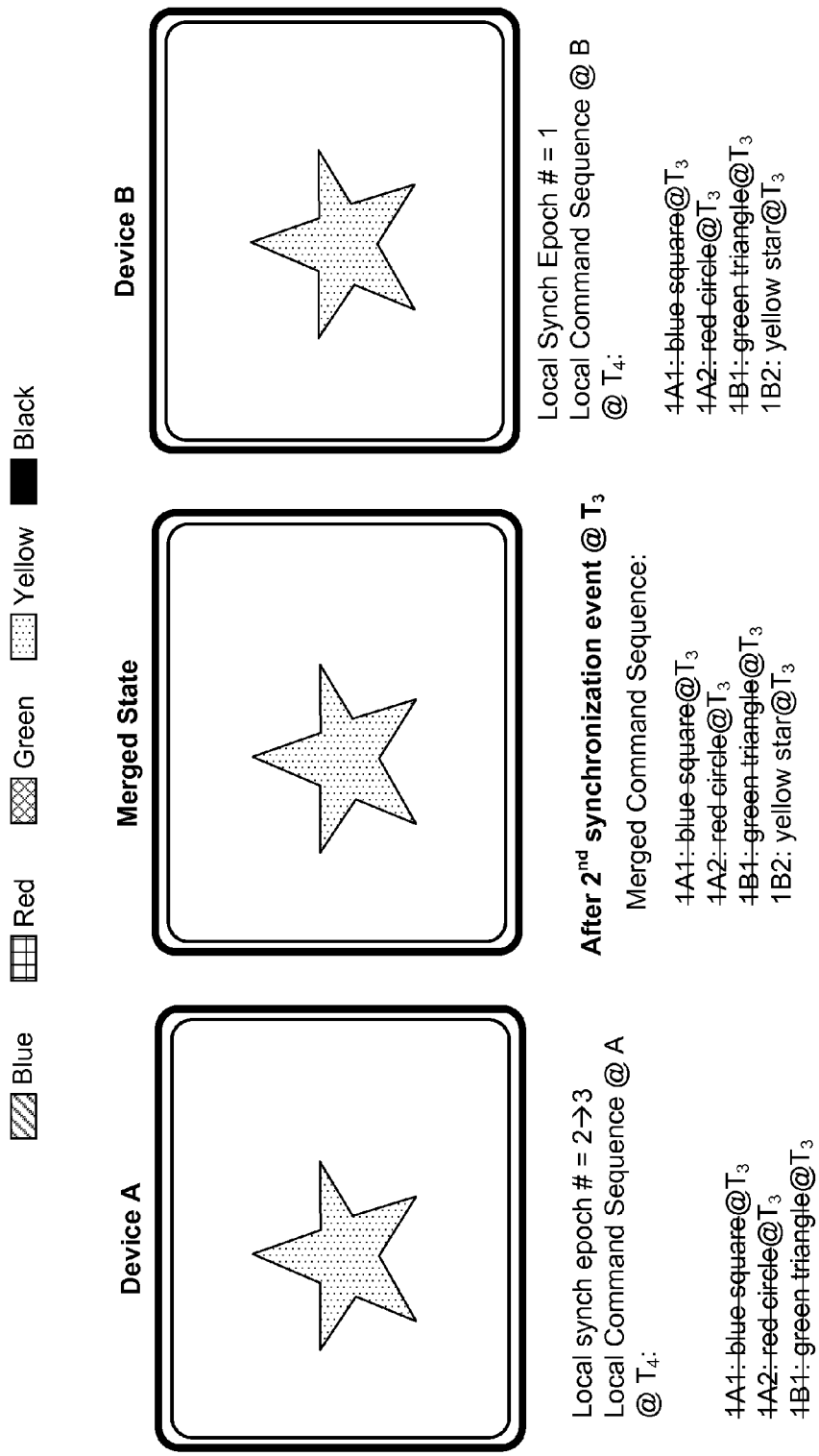

800

---

816
Topologically traversing the directed acyclic graph in accordance with the predetermined ordering rule to deterministically sort the plurality of nodes in the directed acyclic graph into the string sequence includes: sorting nodes from a starting node to an end node of the multiple parallel paths by traversing the multiple parallel paths in an order based on a comparison between respective lowest character sequence numbers present in each of the multiple parallel paths.

---

818
Maintaining a directed acyclic graph to represent a textual string concurrently edited by the first device and at least a second device of the multiple collaborating devices includes: creating the directed acyclic graph based on initial textual edits received locally at the first device and modifying the directed acyclic graph based on additional textual edits received from each of the multiple collaborating devices based on relative timing and relative locations of the additional textual edits to the initial textual edits.

820
Modifying the directed acyclic graph based on additional textual edits received from each of the multiple collaborating devices based on relative timing and relative locations of the additional textual edits to the initial textual edits includes: receiving concurrent insertion inputs between a first node and a second node in the directed acyclic graph from multiple ones of the multiple collaborating devices; and for each of the concurrent insertion inputs, creating a respective path from the first node to the second node in the directed acyclic graph to include one or more nodes representing the insertion input

822
Modifying the directed acyclic graph based on additional textual edits received from each of the multiple collaborating devices based on relative timing and relative locations of the additional textual edits to the initial textual edits includes: receiving a deletion input deleting a character represented by a respective node in the directed acyclic graph, and, in response to the deletion input, changing a status of the respective node for the character to "deleted." The respective node having the "deleted" status is omitted in the string sequence or skipped when the textual string is displayed at the first device in accordance with the string sequence.

818
Maintaining a directed acyclic graph to represent a textual string concurrently edited by the first device and at least a second device of the multiple collaborating devices includes: creating the directed acyclic graph based on initial textual edits received locally at the first device and modifying the directed acyclic graph based on additional textual edits received from each of the multiple collaborating devices based on relative timing and relative locations of the additional textual edits to the initial textual edits.

824
Modifying the directed acyclic graph based on additional textual edits received from each of the multiple collaborating devices based on relative timing and relative locations of the additional textual edits to the initial textual edits includes receiving an undo input restoring a deleted character represented by a respective node in the directed acyclic graph, wherein a status of the respective node is a "deleted" status; and, in response to the undo input, removing the "deleted" status from the respective node for the deleted character in the directed acyclic graph and updating a unique sequence number of the respective node for the deleted character in the directed acyclic graph based on a respective timestamp associated with the undo input.

826
Modifying the directed acyclic graph based on additional textual edits received from each of the multiple collaborating devices based on relative timing and relative locations of the additional textual edits to the initial textual edits includes: receiving a redo input re-deleting a previously un-deleted character represented by a respective node in the directed acyclic graph, wherein the status of the respective node is an "un-deleted" status; and in response to the redo input, changing the status of the respective node for the previously un-deleted character to a "re-deleted" status; and updating the unique sequence number of the respective node for the re-deleted character in the directed acyclic graph based on a respective timestamp associated with the redo input

818
Maintaining a directed acyclic graph to represent a textual string concurrently edited by the first device and at least a second device of the multiple collaborating devices includes: creating the directed acyclic graph based on initial textual edits received locally at the first device and modifying the directed acyclic graph based on additional textual edits received from each of the multiple collaborating devices based on relative timing and relative locations of the additional textual edits to the initial textual edits.

828
Modifying the directed acyclic graph based on additional textual edits received from each of the multiple collaborating devices based on relative timing and relative locations of the additional textual edits to the initial textual edits includes: receiving a style input changing a style of a character represented by a respective node in the directed acyclic graph; andin response to the style input, changing a style attribute of the respective node for the character in the directed acyclic graph. The style attribute includes a respective style and a respective timestamp associated with the style input.

830
Modifying the directed acyclic graph based on additional textual edits received from each of the multiple collaborating devices based on relative timing and relative locations of the additional textual edits to the initial textual edits includes: receiving concurrent style inputs changing a style of a character represented by a respective node in the directed acyclic graph, wherein the concurrent style inputs are associated with difference devices and timestamps, and in response to receiving the concurrent style inputs, changing a style attribute of the respective node for the character in the directed acyclic graph in accordance with the style input having the latest timestamp among the concurrent style inputs.

910
A last drawing command in the plurality of additional drawing commands was received first at a collaborating device other than the first device. Start a next local synchronization epoch at the first device, including: incrementing the primary local sequence number for a subsequent drawing command locally received at the first device; and restarting the secondary local sequence number for the subsequent drawing command locally received at the first device.

912
A last drawing command in the plurality of additional drawing commands was received first at a collaborating device other than the first device. Increment the secondary local sequence number for a subsequent drawing command locally received at the first device, while maintaining the primary local sequence number of a current local synchronization epoch for the subsequent drawing command locally received at the first device.

914
The plurality of additional drawing commands include an undo command directed to a respective past command in the command sequence. Updating the command sequence by merging and sorting the plurality of additional drawing commands and the plurality of past drawing commands includes merging the undo command with the respective past command in the command sequence by: identifying the corresponding past drawing command in the command sequence and changing a visibility attribute of the corresponding past drawing command in the command sequence to "invisible." The "invisible" attribute of the corresponding past drawing command causes said drawing command to be skipped during the re-rendering of the drawing.

916
After receiving the undo command, receive a redo command directed to the undo command

918
In response receiving the redo command, change the visibility attribute of the corresponding past drawing command in the command sequence to "visible." The "visible" attribute of the corresponding past drawing command causes said drawing command to be rendered in a next re-rendering of the drawing.

920
The plurality of additional drawing commands includes an "erase all" command. Merging the "erase all" command with the plurality of past drawing commands in the command sequence Includes: identifying all past drawing commands in the command sequence that were present at the first device before receipt of the "erase all" command and changing respective visibility attributes of the identified past drawing commands in the command sequence to "invisible." The respective "invisible" attributes of the identified past drawing commands cause said identified past drawing commands to be skipped during the re-rendering of the drawing.

922
For each change in a respective visibility status of a respective drawing command, updating a timestamp associated with the respective drawing command in accordance with a receipt time of a respective drawing command that triggered the change in the respective visibility status of the respective drawing command

924
Merging and sorting the plurality of additional drawing commands and the plurality of past drawing commands in accordance with the respective sequence numbers of the plurality of past drawing commands and the plurality of additional drawing commands further includes: comparing respective timestamps assigned to two or more conflicting drawing commands in the plurality of past drawing commands and the plurality of additional drawing commands; and selecting one of the two or more conflicting drawing commands for inclusion in the updated command sequence in lieu of the two or more conflicting drawing commands, wherein the selected drawing command has a latest timestamp among the respective timestamps assigned to the two or more conflicting drawing commands

926
The plurality of additional drawing commands include an erase command to erase one or more existing pixels in the drawing. Updating the command sequence by merging and sorting the plurality of additional drawing commands and the plurality of past drawing commands includes sorting the erase command against at least a first additional drawing command in the plurality of additional drawing commands based on the ordering rule. The sorting places the erase command after the first additional drawing in the updated command sequence. Re-rendering the drawing includes erasing at least some pixels that would have been drawn in accordance with the first additional drawing command

1002
Maintain a directed acyclic graph to represent content collaboratively edited by the first device and one or more second devices of the multiple collaborating devices. The directed acyclic graph includes a plurality of nodes each representing a respective content object that is created or edited by one or more of the multiple collaborating devices. Each node is connected to at least one neighboring node by a respective directed edge in accordance with a relative positional order of the respective content objects represented by the node and the at least one neighboring node. At least a first node of the plurality of nodes represents a textual content object and at least a second node of the plurality of nodes represents a sketch content object. Each node representing a corresponding sketch content object is associated with a respective command sequence used to create internal content of the corresponding sketch content object.

1004
During a respective synchronization period, receive one or more editing inputs from one or more devices of the multiple collaborating devices

1006
Modify the directed acyclic graph based on relationships between the editing inputs and existing content objects embodied in the directed acyclic graph

1008
Modifying the directed acyclic graph based on relationships between the editing inputs and existing content objects embodied in the directed acyclic graph includes: detecting that the one or more editing inputs include at least two concurrent insertion inputs between a first node and a second node in the directed acyclic graph from multiple ones of the multiple collaborating devices, and for each of the concurrent insertion inputs, creating a respective path from the first node to the second node in the directed acyclic graph to include one or more nodes represented in the insertion input.

1010
Modifying the directed acyclic graph based on relationships between the editing inputs and existing content objects embodied in the directed graph includes: detecting that the one or more editing inputs include a deletion input deleting a content object represented by a respective node in the directed acyclic graph; and, in response to the deletion input, changing a status of the respective node for the object to "deleted." The respective node having the "deleted" status is omitted during display rendering of the content based on the modified directed acyclic graph.

1028
Each node in the directed acyclic graph includes a unique object sequence number for the respective content object associated with the node. The unique object sequence number includes (1) a unique device identifier for a respective device at which the respective content object was first created, and (2) a local sequence number assigned to the respective content object in accordance with a local order by which the respective content object was first created at said respective device.

1030
For each node representing a sketch content object, the node is associated with a sequence of one or more drawing commands directed to the sketch content object. Each of the one or more drawing commands has a respective command sequence number, and the respective command sequence number includes (1) a device identifier for a device at which the drawing command was first received, (2) a primary local sequence number representing a local synchronization epoch during which the drawing command was first received, and (3) a secondary local sequence number representing an order of the drawing command within the local synchronization epoch.

1032
Topologically traverse the directed acyclic graph in accordance with a predetermined ordering rule to deterministically sort the plurality of nodes in the directed acyclic graph into an object sequence

1034
Topologically traversing the directed acyclic graph in accordance with the predetermined ordering rule to deterministically sort the plurality of nodes in the directed acyclic graph into the object sequence includes sorting nodes between a starting node to an end node of a set of multiple parallel paths by traversing the set of multiple parallel paths in an order based on a comparison between respective lowest object sequence numbers present in each of the set of multiple parallel paths.

1036
The predetermined ordering rule specifies a fixed order between the unique device numbers of the multiple collaborating devices, and affords a higher significance to the unique device numbers than the local sequence numbers when comparing unique object sequence numbers.

1038
Render the content in accordance with the deterministically obtained object sequence for display at the first device.

In accordance with a determination that a first editing input of the one or more editing inputs modifies the first existing sketch content object represented in the directed acyclic graph, updating the command sequence associated with the first existing sketch content object by merging each individual drawing command included the first editing input with the command sequence associated with the first existing sketch content object includes: merging and sorting each individual drawing command and one or more past drawing commands in the command sequence in accordance with an ordering rule based on respective command sequence numbers of the one or more past drawing commands and said each individual drawing command  The ordering rule gives more significance to the primary local sequence number than the device identifier, and gives more significance to the device identifier than to the secondary local sequence number when comparing command sequence numbers.

---

1042

In accordance with a determination that a first editing input of the one or more editing inputs modifies the first existing sketch content object represented in the directed acyclic graph, updating the command sequence associated with the first existing sketch content object by merging each individual drawing command included the first editing input with the command sequence associated with the first existing sketch content object includes: detecting that the first editing input is an undo command directed to a respective past drawing command in the command sequence; and changing a visibility attribute of the respective past drawing command in the command sequence to "invisible." The "invisible" attribute of the respective past drawing command causes said past drawing command to be skipped during a re-rendering of the existing first sketch content object at the first device.

1044
Receive a redo command directed to the undo command in a later synchronization period

1046
In response receiving the redo command, change the visibility attribute of the respective past drawing command in the command sequence to "visible." The "visible" attribute of the respective past drawing command causes said past drawing command to be rendered in a next re-rendering of the existing first sketch object associated with the later synchronization period.

1048
In accordance with a determination that a first editing input of the one or more editing inputs modifies the first existing sketch content object represented in the directed acyclic graph, updating the command sequence associated with the first existing sketch content object by merging each individual drawing command included the first editing input with the command sequence associated with the first existing sketch content object includes: detecting that the first editing input is an "erase all" command, identifying all past drawing commands in the command sequence that were present at the first device before receipt of the "erase all" command, and changing respective visibility attributes of the identified past drawing commands in the command sequence to "invisible." The respective "invisible" attributes of the identified past drawing commands cause said identified past drawing commands to be skipped during a re-rendering of the first existing sketch content object

---

1050
In accordance with a determination that a first editing input of the one or more editing inputs modifies the first existing sketch content object represented in the directed acyclic graph, updating the command sequence associated with the first existing sketch content object by merging each individual drawing command included the first editing input with the command sequence associated with the first existing sketch content object includes: detecting that the first editing input is an erase command to erase one or more existing pixels in the first existing sketch content object and sorting the erase command against at least a first additional drawing command in the editing inputs based on the ordering rule. The sorting places the erase command after the first additional drawing in the updated command sequence. Re-rendering the first existing sketch content object includes erasing at least some pixels that would have been drawn in accordance with the first additional drawing command

Figure 10F

DEVICE, METHOD, AND GRAPHICAL USER INTERFACE FOR COLLABORATIVE EDITING IN DOCUMENTS

RELATED APPLICATIONS

This application is a continuation of U.S. application Ser. No. 14/871,623, filed Sep. 30, 2015, which claims priority to U.S. Provisional Application Ser. No. 62/172,225, filed Jun. 7, 2015, entitled "Device, Method, and Graphical User Interface for Collaborative Editing in Document", both of which are incorporated by reference herein in their entireties.

TECHNICAL FIELD

This relates generally to electronic devices, including but not limited to electronic devices that providing collaborative document editing functions.

BACKGROUND

Collaborative document editing may be needed in a variety of contexts. Sometimes, multiple users may wish to concurrently access and make changes to a single document from different devices and/or locations. Sometimes, the same user may wish to edit a document using multiple devices at different times and see the edits synchronized on all devices.

Existing techniques for resolving conflicts between concurrent edits from multiple sources (e.g., devices and/or users) and synchronization between multiple local versions of the same document (replicas) are cumbersome and inefficient. For example, some techniques require expensive network servers and architecture to maintain a central authoritative master copy of the document. Some techniques require complicated locking mechanisms that increase user interface response time and negatively impact user experience. In addition, some of these techniques require Internet access, which means that synchronization may not be available at all time for all devices.

SUMMARY

Accordingly, the present disclosure provides electronic devices with faster, more efficient methods and interfaces for collaborative document editing. Such methods and interfaces optionally complement or replace conventional methods and interfaces for collaborative document editing. Such methods and interfaces reduce the burden on a user and produce a more efficient human-machine interface. Further, such methods reduce the processing power consumed to process user inputs, conserve power, reduce unnecessary/extraneous/repetitive inputs, and potentially reduce memory usage. For battery-operated devices, such methods and interfaces conserve battery power and increase the time between battery charges. For some collaborative contexts, such methods and interfaces may also support short-distance communication between devices without the need for Internet access or a central server.

The methods and interfaces disclosed herein can be implemented on different types of electronic devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors. Alternatively, or in addition, executable instructions for performing these functions are, optionally, included in a transitory computer-readable storage medium or other computer program product configured for execution by one or more processors. In some embodiments, the method and interfaces disclosed herein can also be implemented using functional modules that are a combination of software and software.

In accordance with some embodiments, a method of maintaining a consistent output based on concurrent textual edits received at multiple collaborating devices is performed at an electronic device with a display. The electronic device is a first device of the multiple collaborating devices. The method includes maintaining a directed acyclic graph to represent a textual string concurrently edited by the first device and at least a second device of the multiple collaborating devices. The directed acyclic graph includes a plurality of nodes each representing a respective character input received from one or more of the multiple collaborating devices. The directed acyclic graph further includes multiple parallel paths each including at least one node that represents a respective one of multiple concurrent character inputs received from distinct devices of the multiple collaborating devices. The method further includes topologically traversing the directed acyclic graph in accordance with a predetermined ordering rule to deterministically sort the plurality of nodes in the directed acyclic graph into a string sequence. The method further includes displaying the textual string in accordance with the deterministically obtained string sequence.

In accordance with some embodiments, a method of maintaining a consistent output based on concurrent drawing edits received at multiple collaborating devices is performed at an electronic device with a display. The electronic device is a first device of the multiple collaborating devices. The method includes maintaining a command sequence for a drawing currently rendered at the first device. The command sequence includes a plurality of past drawing commands sorted according to respective sequence numbers of the past drawing commands. A sequence number of a drawing command is defined by (1) a device identifier for a device at which the drawing command was first received, (2) a primary local sequence number representing a local synchronization epoch during which the drawing command was first received, and (3) a secondary local sequence number representing an order of the drawing command within the local synchronization epoch. The method further includes receiving a plurality of additional drawing commands from two or more devices of the multiple collaborating devices, each of the plurality of additional drawing commands having a respective sequence number. The method further includes updating the command sequence, including merging and sorting the plurality of additional drawing commands and the plurality of past drawing commands in accordance with an ordering rule based on the respective sequence numbers of the plurality of past drawing commands and the plurality of additional drawing commands, wherein the ordering rule gives more significance to the primary local sequence number than the device identifier, and gives more significance to the device identifier than to the secondary local sequence number when comparing the respective sequence numbers. The method further includes re-rendering at least a portion of the drawing based on the command sequence after updating the command sequence.

In accordance with some embodiments, a method of supporting collaborative editing is performed at an electronic device with a display. The electronic device is a first device of multiple collaborating devices. The method includes maintaining a directed acyclic graph to represent content collaboratively edited by the first device and one or more second devices of the multiple collaborating devices. The directed acyclic graph includes a plurality of nodes each representing a respective content object that is created or edited by one or more of the multiple collaborating devices. Each node is connected to at least one neighboring node by a respective directed edge in accordance with a relative positional order of the respective content objects represented by the node and the at least one neighboring node. At least a first node of the plurality of nodes represents a textual content object and at least a second node of the plurality of nodes represents a sketch content object. Each node representing a corresponding sketch content object is associated with a respective command sequence used to create internal content of the corresponding sketch content object. The method further includes, during a respective synchronization period, receiving one or more editing inputs from one or more devices of the multiple collaborating devices. The method further includes modifying the directed acyclic graph based on relationships between the editing inputs and existing content objects embodied in the directed acyclic graph. The method further includes traversing the directed acyclic graph in accordance with a predetermined ordering rule to obtain an object sequence. The method further includes determining whether the one or more editing inputs modifies an existing sketch content object represented in the directed acyclic graph. The method further includes, in accordance with a determination that a first editing input of the one or more editing inputs modifies a first existing sketch content object represented in the directed acyclic graph, updating a command sequence associated with the first existing sketch content object by merging each individual drawing command included the first editing input with the command sequence associated with the first existing sketch content object.

In accordance with some embodiments, a first electronic device includes a display unit configured to display a user interface and a processing unit coupled with the display unit. The processing unit is configured to maintain a directed acyclic graph to represent a textual string concurrently edited by the first electronic device and at least a second electronic device of multiple collaborating devices. The directed acyclic graph includes a plurality of nodes each representing a respective character input received from one or more of the multiple collaborating devices. The directed acyclic graph further includes multiple parallel paths each including at least one node that represents a respective one of multiple concurrent character inputs received from distinct devices of the multiple collaborating devices. The processing unit is further configured to topologically traverse the directed acyclic graph in accordance with a predetermined ordering rule to deterministically sort the plurality of nodes in the directed acyclic graph into a string sequence. The processing unit is further configured to enable display of the textual string in accordance with the deterministically obtained string sequence.

In accordance with some embodiments, a first electronic device includes a display unit configured to display a user interface and a processing unit coupled with the display unit. The processing unit is configured to maintain a command sequence for a drawing currently rendered at the first electronic device. The command sequence includes a plurality of past drawing commands sorted according to respective sequence numbers of the past drawing commands. A sequence number of a drawing command is defined by (1) a device identifier for a device at which the drawing command was first received, (2) a primary local sequence number representing a local synchronization epoch during which the drawing command was first received, and (3) a secondary local sequence number representing an order of the drawing command within the local synchronization epoch. The processing unit is further configured to receive a plurality of additional drawing commands from two or more devices of multiple collaborating devices, each of the plurality of additional drawing commands having a respective sequence number. The processing unit is further configured to update the command sequence, including merging and sorting the plurality of additional drawing commands and the plurality of past drawing commands in accordance with an ordering rule based on the respective sequence numbers of the plurality of past drawing commands and the plurality of additional drawing commands. The ordering rule gives more significance to the primary local sequence number than the device identifier, and gives more significance to the device identifier than to the secondary local sequence number when comparing the respective sequence numbers. The processing unit is further configured to re-render at least a portion of the drawing based on the command sequence after updating the command sequence.

In accordance with some embodiments, a first electronic device includes a display unit configured to display a user interface and a processing unit coupled with the display unit. The processing unit is configured to maintain a directed acyclic graph to represent content collaboratively edited by the first device and one or more second devices of the multiple collaborating devices. The directed acyclic graph includes a plurality of nodes each representing a respective content object that is created or edited by one or more of multiple collaborating devices. Each node is connected to at least one neighboring node by a respective directed edge in accordance with a relative positional order of the respective content objects represented by the node and the at least one neighboring node. At least a first node of the plurality of nodes represents a textual content object and at least a second node of the plurality of nodes represents a sketch content object. Each node representing a corresponding sketch content object is associated with a respective command sequence used to create internal content of the corresponding sketch content object. The processing unit is further configured to, during a respective synchronization period, receive one or more editing inputs from one or more devices of the multiple collaborating devices. The processing unit is further configured to modify the directed acyclic graph based on relationships between the editing inputs and existing content objects embodied in the directed acyclic graph. The processing unit is further configured to traverse the directed acyclic graph in accordance with a predetermined ordering rule to obtain an object sequence. The processing unit is further configured to determine whether the one or more editing inputs modifies an existing sketch content object represented in the directed acyclic graph. The processing unit is further configured to, in accordance with a determination that a first editing input of the one or more editing inputs modifies a first existing sketch content object represented in the directed acyclic graph, update a command sequence associated with the first existing sketch content object by merging each individual drawing command included the first editing input with the command sequence associated with the first existing sketch content object.

In accordance with some embodiments, an electronic device includes a display, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium (e.g., a non-transitory computer readable storage medium, or alternatively, a transitory computer readable storage medium) has stored therein instructions which when executed by an electronic device with a display, cause the device to perform or cause performance of the operations of any of the methods described herein. In accordance with some embodiments, an electronic device includes: a display and means for performing or causing performance of the operations of any of the methods described herein. In accordance with some embodiments, an information processing apparatus, for use in an electronic device with a display, includes means for performing or causing performance of the operations of any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8D are flow diagrams illustrating a method of providing collaborative document editing (e.g., maintaining a consistent output based on concurrent textual edits received at multiple collaborating devices) in accordance with some embodiments.

FIGS. 9A-9C are flow diagrams illustrating a method of providing collaborative document editing (e.g., maintaining a consistent output based on concurrent drawing/sketch edits received at multiple collaborating devices) in accordance with some embodiments.

FIGS. 10A-10F are flow diagrams illustrating a method of supporting collaborative editing (e.g., collaborative mixed text and sketch editing) in accordance with some embodiments.

DESCRIPTION OF EMBODIMENTS

Figure 1A:
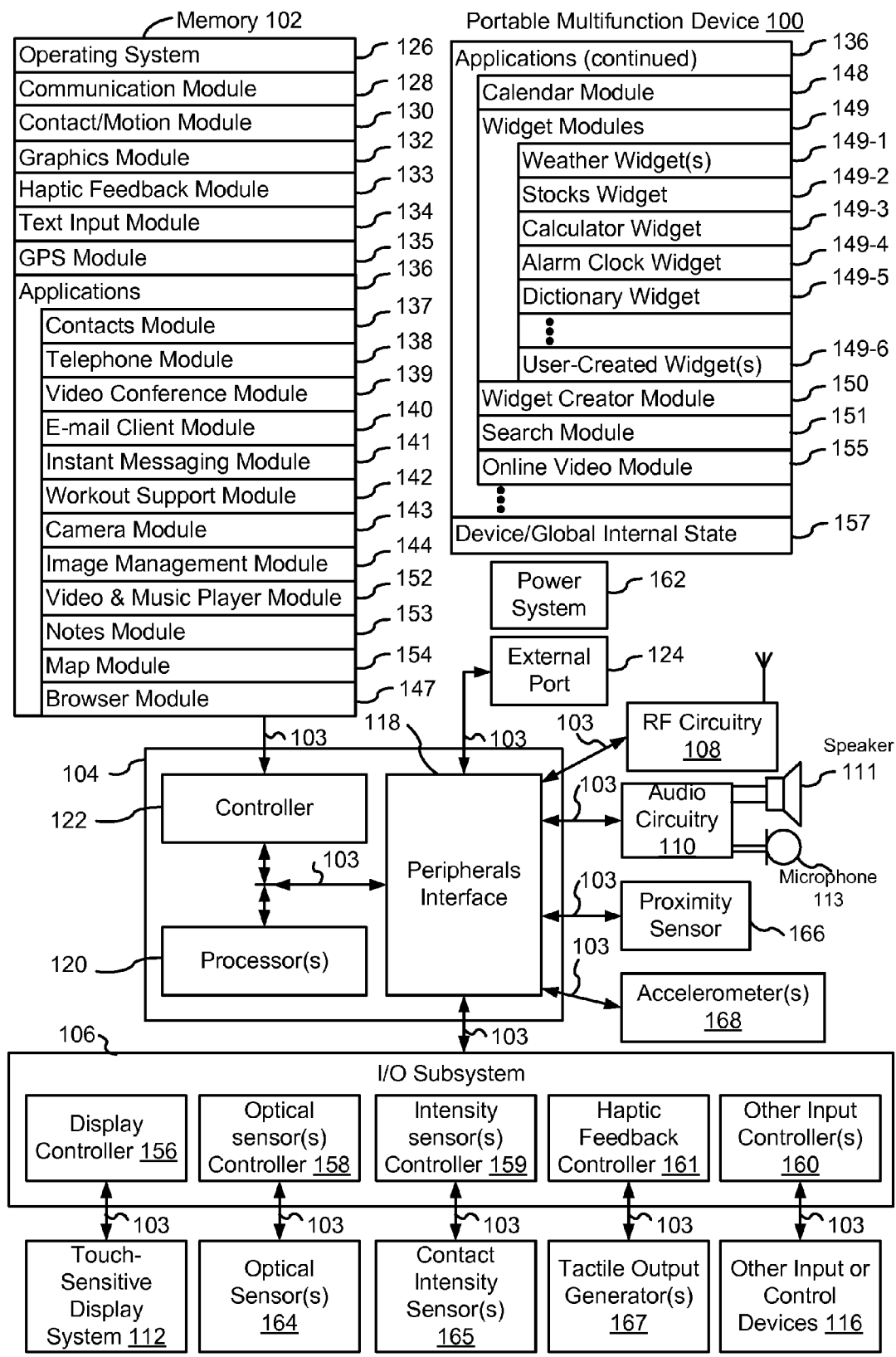
FIG. 1A is a block diagram illustrating a portable multifunction device with a touch-sensitive display in accordance with some embodiments.

Collaborative editing of an electronic document (e.g., a word processing document, a note page, a sketch, a content page, etc.) may be carried out by multiple users from multiple electronic devices or by the same user using multiple devices. The edits may be entered at different devices at the same time or at different times. Sometimes, edits received at different devices may coexist and be non-interfering of one another in a merged document; at other times, edits received at different devices may affect the same portion of the document and raise a conflict in a merged document. Conflicting edits may be entered concurrently or at different times. Sometimes, collaborating devices are located in proximity to one another such that near-range communication (e.g., communication via Bluetooth or Infrared communication interfaces) may occur between the devices without using a Wide Area Network (WAN) or Local Area Network (LAN). Sometimes, collaborating devices are located remotely from one another, and communicate with one another via a LAN or a WAN, or some other long-range network.

A mergeable content object data structure is disclosed herein for robust and simple collaborative content editing (e.g., collaborative editing of text, sketch, or other types of content objects in the same document by two or more collaborating devices). In some embodiments, the mergeable content object data structure supports both long periods of offline use on multiple devices (e.g., by the same user or by multiple users) and live editing collaboration on multiple devices. In some embodiments, the mergeable content object data structure is used without any server architecture to support a master copy or multiple versions of the content under collaborative editing.

A common method of implementing collaboration support is to propagate operations initiated on one replica (e.g., a local copy of a document residing on one of the collaborating devices) to all other replicas (e.g., local copies of the same document residing on other collaborating devices).

During each synchronization process, new operations are replayed at each replica that receives the operations through the propagation process. The problem is with this method is that a difference in the ordering of operations executed at different replicas would result in different end results. In other words, inconsistent local copies of the document may be produced at different collaborating devices after the synchronization process.

In order to solve the above problem, conventionally, two techniques are used: (1) enforcing a total ordering across all replicas when all new operations from all replicas have been received, and (2) using Operational Transforms (OTs) which rewrite all operations so that they can be executed out of order without causing a difference in the end result. Unfortunately, the former technique is unsuitable for real-time collaboration; and the latter technique is highly complex and error-prone. Recently, algorithms based on Commutative Replicated Data Types (CRDT) have emerged. These CRDT-based algorithms are designed so that all operations commute at the data-structure level. Two examples of recent text CRDT algorithm are Logoot and TreeDoc.

Operational Transforms have the advantage of requiring no metadata accumulation when online, and providing undo support. Some of its drawbacks include high complexity, requirement for server architecture, poor offline support, and possible unexpected outcomes due to deletion of unseen text in range-based deletions. Compared to OT, TreeDoc and Logoot are simpler, require no server architecture, and provide offline support. However, TreeDoc and Logoot sometimes produce unbalanced tree/key growth and non-contiguous merging when two users concurrently modify the same content location.

The techniques disclosed herein (e.g., TopoText) is simple, fast, does not require server architecture, provides offline support, and provides undo support, all at the expense of only minor metadata accumulation.

In the methods disclosed herein, content objects (e.g., text characters and/or drawing objects) in a document (e.g., a word processing document, a note page, a sketch, or a mixed-text and sketch content page, etc.) are represented as nodes in a directed acyclic graph. The graph is an add-only set such that a merge operation on multiple local graphs is a simple union of the local graphs. In other words, edits made on a document are represented as add-only changes made to the graph, e.g., including addition of nodes and paths in the graph, and changes to attributes associated with particular nodes. Once the local graph of each collaborating device has been seen by every other collaborating device, all of the collaborating devices will have the same merged graph. In some embodiments, in order to resolve the merged graph consistently into rendered content of the document, a predetermined ordering rule observed by all collaborating devices is used to sort the nodes in the merged graph into the same object sequence in a deterministic way. In some embodiments, the content of the document is then rendered according to the object sequence at each collaborating device.

A content object may be a simple object (e.g., an unformatted ASCII character) that has only a "visible" or "deleted" status (e.g., for a visibility attribute of the object). In some embodiments, when "undo" and "redo" operations are supported, a content object may further have an "un-deleted" or "re-deleted" status (e.g., also for the visibility attribute of the object), which renders the content object visible or invisible in the document just like the "visible" and "deleted" status values.

In some embodiments, a content object has additional attributes with different states. For example, a content object (e.g., a formatted text character) may have attributes representing different styles (e.g., font, size, color, underlining, boldness, etc.), and each attribute takes on one of two or more states (e.g., two or more possible values of the style represented by the attribute) at any given time.

In some embodiments, when represented in the graph, each content object is represented by a corresponding node with zero or more attributes. In some embodiments, the attribute for a node may be omitted from the graph if the value of the attribute is a default value of the attribute (e.g., the "visible" status of a "visibility" attribute for a node when it is first created). In some embodiments, edits on the same attribute for the same node made at different collaborating devices may be resolved in accordance with a predetermined rule suitable for the attribute (e.g., a rule based on device IDs and/or timestamps of the edits).

In some embodiments, a content object includes accumulation of multiple edits by one or more devices over a period of time. For example, in some embodiments, a sketch or drawing made by multiple drawing commands received at one or more devices is a content object represented by a single node in the graph. In some embodiments, a different merging and sorting rule for the drawing commands is used for determining the internal appearance of the content object (e.g., the sketch or drawing object) while a global merging and sorting rule for the content objects in the document is used to determine the overall position and state of the content object (e.g., the "deleted" or "un-deleted" state) in the document.

In some embodiments, when a content object is a sketch object made by multiple drawing commands in a command sequence, the command sequences from multiple replicas are merged and sorted in a way that reduces unnecessary interlacing of drawing commands, and makes the visual effect of the merging more natural to the user(s). In some embodiments, the ordering rule for merging drawing commands from different replicas are based on unique sequence numbers made up of three parts: a device ID, a primary local sequence number representing a corresponding local synchronization epoch during which the drawing command was first received, and a secondary local sequence number representing an order of the drawing command within the corresponding local synchronization epoch. In some embodiments, among the three parts, the most significant is primary sequence number based on the local synchronization epoch number, and the local synchronization epoch number is only updated after the completion of a synchronization event which resulted in a merged command sequence that ends with a remotely entered drawing command.

As used herein, an input or command (e.g., an editing input, a drawing command, etc.) for editing a document is considered to be received "locally" at a device (e.g., a first device of multiple collaborating devices), if the input or command is an input that was provided to the device by a user directly manipulating an input user interface (e.g., the document editor user interface, the user interface of an note application, etc.) of the device that is presenting the document. The input or command is considered "locally" received at the device (e.g., the first device of the multiple collaborating devices) regardless of whether the user is physically proximate to the device or accessing the device via a network (e.g., via a Virtual Private Network (VPN) session or a dump terminal). When the input or command is later propagated to other collaborating devices (e.g., one or more second devices of the multiple collaborating devices), e.g., during a synchronization event and/or as part of a graph or command sequence, the input or command is considered to be a "remotely" received input or command for the other collaborating devices (e.g., the one or more second devices of the multiple collaborating devices). In addition, in all future merged graphs and command sequences, the input or command is always considered to have been "first received" and "locally received" at the device (e.g., the first device of multiple collaborating devices).

In some embodiments, collaborative editing involving mixed content types, such as mixed text and sketch editing, the merging and sorting of the command sequences for sketch content object may occur during the merging, the sorting, or the rendering of the overall document based on the graph-based representation of the document.

Figure 2:
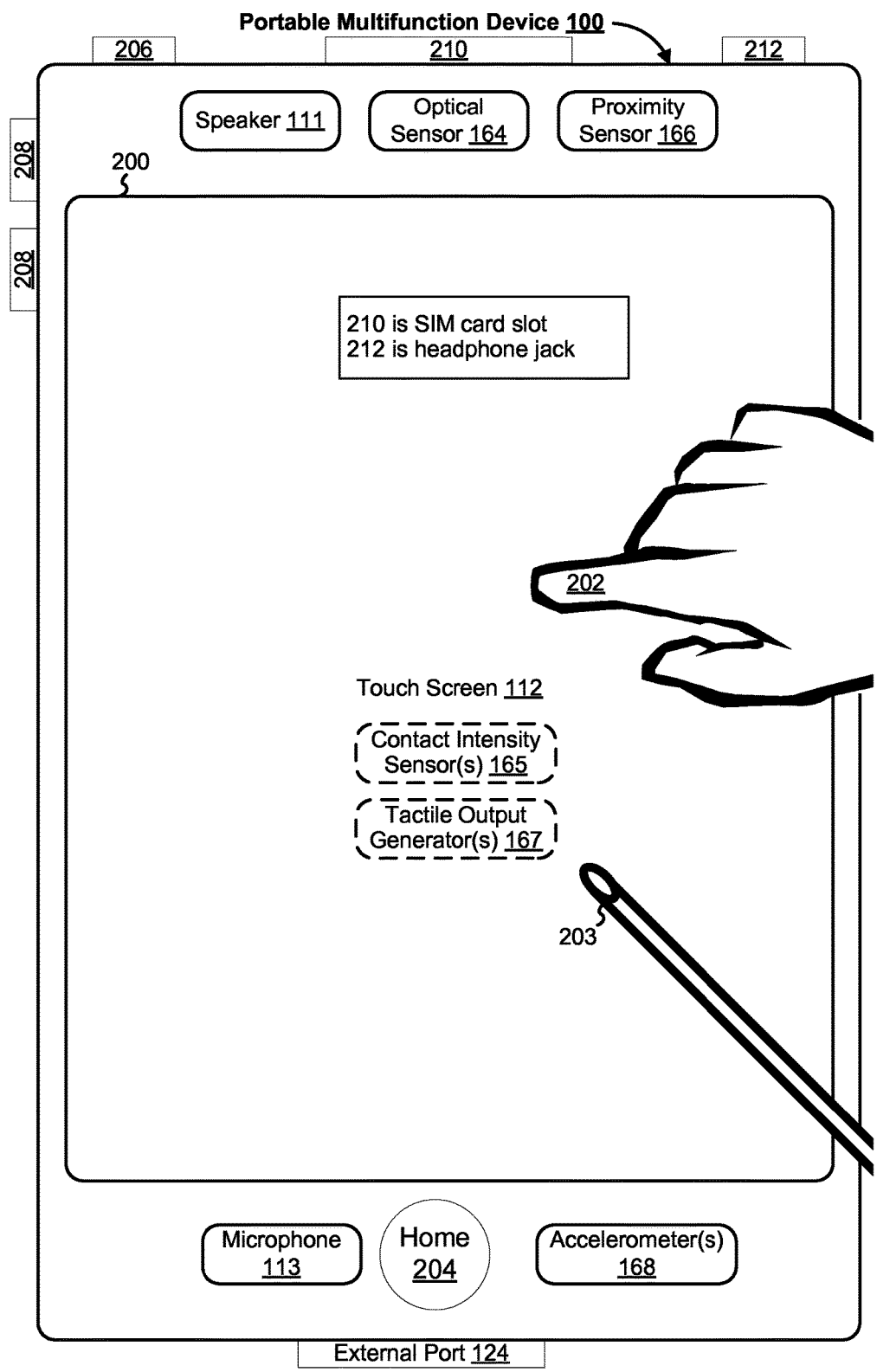
FIG. 2 illustrates a portable multifunction device having a touch screen in accordance with some embodiments.
Figure 3:
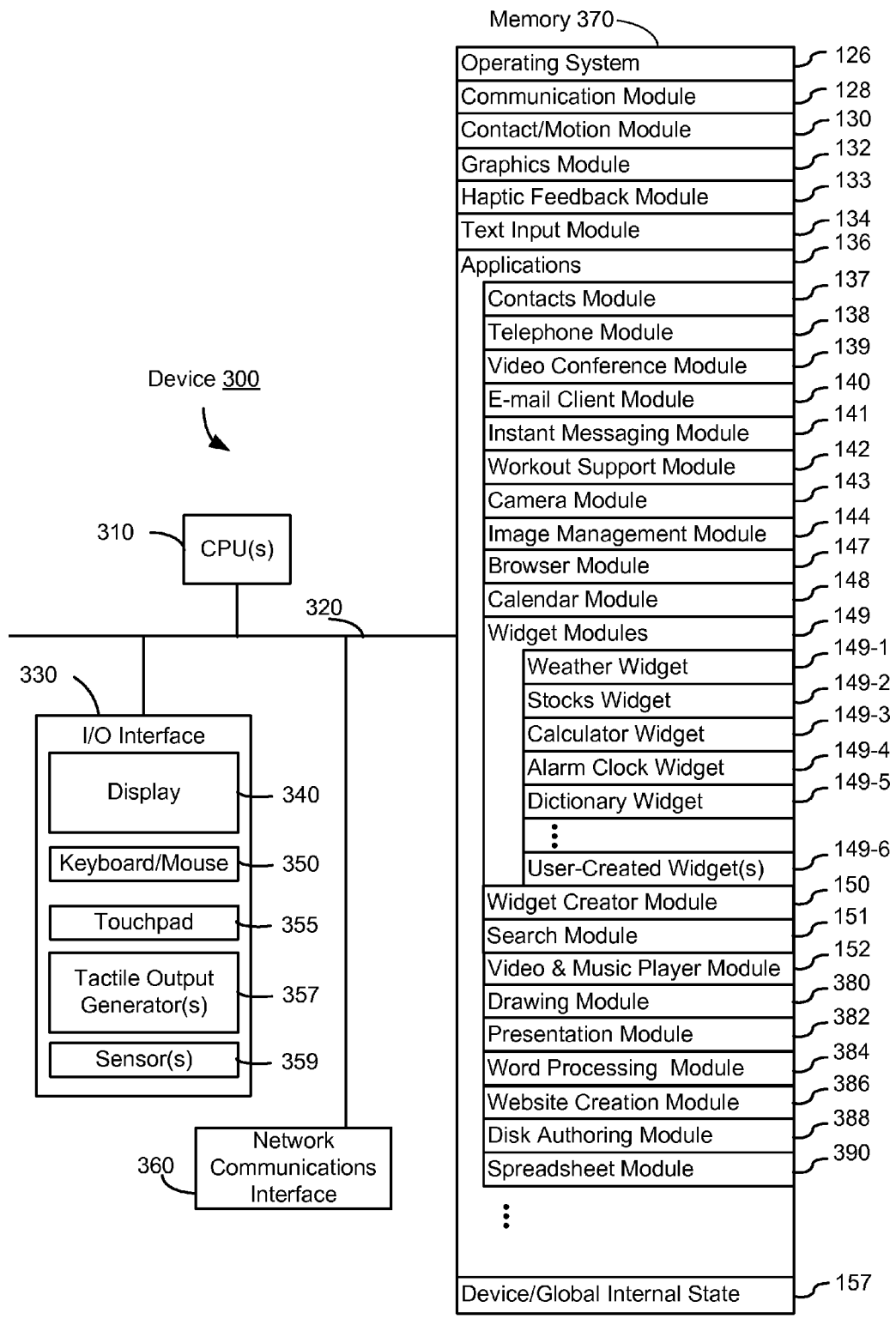
FIG. 3 is a block diagram of an exemplary multifunction device with a display and a touch-sensitive surface in accordance with some embodiments.
Figure 4A:
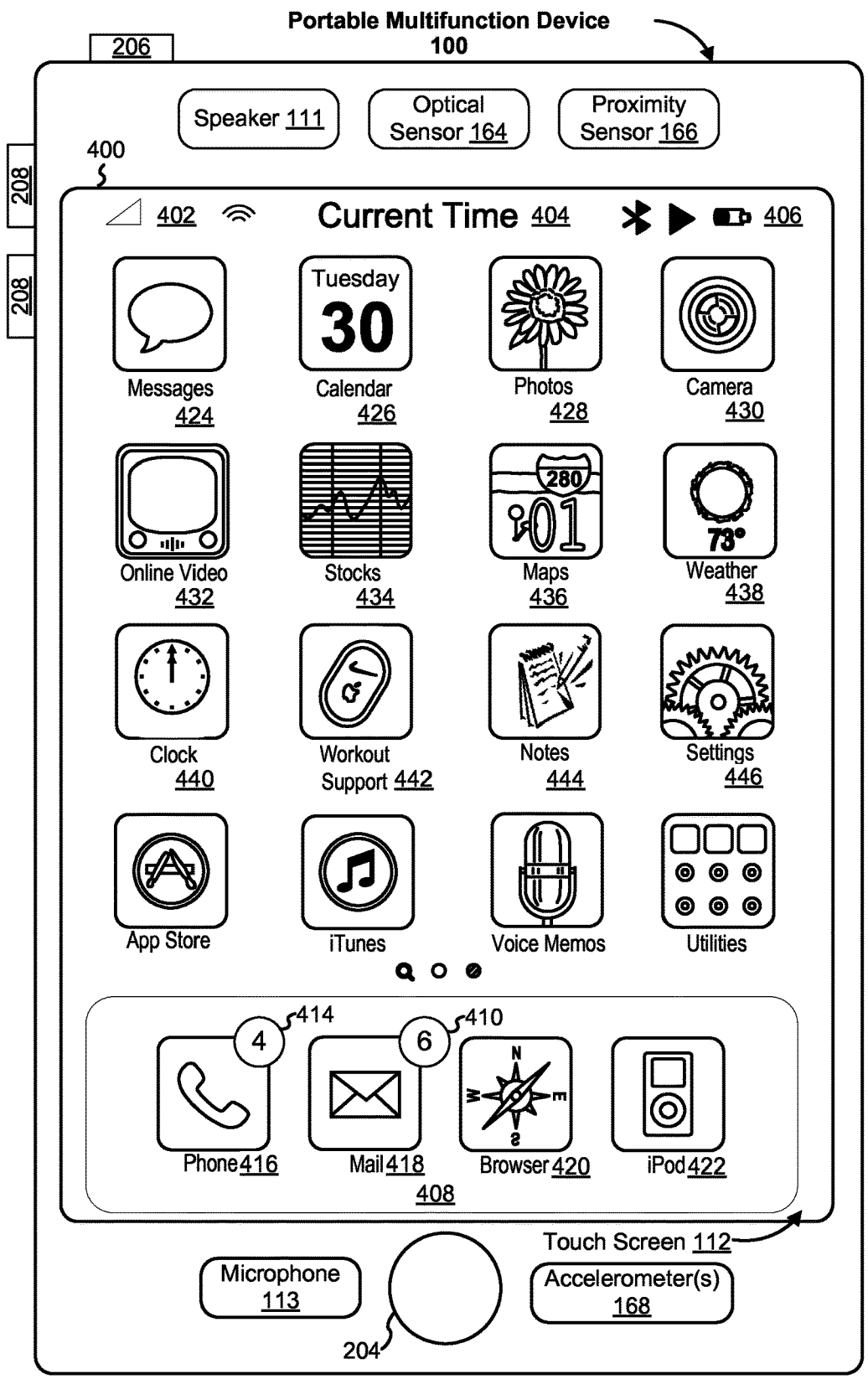
FIG. 4A illustrates an exemplary user interface for a menu of applications on a portable multifunction device in accordance with some embodiments.
Figure 4B:
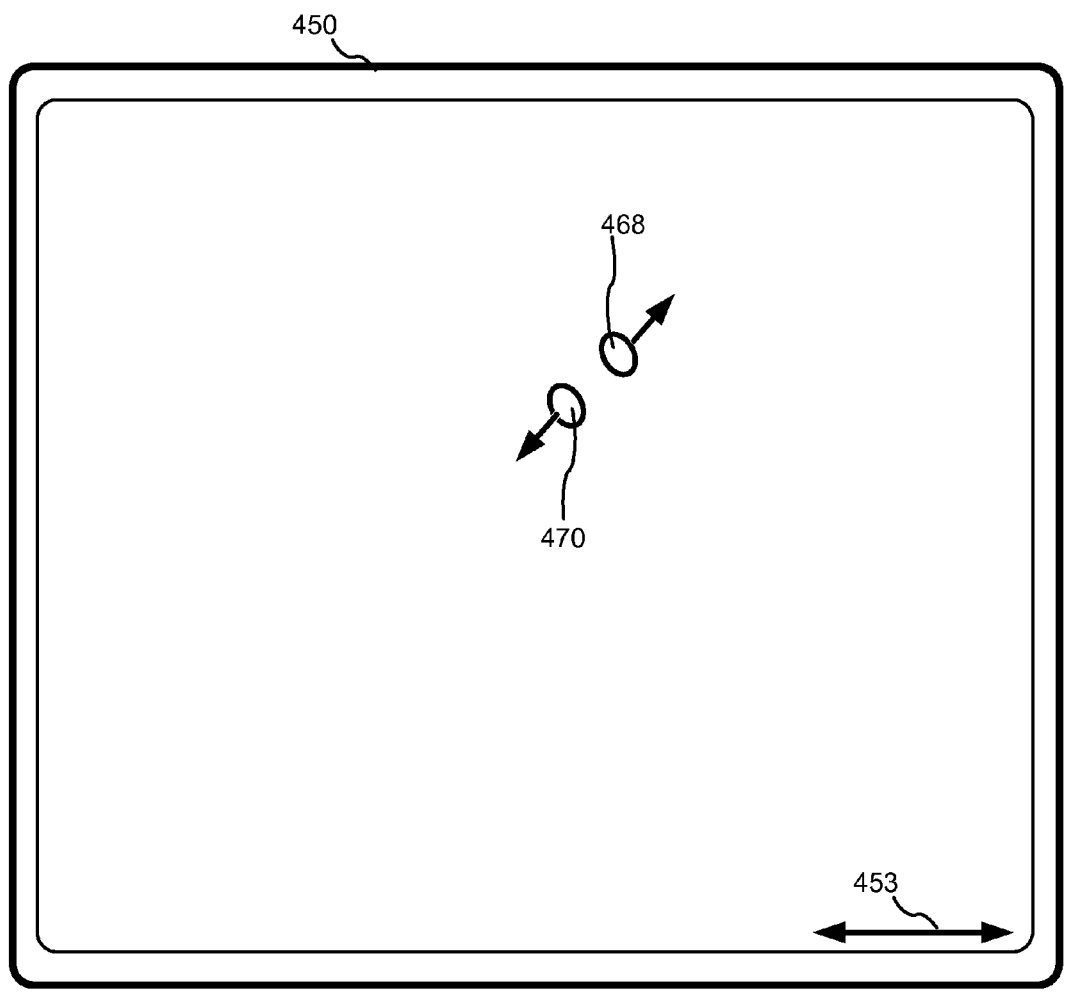
FIG. 4B illustrates an exemplary user interface for a multifunction device with a touch-sensitive surface that is separate from the display in accordance with some embodiments.
Figure 4B:
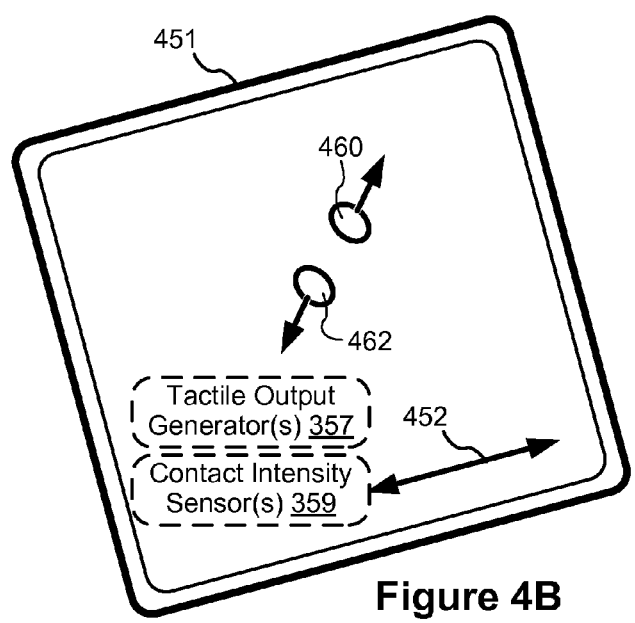
Figure 9A:
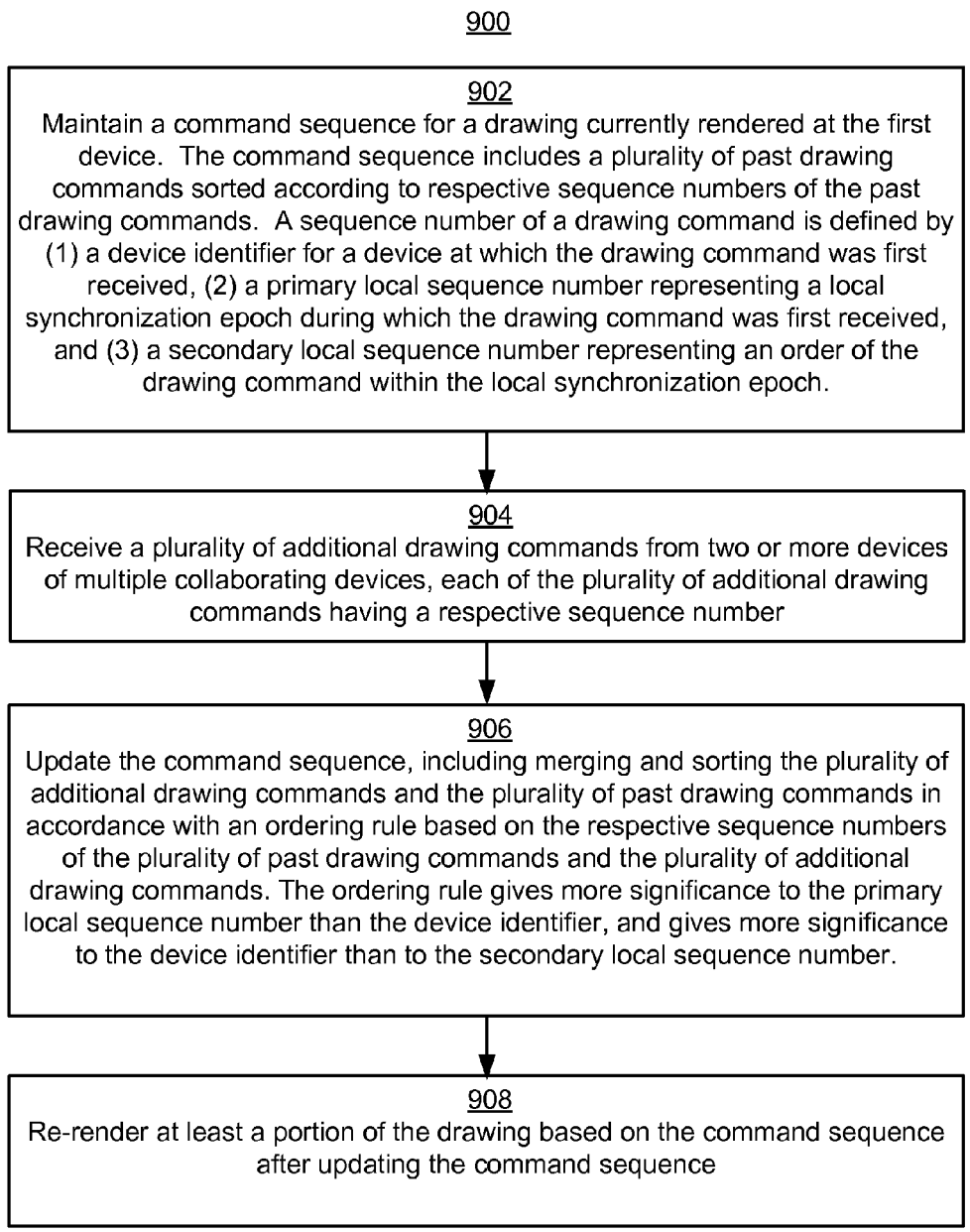
Figure 10B:
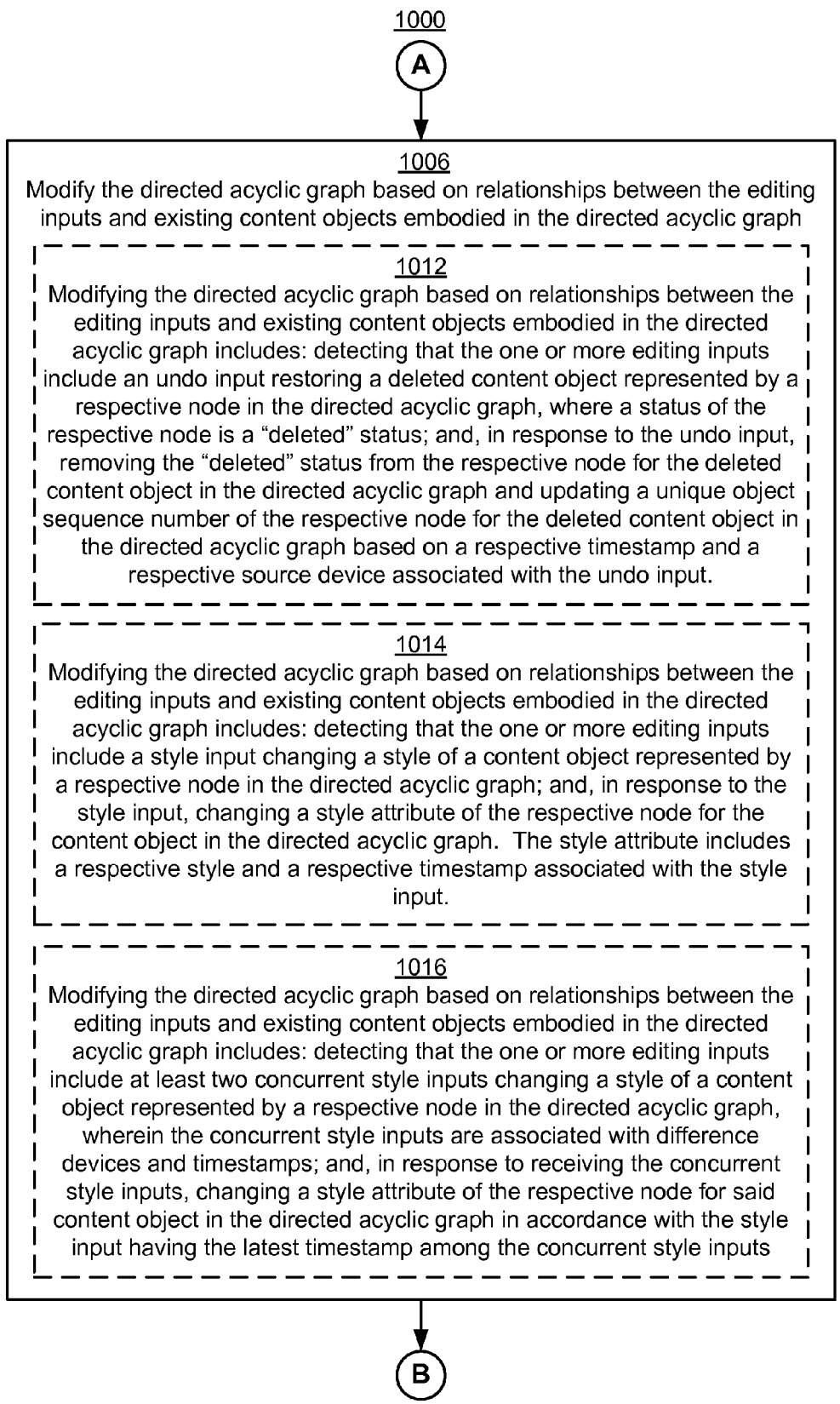
Figure 10C:
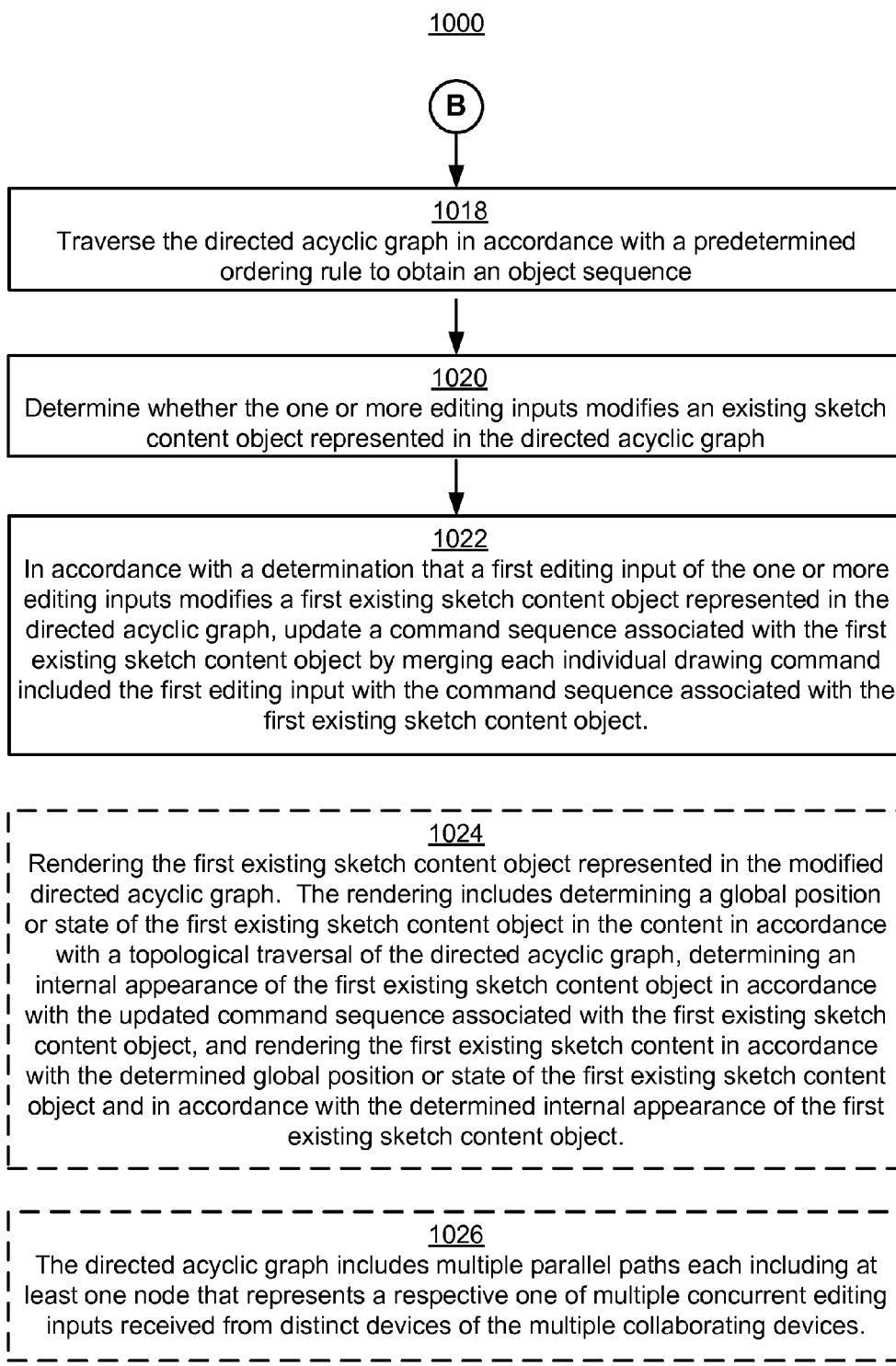

Below, FIGS. 1A-1B, 2, and 3 provide a description of exemplary devices. FIGS. 4A-4B illustrate exemplary user interfaces of the exemplary devices. FIGS. 5A-5H illustrate exemplary user interfaces for providing collaborative text editing. FIGS. 6A-6P illustrate exemplary user interfaces for providing collaborative sketch editing. FIGS. 7A-7B illustrate an exemplary user interface and a flow diagram of a method for providing mixed collaborative text and sketch editing. FIGS. 8A-8D illustrate a flow diagram of a method of providing collaborative text editing (e.g., maintaining a consistent output based on concurrent textual edits received at multiple collaborating devices). FIGS. 9A-9C illustrate a flow diagram of a method of providing collaborative sketch editing (e.g., maintaining a consistent output based on concurrent drawing edits received at multiple collaborating devices). FIGS. 10A-10F illustrate a flow diagram of a method of providing mixed collaborative text and sketch editing. The user interfaces in FIGS. 5A-5H, 6A-6P, and 7A are used to illustrate the processes in FIGS. 9B, 8A-8D, 9A-9C, and 10A-10F.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick, in addition to, or instead of, the touch-sensitive surface.

The device typically supports a variety of applications, such as one or more of the following: a node application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS)

and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
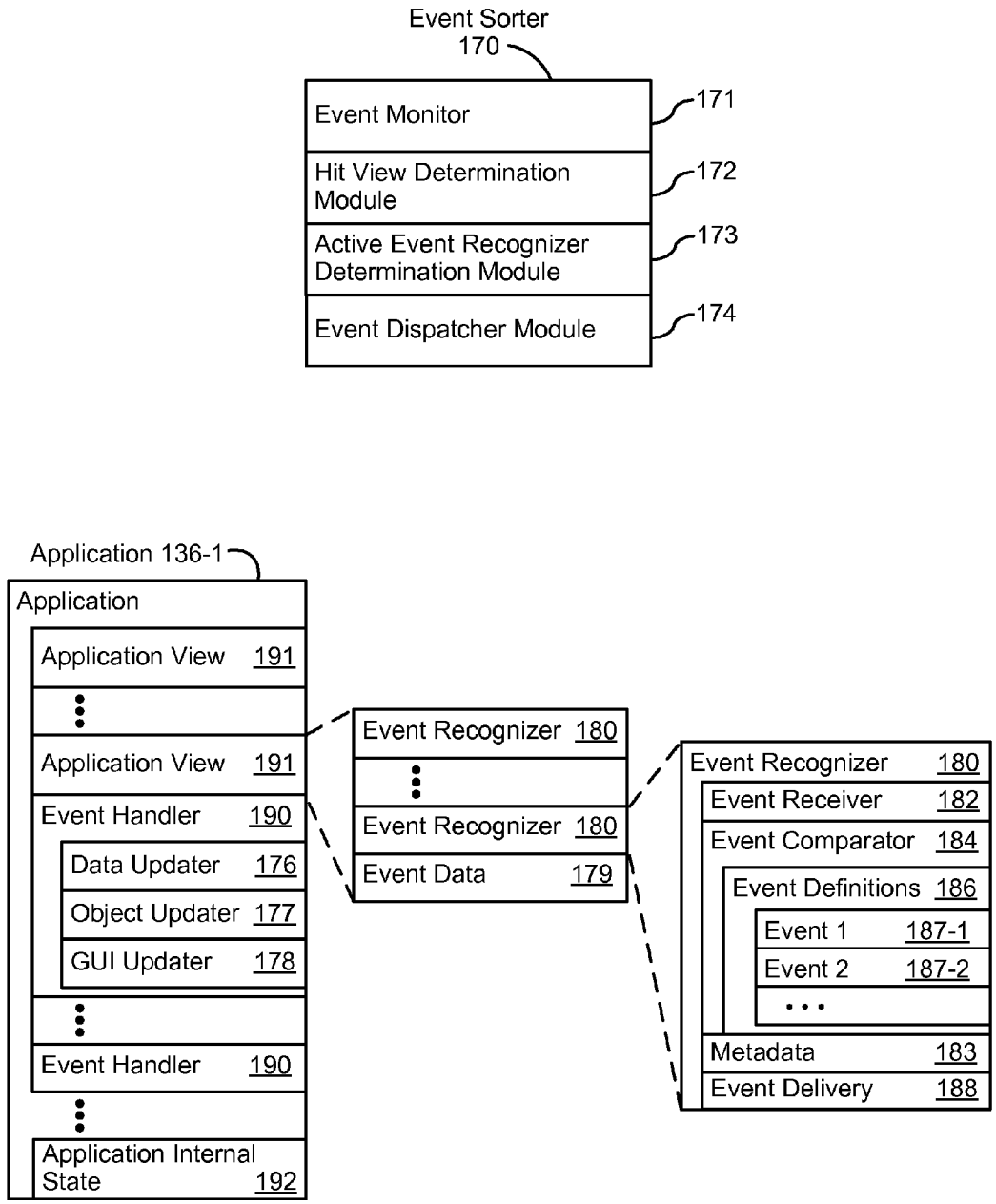
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, a respective event definition 186 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Text;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Map;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while many of the following examples are given with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

User Interfaces and Associated Processes

Attention is now directed towards embodiments of user interfaces ("UI") and associated processes that may be implemented on an electronic device, such as portable multifunction device 100 or device 300, with a display and a text input device.

FIGS. 5A-5H illustrate exemplary user interfaces for collaborative text editing, along with corresponding changes made to backend data structures for generating local and synchronized content provided on the user interfaces during the collaborative text editing, in accordance with some embodiments. The user interfaces and changes made to the backend data structures in these figures are used to illustrate the processes described below, including the processes in FIGS. 7B, 8A-8D, 9A-9C, and 10A-10F.

Figure 5A:
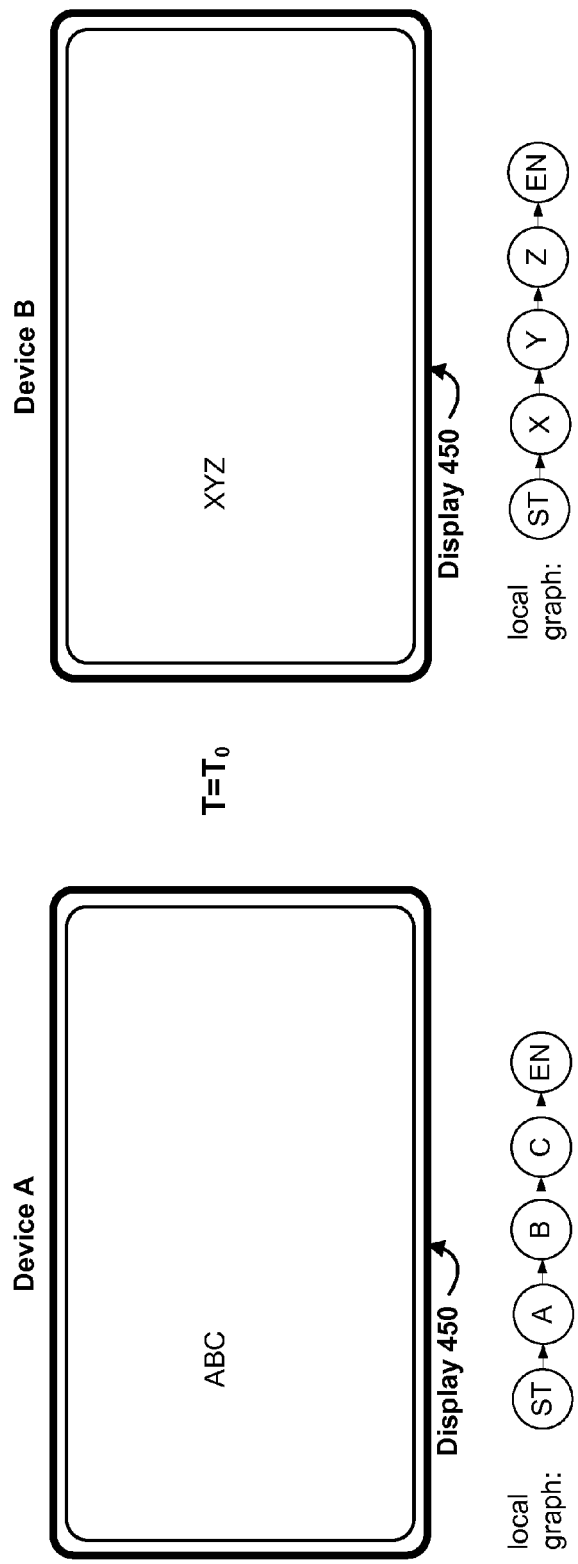
FIGS. 5A-5H illustrate exemplary user interfaces for providing collaborative document editing (e.g., collaborative text editing) in accordance with some embodiments.

FIG. 5A illustrates two devices (e.g., Device A and Device B) that collaboratively edit a single document (e.g., a note document). Although only two collaborating devices are used in this example, the principles described in this example are applicable to collaboration scenarios involving more than two collaborating devices. The following is a brief overview of FIGS. 5A-5H, and the sequence of events they represent:

As shown in FIG. 5A, during a time period 0-$T_0$, a user of Device A has entered some text (e.g., a character string "ABC") in a first local copy of the note document (e.g., replica "1"), and a user of Device B has entered some other text (e.g., a character string "XYZ") in a second local copy of the note document (e.g., replica "2"). The locally entered text appears on the display of the respective devices at which the locally entered text was first received. Before a first synchronization event occurs, each device displays the locally entered text, and updates a local graph representing the current state of the content (e.g., text characters) that has been entered in the local copy of the document. The respective local graphs at Devices A and B are shown in FIG. 5A.

Figure 5B:
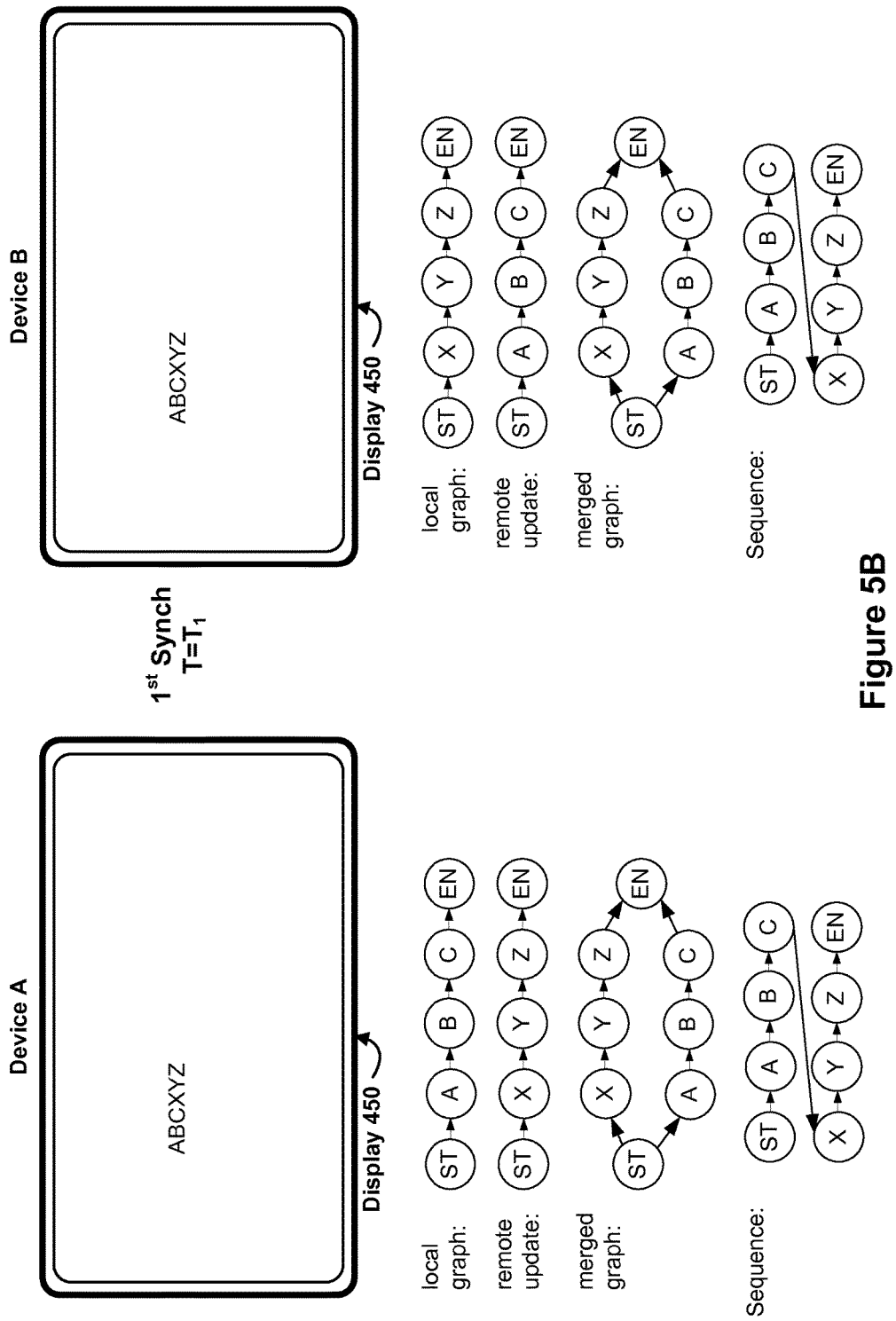

As shown in FIG. 5B, at time $T_1$, a first synchronization event occurs. Each of the two collaborating devices obtains the local graph from the other device, and merges the obtained local graph to its own local graph. After the first synchronization event @$T_1$, both devices display a merged string "ABCXYZ" based on the merged graph. The local graphs at both devices have been synchronized and represent the current state of the content that has been edited by both collaborating devices. In FIG. 5B, under the display of each device, the device's own local graph, the local graph received from the other collaborating devices (labeled as "remote update), the merged graph generated during the first synchronization event are shown. In addition, an ordered sequence of nodes that results from the sorting and traversal of the merged graph is also shown.

Figure 5C:
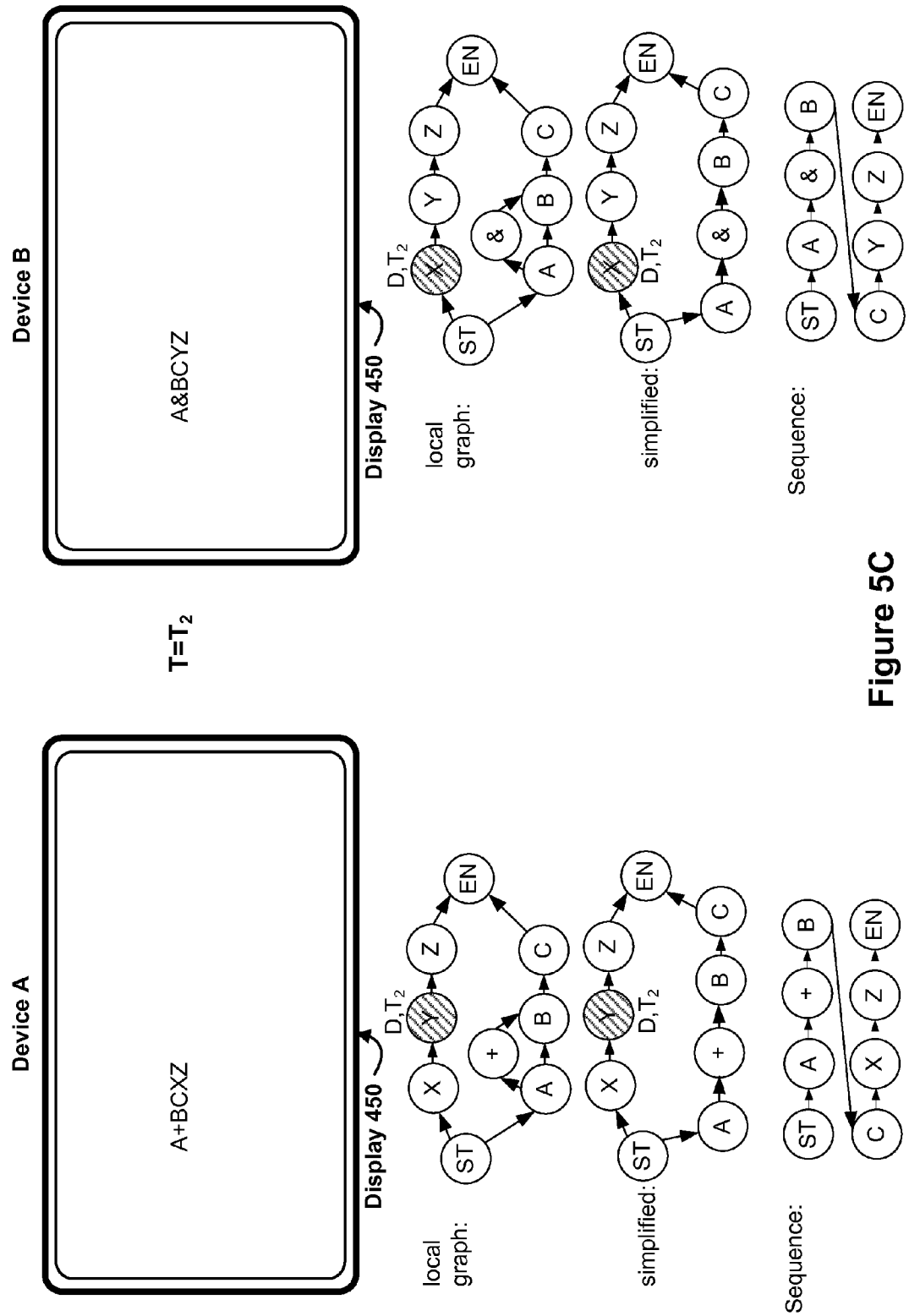

As shown in FIG. 5C, during a time period $T_1$-$T_2$, before a second synchronization event has occurred, the user of Device A has inserted a character "+" between the characters "A" and "B", and deleted the character "Y" from between the characters "X" and "Z". So, Device A displays a modified string "A+BCXZ". The local graph at Device A is updated to include the local changes made to the string. The user of Device B has inserted a character "&" between the characters "A" and "B", and deleted the character "X". So, Device B displays a modified string "A&BCYZ". The local graph at Device B is updated to include the local changes made to the string.

Figure 5D:
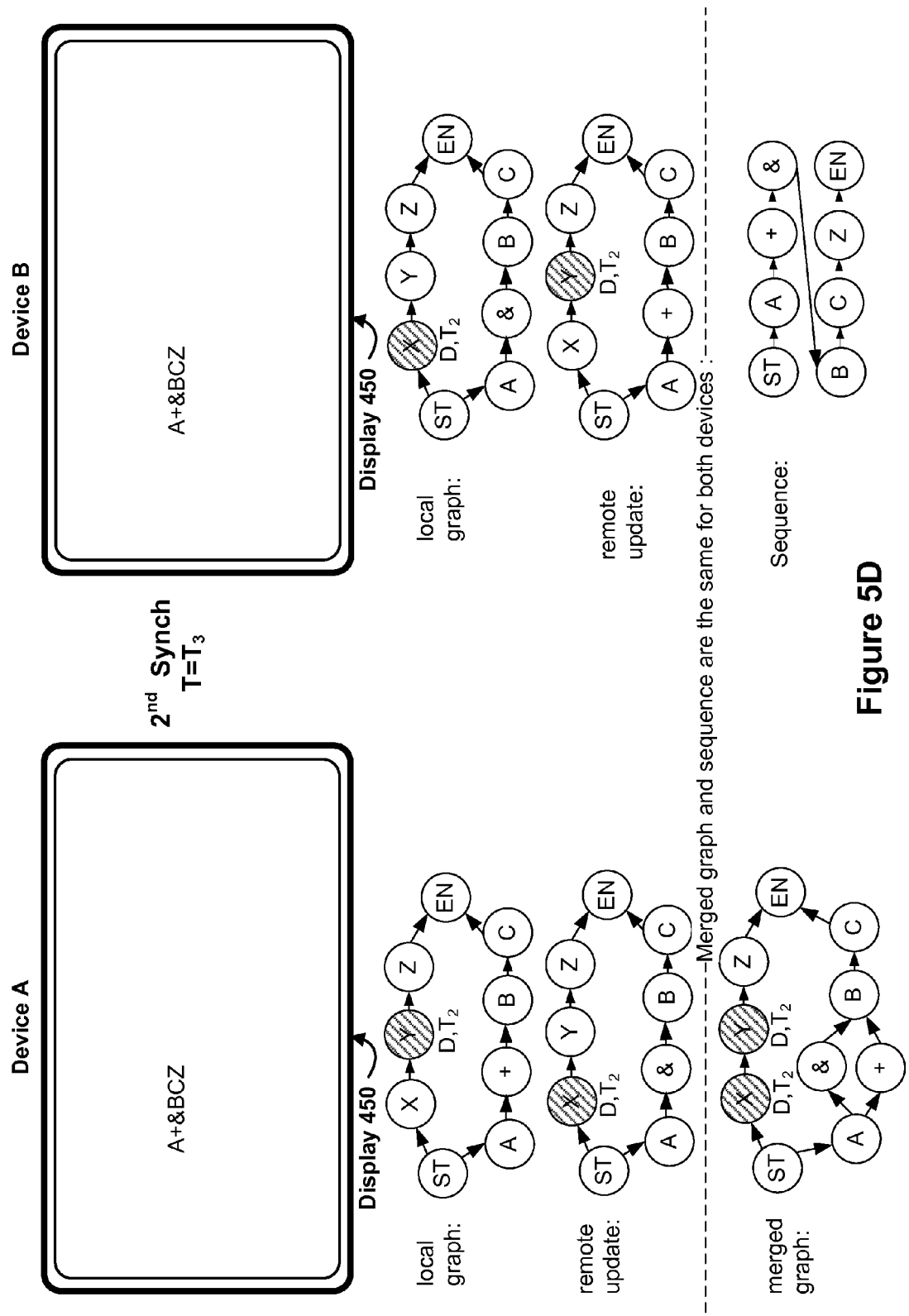

As shown in FIG. 5D, at time $T_3$, the second synchronization event occurs. Each of the two collaborating devices obtains the local graph from the other device, and merges the obtained local graph to its own local graph. After the second synchronization event, both devices display a merged string "A+&BCZ" based on the merged graph. The local graphs at both devices have been synchronized and represent the current state of the content that has been edited by both collaborating devices.

Figure 5E:
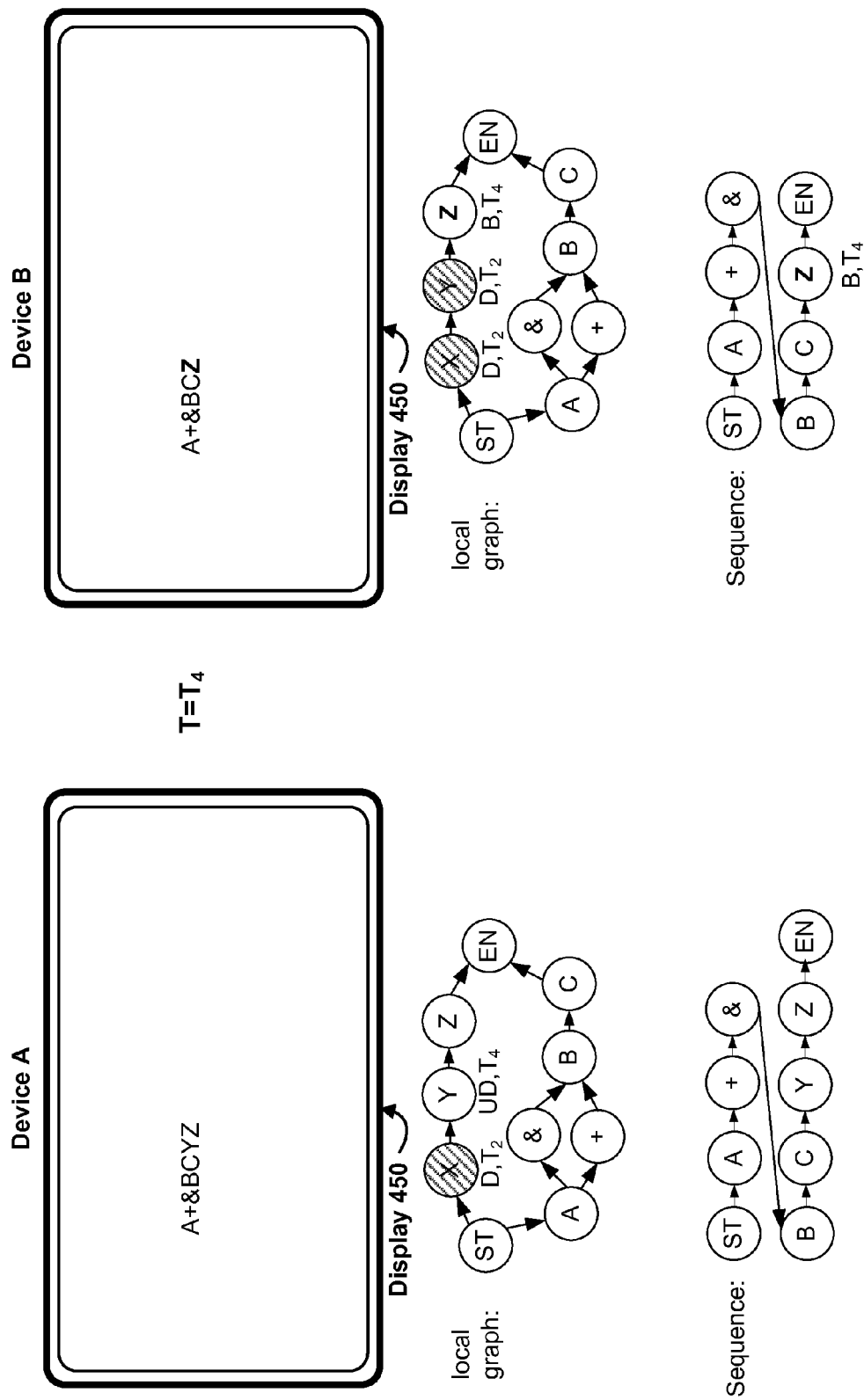

As shown in FIG. 5E, during a time period $T_3$-$T_4$, before a third synchronization event has occurred, the user of Device A has entered an "undo" command to un-delete the previously deleted character "Y". So, Device A displays a modified string "A+&BCYZ". The local graph at Device A is updated to include the local changes made to the string. The user of Device B has bolded the character "Z". So, Device B displays a modified string "A+&BCZ". The local graph at Device B is updated to include the local changes made to the string.

Figure 5F:
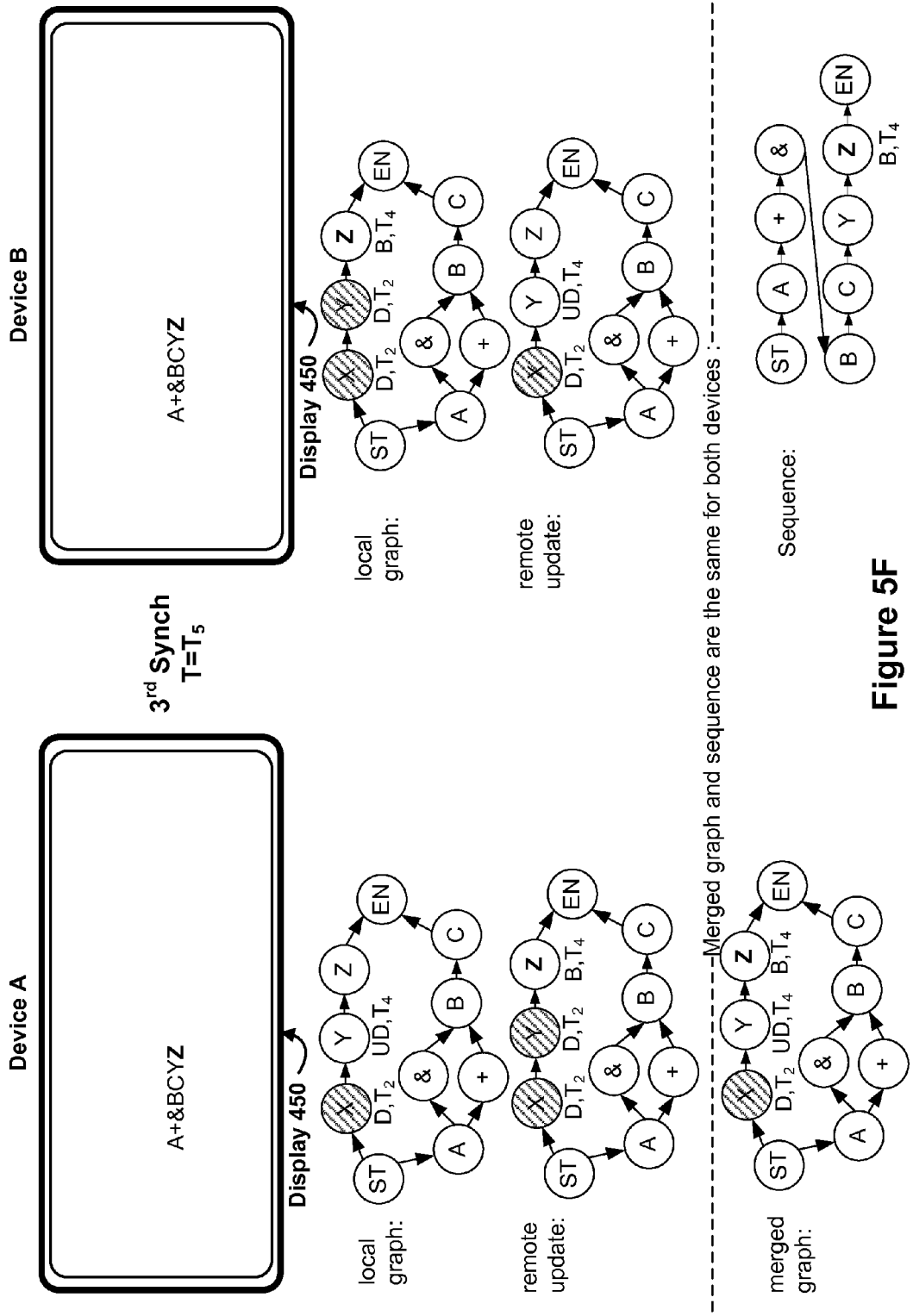

As shown in FIG. 5F, at time $T_5$, the third synchronization event occurs. Each of the two collaborating devices obtains the local graph from the other device, and merges the obtained local graph to its own local graph. After the third synchronization event, both devices display a merged string "A+&BCYZ" based on the merged graph. The local graphs at both devices have been synchronized and represent the current state of the content that has been edited by both collaborating devices.

Figure 5G:
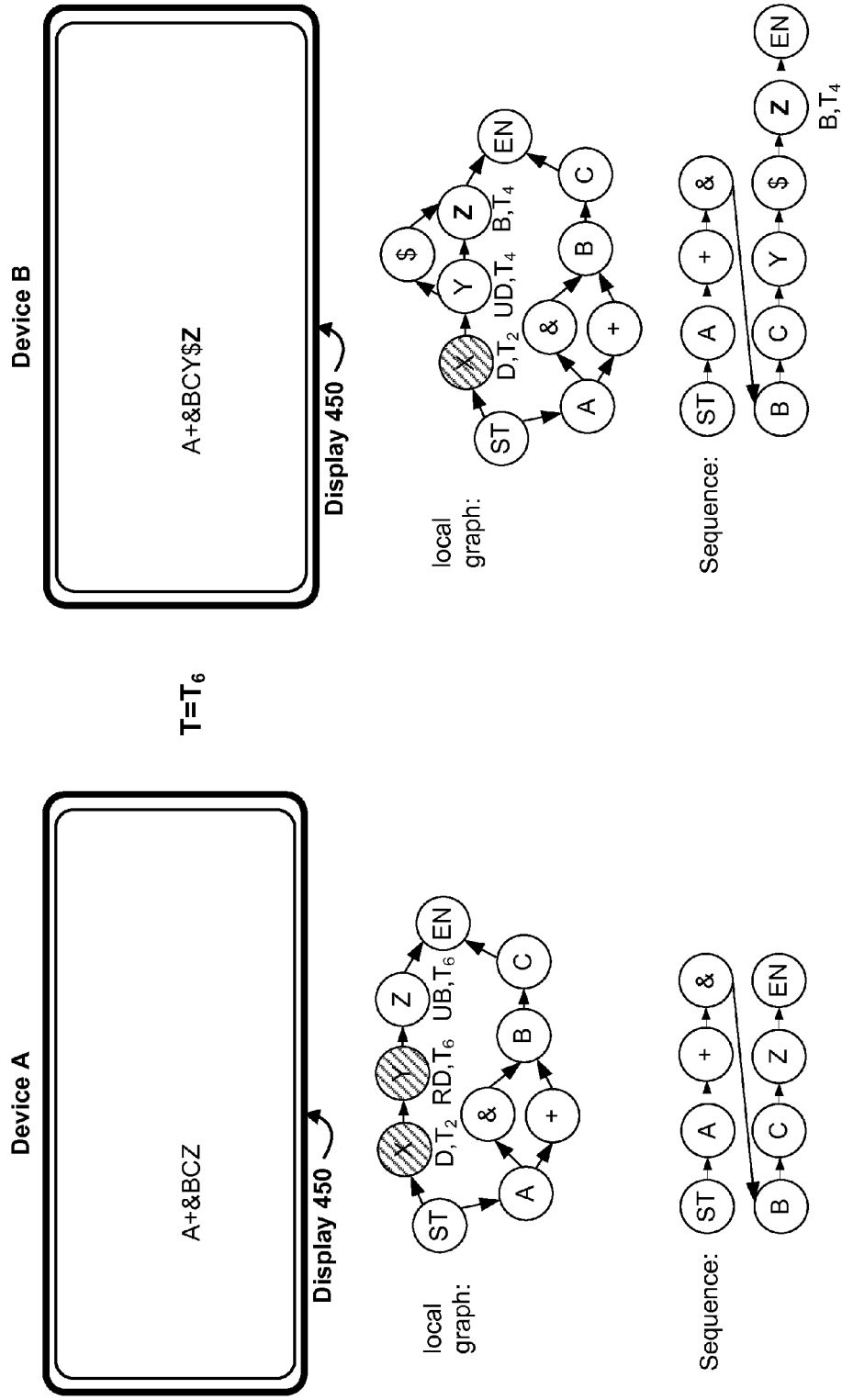

As shown in FIG. 5G, during a time period $T_5$-$T_6$, before a fourth synchronization event has occurred, the user of Device A has entered a "redo" command to re-delete the previously un-deleted character "Y" again, and un-bolded the previously bolded character "Z". So, Device A displays a modified string "A+&BCZ". The local graph at Device A is updated to include the local changes made to the string. The user of Device B has inserted a character "$" between the characters "Y" and "Z". So, Device B displays a modified string "A+&BCY$Z". The local graph at Device B is updated to include the local changes made to the string.

Figure 5H:
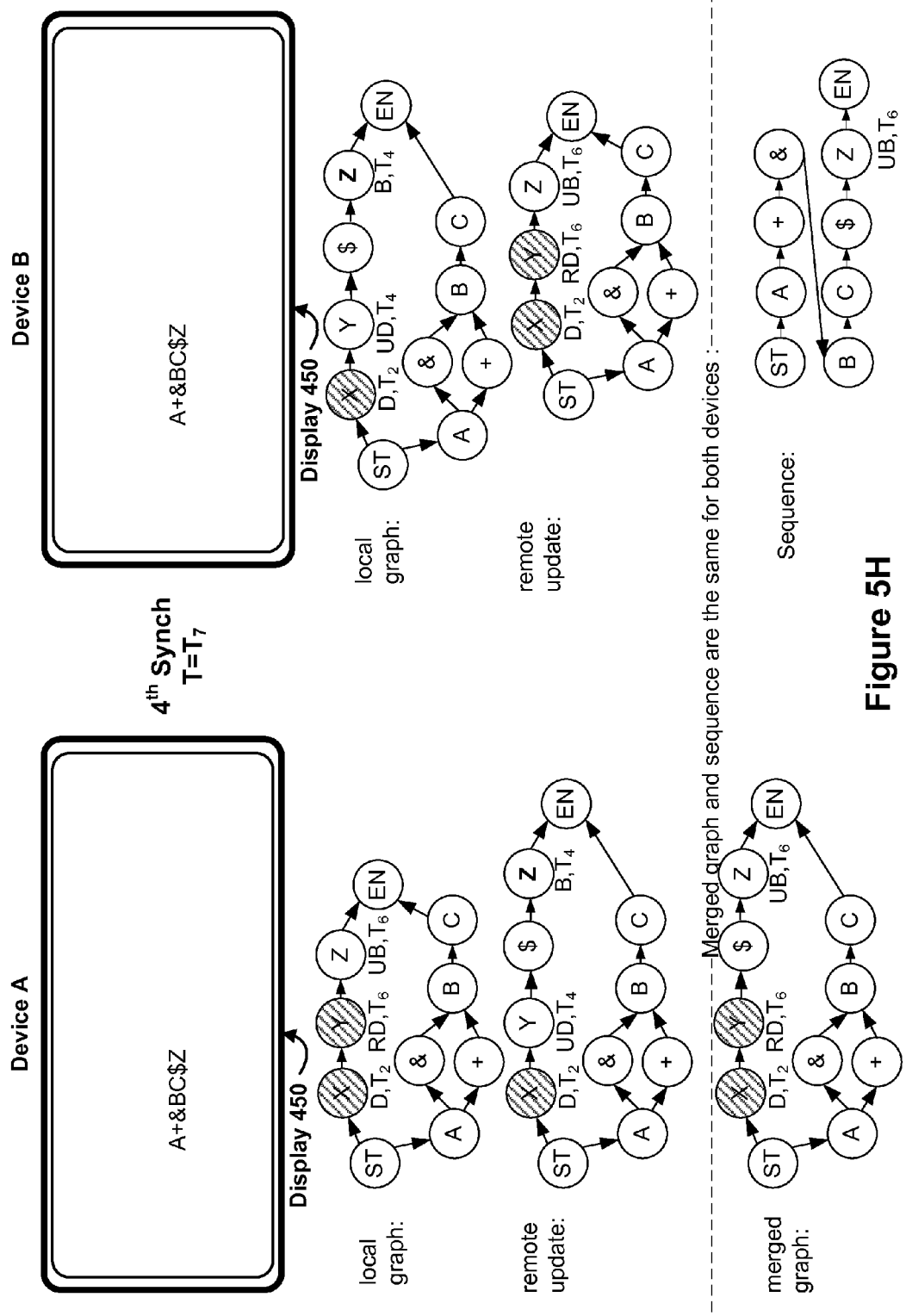

As shown in FIG. 5H, at time $T_7$, the fourth synchronization event occurs. Each of the two collaborating devices obtains the local graph from the other device, and merges the obtained local graph to its own local graph. After the second synchronization event, both devices display a merged string "A+&BC$Z" based on the merged graph. The local graphs at both devices have been synchronized and represent the current state of the content that has been edited by both collaborating devices.

In some embodiments, the process for performing the synchronization events shown in FIGS. 5A-5H is based on the following data structures and rules.

In some embodiments, the problem of synchronization between multiple replicas of the same document is addressed by the use of Commutative Replicated Data Types (CRDT). Commutative Replicated Data Types are data structures where all concurrent operations commute, and thus ensuring eventual consistency without complex control systems. Commutative Replicated Data Types are scalable and fault tolerant, and do not require any special collaboration architecture (e.g., a central server). When two or more versions of the same CRDT data structure are merged, the following properties are observed: Idempotent (A+A=A), Commutative (A+B=B+A), and Associative ((A+B)+C=A+(B+C)), where the "+" sign in the equations represents a merging operation, and A, B, C are different versions of the same CRDT data structure.

The idempotent property of the CRDT data structure ensures that when two identical versions of a document (e.g., two local copies of the document containing identical changes made by two different sources) are merged, the final version of the document is the same as either of the versions that are merged. The commutative property of the CRDT data structure ensures that when two collaborating devices send their local versions of the document to each other, and each collaborating device merges the received version of the document (e.g., the document containing the changes made by the remote device) with its own local version (e.g., document containing local changes), the final version of the document on both devices will be identical. The associative property of the CRDT ensures that the order by which remote versions of the document are merged with the local version of the document will not change the final outcome of the merging when all remote versions are merged with the local version of the document.

A simplest CRDT data structure is an add-only set. For an add-on set, any replica can concurrently add members to the set. The merge operation is simply a union of the sets. Eventually, once every replica has seen the results of every other replica's addition to the set and merged it, each replica will have the same set.

As disclosed herein, in some embodiments, a CRDT data structure used to track changes made to a document is a directed acyclic graph with a source (e.g., a node labeled "START" or "ST") denoting the start of the document and a sink (e.g., a node labeled "END" or "EN") denoting the end of the document. In some embodiments, the directed acyclic graph includes nodes to represent discrete content objects (e.g., individual text characters, images, drawing/sketch objects, attachments, hyperlinks, handwritten word blocks, etc.) that make up the document. In some embodiments, the directed acyclic graph further includes directed edges that determine the positional ordering relationships between the content objects represented by the nodes. In some embodiments, a node may represent an instance of any of a number of recognized content object types, such as text characters, equations, sketches, images, links, attachments, handwritten word blocks, etc. In some embodiments, a directed edge that links one node to another node indicates that the former spatially proceeds the latter in the document. For example, a textual string including a sequence of two characters (e.g., "AC") can be represented by a basic graph: "START"→"A"→"C"→"END".

The basic case of an add-only graph structure is a CRDT. Any replica can add nodes or edges to the graph without concern of creating a conflict. On merging, the resulting graph is the union of all nodes and edges from the local graphs from all replicas, although some empty or redundant edges may be removed for simplicity.

During editing, in some embodiments, each time a character is inserted into the document, a node representing the character is added to the graph between the nodes defining the location of the insertion (e.g., between the "START" node and the first character node, between two nodes representing the characters adjacent the insertion point on either side, or between the last character node and the "END" node). For example, when a character "B" is inserted between characters "A" and "C", the resulting string is "ABC" and the resulting graph is "START"→"A"→"B-"→"C"→"END", as shown in FIG. 5A.

In some embodiments, in order to track the sources (e.g., the device that first received a particular edit, or the replica that first included the edit) and timing of the edits in the document, each content object (e.g., character, sketch, equation, etc.) is uniquely identified with a unique object identifier. In some embodiments, the unique object identifier of a content object is based on the replica ID (e.g., the device ID (e.g., UUID) of the source device at which the content object was first input by a user). In some embodiments, the unique object identifier of the content object is further based on the local order by which the content object was first input by the user. For example, in some embodiments, a local counter or clock is kept at each collaborating device, and each time a new content object is input locally by a user of the collaborating device, the local counter is incremented or the local order is linked to the current clock value (which increments continuously overtime). In some embodiments, the unique object identifier of the new content object includes the replica ID of the collaborating device and the current value of the local counter or clock. As a result, the content objects entered at each collaborating device have monotonically increasing unique object identifiers based on the order that the content objects were first created at the collaborating device.

In some embodiments, concurrent editing on the same document occurs when two or more collaborating devices have started with the same version of a document, and have made independent changes to that same version of the document before a synchronization event to merge the changes from the different collaborating devices into the same document. The synchronization operations for the same set of changes do not have to start on all collaborating devices at the same time, but the synchronization event is only completed when all collaborating devices have received and merged all changes received locally and all changes received from all other collaborating devices. In some embodiments, each time period between two consecutive synchronization events is associated with a respective synchronization epoch number. In some embodiments, a device optionally indirectly receives the changes made by a collaborating device from a central server, directly from the collaborating device, or indirectly from another collaborating device that is in communication with the collaborating device at which the changes were first made. In some embodiments, the changes are optionally received in the form of the whole local document, or in the form of a representation (e.g., a graph) of the local document from which the document can be reconstructed, or in the form of incremental differences or representations of the incremental differences (e.g., partial graphs with modified nodes and edges) between the current and the most recent versions of the local document.

Sometimes, concurrent editing from different sources affects the same content object or location in the document and thus creates an ambiguity or conflict regarding how the changes should be applied to that content object or location in the document. For example, if two collaborating devices both started with a blank document, then one device (e.g., Device A) receives a string input "ABC" from its user, while the other device (e.g., Device B) receives a string input "XYZ" from its user. When the two changes are merged, there is an ambiguity regarding the order by which the characters in strings "ABC" and "XYZ" should be arranged in the synchronized document.

As disclosed herein, in some embodiments, when merging concurrent changes to the same part of the graph representing a document, parallel paths are created in the graph. For example, in some embodiments, when merging both replicas' data structures together, any new nodes or edges from the remote graph are added to the local graph. In the above example, both devices modified the same part of the graph, namely the edge between the "START" node and the "END" node. As shown in FIG. 5B, under the display of Device A, when merging Device B's local graph into Device A's local graph, a new path ("X"→"Y"→"Z") is added to Device A's local graph between the "START" node and the "END" node. The resulting merged graph includes two parallel paths (e.g., path "ST→XYZ→EN" and path "ST→ABC→EN") representing the two concurrent edits received from the two collaborating devices (e.g., Device A and Device B). Similarly, when merging Device A's local graph into Device B's local graph, a new path ("A"→"B"→"C") is added to Device B's local graph between the "START" node and the "END" node. The resulting merged graph includes two parallel paths representing the two concurrent edits received from the two collaborating devices (e.g., Device A and Device B). In fact, the merged graphs on the two collaborating devices are topologically identical and have exactly the same digital or mathematical representations on the devices. In some embodiments, the communicative property of the graphs (a CRDT data structure) ensures that the merged graphs are identical regardless of the order by which the two local graphs are merged into each other.

As shown in FIG. 5B, the merged graph resulted after the first synchronization event is no longer a linear sequence. In order to transform the merged graph into a linear string for display, in some embodiments, the graph is topologically traversed in a deterministic order based on the unique object IDs of the nodes. As used herein, the expression "unique object identifier of a node" is interchangeable with "unique object identifier of the object represented by the node".

In some embodiments, when two or more parallel paths are encountered after a node in the graph, the order by which the two or more parallel paths are traversed is determined by the ordering of the unique object IDs for the respective set of nodes in the two or more parallel paths. For example, the unique object IDs for the nodes in the path "A→B→C" each include the device ID (e.g., "A") of Device A, and the unique object IDs for the nodes in the path "X→Y→Z" each include the device ID (e.g., "B") of Device B. In some embodiments, the device IDs or replica IDs of the collaborating devices are given a predetermined order, and this order is utilized in the comparison of the lowest unique object IDs present in each of the multiple parallel paths.

In some embodiments, when there is more than one node in a path, the order of two parallel paths is determined by a comparison of the minimum unique object IDs present in each path. For example, among the nodes for "A", "B", and "C", the minimum object ID (e.g., represented by min("A", "B", "C")) is the unique ID of node "A", because the character "A" was the first among the three characters input by the user of Device A. Similarly, among the nodes for "X", "Y", and "Z", the minimum object ID (e.g., represented by min("X", "Y", "Z")) is the unique object ID of node "X", because the character "X" was the first among the three characters input by the user of Device B. In this particular example, the minimum object ID in path "A→B→C" starts with the device ID "A", and the minimum object ID in path "X→Y→Z" starts with the device ID "B". Given the predetermined order for the device IDs, e.g., the device ID "A" precedes the device ID "B", the path "A→B→C" is traversed before the path "X→Y→Z".

In some embodiments, unique object IDs increase monotonically, so that any object added to the graph is ordered after any existing object in the graph. This ensures that the added object will not change the ordering of any branches in the graph by inserting an object with an object ID less than the current minimum object ID on any of the branches. In some embodiments, this is implemented by incrementing the local clock on insertion of each object and also on merging of the graphs during each synchronization event to ensure that the local clock is greater than all object IDs already in the graphs. With such an implementation, any future additions to the graph are guaranteed not to change the lowest object ID of any branch. In some embodiments, the object IDs of new objects all have a leading portion based on a current synchronization epoch number of the synchronization event that has just been completed. Thus, later additions to the graph all have higher epoch numbers which ensures that their object IDs cannot be lower than the object IDs of the existing nodes in the merged graph.

In some embodiments, based on the above ordering rule for parallel paths, the traversal through the merged graph shown in FIG. 5B results in a linear sequence "START-"→"A"→"B"→"C"→"X"→"Y"→"Z"→"END". During the traversal, the first path "A→B→C" is completely exhausted before the second path "X→Y→X" is traversed. The synchronization event is completed with a re-rendering of the objects in the document in accordance with the merged graph, and the ordering of the objects in the document is based on the linear sequence produced by the deterministic traversal of the merged graph. As shown in FIG. 5B, the string "ABCXYZ" is displayed on both collaborating devices at the completion of the first synchronization event.

In some embodiments, when a new node can simply be added between two other existing nodes connected by an existing edge (in other words, the second node is a child of the first node), the new node is simply inserted between the two nodes. This can be done by removing the redundant edge between the two existing nodes and replace it with a new edge leading to the new node and a new edge leading from the new node. As shown in FIG. 5C, when a new character "+" is inserted between the characters "A" and "B" at Device A, a new node representing "+" is inserted between the nodes representing "A" and "B", and the original blank edge is removed from the local graph at Device A. Similarly, when a new character "&" is inserted between the characters "A" and "B" at Device B, a new node representing "&" is inserted between the nodes representing "A" and "B", and the original blank edge is removed from the local graph at Device B. Note that, the object IDs of the new nodes "+" and "&" will both be greater than the object IDs of the existing nodes in the graphs, and neither new node will alter the lowest object ID of the branch in which the new node is inserted. This ensures that the order by which the different paths are traversed will not change by the insertions of new nodes into the graph.

In some embodiments, the insertion between two existing objects is not a simple case when the second object is not a direct child of the first object in the graph. In other words, the two objects are only adjacent in the document because the first object is the last node in a first branch while the second object is the first node in a second branch that is traversed immediately after the first branch. In such a scenario, if a new object is to be inserted between the first object and the second object in the document, the node representing the new object is inserted after the node representing the first object, without creating a direct link between the node representing the first object and the node representing the second object in the graph.

In some embodiments, deletion of objects in the document is handled by labeling each node corresponding to a deleted object with a "deleted" status for a visibility attribute of the node. The "deleted" status is also referred to as a "tombstone". A "tombstoned" or "deleted" status attached to a node indicates that the node should not be included in the rendering of the document; however, the node labeled with the "deleted" status is still considered during merging of graphs and during traversal of graphs. For example, if a new object is to be inserted between a first object and a second object in the document, but the first object has been deleted by another user before the merging, the node representing the new object is inserted after the first object nonetheless. In another example, the object ID of a "deleted" object is considered when determining the minimum object ID among all nodes in a branch, so the ordering of the branches in the graph remains the same regardless of whether the node with the minimum object ID in any of the branches has been deleted. In some embodiments, a node with a "deleted" status is skipped during the traversal of the graph, so that the linear sequence obtained through the traversal of the graph does not include any "deleted" node, and the rendering of the document based on the linear sequence also does not include any "deleted" node. In some embodiments, a merging solution for "deleted" nodes is that, if an object/node has a "deleted" status in any of the local graphs before merging, the object/node maintains that "deleted" status in the merged graph.

As shown in FIG. 5C, the local graph at Device A shows the insertion of a node for "+" and a "deleted" status for node "Y", and the local graph at Device B shows the insertion of the node for "&" and the deleted status for node "X". The ordering of the two branches in the graphs during the respective traversal of the local graphs at Device A and Device B is not altered by the insertion or the deletion of nodes in the graphs. The deleted nodes (e.g., "X" and "Y") are not rendered in the local versions of the document, as shown in FIG. 5C.

As shown in FIG. 5D, when merging the local graphs from Device A and Device B, the nodes with the "deleted" statuses in either graph (e.g., node "Y" in the local graph of Device A, and node "X" in the local graph of Device B) maintain their respective "deleted" statuses in the merged graph after the second synchronization event. In addition, the merging of the independent insertions by Device A and Device B between nodes "A" and "B" created two parallel paths, one path passing through the node for "+" and the other path passing through the node for "&". Between the two new parallel paths located after node "A", the path including node "+" has a lower minimum object ID than the path including node "&", because the two nodes have the same epoch sequence number in their object IDs, and the device ID portion (e.g., "A") of the object ID for node "+" precedes the device ID portion (e.g., "B") of the object ID for node "&" in accordance with the predetermined order for Device IDs. Therefore, during the traversal of the merged graph shown in FIG. 5D, the path including node "+" is traversed first, before the path including node "&" is traversed. Consequently, the character "+" appears in front of the character "&" in the document after the second synchronization event is completed.

In some embodiments, a branch (also referred to as a "path") in a graph sometimes has sub-branches (also referred to as "sub-paths") emerging from a node in the branch. As disclosed herein, in some embodiments, from a source node, two outgoing edges are sorted by comparing the minimum object IDs on any path (including sub-paths) from the edge to the sink of the original source node. The following example graph patterns are illustrative:

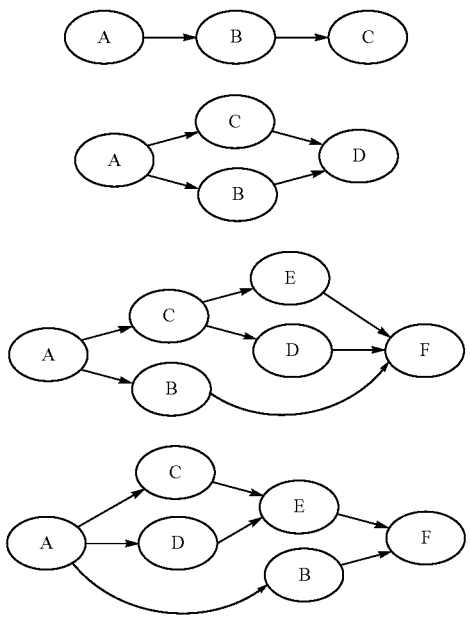

A

B

C

D

In the example pattern A above, only a single path exists, the nodes are traversed according to their order in the path. In the example pattern B above, two paths exist, neither includes any sub-path. In the example pattern B, object IDs of node C and node B are compared, and the path with the lowest object ID is traversed first. In the example pattern C above, two main paths exist between the source node "A" and the sink node "F". One of the two main paths includes two sub-paths. In order to sort the two edges A→C and A→B, the minimum object ID existing among the nodes in the first main path (e.g., nodes "C", "D", and "E" in the upper path) is compared to the minimum object ID existing among the node(s) in the second main path (e.g., node "B" in the lower path). During the traversal of the main path that passes node "C", in order to sort the two edges C→E and C→D, the object IDs of node "E" and node "D" are compared. In the example pattern D, two main paths exist between the source node "A" and the sink node "F." One of the two main paths includes two sub-paths. In order to sort the two edges A→C and A→D against the edge A→B, the minimum object ID existing among the nodes in the first main path (e.g., nodes "C", "D", and "E" in the upper path) is compared to the minimum object ID existing among the node in the second main path (e.g., node "B" in the lower path). In order to sort the two edges A→C and A→D, the object IDs of node "C" and node "D" are compared.

In some embodiments, the sorting of the nodes in the graph is done in linear time by a recursive traversal of the graph. The more complex patterns (e.g., the example pattern D above) are sorted by iteratively stably sorting the edges until all edges end at the same sink. In the example of patter D above, first edge A→C is sorted relative to edge A→D, then edges A→C and A→D are sorted relative to edge A→B. The stable sorting ensures that the relationship between edge A→C and edge A→D is maintained.

In some embodiments, an "undo" operation is implemented for the collaborating editing environment. In some embodiments, on undoing a deletion of an object (also referred to as "un-deleting" the object), the same object and corresponding object ID need to be restored in the graph; otherwise, the "undo" operation would not result in a document that is the same as before the deletion. In a simple example document with a string "AB", when one replica (e.g., the replica at Device A) deletes the string "AB" and another replica (e.g., the replica at Device B) adds a character "Z" between "A" and "B". The relevant portion of the local graph at Device B is updated to A→Z→B. After the merge, if the first replica (e.g., the replica at Device A) simply undid the deletion by adding the deleted string "AB" back to the document, the resulting string would be A→B→Z, which is not a "real" undo of the previous deletion.

In some embodiments, to handle the "undo" operation properly, the "deleted" status or "tombstone" is made reversible. On deletion of an object, the object is given a "deleted" status, and the "deleted" status is given a timestamp in accordance with the deletion time. Then, on an "undo" of the deletion, the "deleted" status of the object is replaced with an "un-deleted" status, and the "un-deleted" status is given a timestamp in accordance with the undo time. In some embodiments, the timestamp of the "un-deleted" status is simply incremented by a certain predetermined amount from the timestamp of the "deleted" status. In an actual implementation, the "deleted" and "un-deleted" statuses are two possible values of a "visibility" attribute, and the timestamp associated with the "visibility" attribute is updated according to the time that a corresponding deletion or "undo" operation is performed. In some embodiments, before changing the value of the "visibility" attribute for a particular object, the device first determines what the previous local operation performed by the user was, and if the previous operation was a deletion of the object, the "undo" operation undoes the deletion of the object by changing the value of the "visibility" attribute of the object to "un-deleted".

In some embodiment, when merging (e.g., merging a local delete/un-delete operation to a local graph or merging two local graphs with different visibility statuses for the same object), whether an object should be "tombstoned" (e.g., having the value of its visibility attribute changed to or kept as "deleted") is determined based on a deleted/un-deleted status of that object that has the latest timestamp in all of the graphs/operations that are being merged. In some embodiments, a new object has a default value of "visible" or "un-deleted" when it is first created in the document.

In some embodiments, a "redo" operation is handled similarly as the "undo" operation. For example, after undoing a deletion of an object, by redoing the deletion, the value of the "visibility" attribute of the object is changed from "un-deleted" to "re-deleted", and the timestamp associated with the value of the "visibility" attribute is incremented in accordance with the time of the "redo" operation.

FIGS. 5A-5F illustrate an example process for deleting the characters "X" and "Y" and followed by undoing the deletion of the character "Y" and then redoing the deletion of the character "Y", where a reversible "visibility" attribute is used to implement deletion, "undo" of a deletion, and "redo" of an un-deletion.

As shown in FIG. 5A, when the characters X and Y are added locally at Device B, Device B adds the nodes for "X" and "Y" in the local graph at Device B. As shown in FIG. 5B, nodes "X" and "Y" are added into the updated local graph at device A after the first synchronization event. As shown in FIG. 5C, at time $T_2$, the character "Y" is deleted at Device A, and accordingly, node "Y" is given a "deleted" status with a timestamp corresponding to $T_2$ in the local graph at Device A. In addition, the character "X" is deleted at Device B, and accordingly, node "X" is given a "deleted" status with a timestamp corresponding to $T_2$. As shown in FIG. 5D, during the second synchronization event, when merging the local graphs from the two devices, node "X" and node "Y" both kept their respective "deleted" statuses, because the "deleted" status for each node has a timestamp that is later than the respective earlier timestamp given to the node when the node was first created (e.g., a timestamp given according to $T_0$).

As shown in FIG. 5E, after the deletion of the character "Y", an "undo" operation is performed at Device A. Since the last local operation performed at Device A was the deletion of the character "Y", the "undo" operation will undo the deletion of the character "Y". As shown in FIG. 5E, the "deleted" status of node "Y" is replaced by an "un-deleted" status in the local graph at Device A, and the associated timestamp is incremented in accordance with the time of the "undo" operation (e.g., $T_4$). Note that, the "deleted" status and corresponding timestamp (e.g., a timestamp given according to $T_2$) for node "Y" is not changed in the local graph at Device B, because no local operation has been performed on the deleted character "Y" at Device B since its deletion. As shown in FIG. 5F, during the third synchronization event, when merging the local graphs from the two devices, the "un-deleted" status of node "Y" in the local graph of Device A trumps the "deleted" status of node "Y" in the local graph of Device B, because the "un-deleted" status of the node "Y" has a timestamp (e.g., a timestamp given according to $T_4$) that is later than the timestamp given to the "deleted" status of the node "Y" (e.g., a timestamp given according to $T_2$).

As shown in FIG. 5G, after the deletion of the character "Y", a "redo" operation is performed at Device A. Since the last local operation performed at Device A was the un-deletion of the character "Y", the "redo" operation will redo the deletion of the character "Y". As shown in FIG. 5G, the "un-deleted" status of node "Y" is replaced by a "re-deleted" status in the local graph at Device A, and the associated timestamp is incremented in accordance with the time of the "redo" operation (e.g., $T_6$). Note that, the "un-deleted" status and corresponding timestamp for node "Y" is not changed in the local graph at Device B, because no local operation has been performed on the un-deleted character "Y" at Device B since its un-deletion. As shown in FIG. 5H, during the fourth synchronization event, when merging the local graphs from the two devices, the "re-deleted" status of node "Y" in the local graph of Device A trumps the "un-deleted" status of node "Y" in the local graph of Device B, because the "re-deleted" status of node "Y" has a timestamp (e.g., a timestamp given according to $T_6$) that is later than the timestamp given to the "un-deleted" status of the node "Y" (e.g., a timestamp given according to $T_4$).

In some embodiments, style changes are implemented using attributes as well. Each style has a corresponding attribute, and the attribute takes on one of two or more different values at any given time. In addition, in some embodiments, each attribute has a corresponding timestamp in accordance with the time that the attribute is given its current value. When merging a new change to a local graph, or when merging two local graphs, the value of same attribute on the same node is updated in accordance with the attribute value that is associated with the latest timestamp. In other words, in some embodiments, styling is handled via a "last-write-wins" setting of object attributes (e.g., text attributes such as font size, font, italicize status, underline status, bold status, etc.). In some embodiments, all attributes on the same node uses the same timestamp, and when different replicas make different style changes on the same node, only style change from one of the replicas that has the latest timestamp is applied in the merged document. In some embodiments, each attribute is given its own timestamp, and when different replicas make different style changes on the same node, all of the style changes are applied in the merged document. If more than one replica makes changes to the same style, then only the change from one of the replicas that has the latest timestamp for that style change is applied in the merged document.

In some embodiments, "undo" and "redo" operations are applied to a local style change as well. On an "undo" operation following a local style change, the value of the attribute for the changed style is reversed to its original value before the style change, and the timestamp associated with the attribute is updated in accordance with the time of the "undo" operation. On a "redo" operation following the "undo" operation, the value of the attribute for the changed style is reset to the changed value, and the timestamp associated with the attribute is updated in accordance with the time of the "redo" operation.

FIGS. 5E-5H illustrate an example process for applying a style change (e.g., bolding) to a character (e.g., "Z") at one replica (e.g., Device B), and subsequently applying another style change (e.g., un-bolding) to the same character (e.g., "Z") at another replica (e.g., Device A).

As shown in FIG. 5E, the character "Z" is bolded at Device B, and in the local graph, the value of the corresponding style attribute (e.g., the "bold status" attribute) is changed from "un-bolded" to "bolded", and the timestamp associated with the style attribute (e.g., the "bold status" attribute) is updated according to the time of the style change (e.g., $T_4$). As shown in FIG. 5F, during the third synchronization event, when merging the local graphs from Device A and Device B, the attribute value "bolded" is given to the "bold status" attribute in the merged graph, because the "bolded" attribute value has a timestamp that is later than the timestamp given to node "Z" when the node was first created with the default "un-bolded" attribute value for the "bold status" attribute.

As shown in FIG. 5G, at time $T_6$, the character "Z" is un-bolded again at Device A, and in the local graph, the value of the corresponding style attribute (e.g., the "bold status" attribute) is changed from "bolded" to "un-bolded", and the timestamp associated with the style attribute (e.g., the "bold status" attribute) is updated according to the time of the style change (e.g., $T_6$). As shown in FIG. 5H, during the fourth synchronization event, when merging the local graphs from Device A and Device B, the attribute value "un-bolded" is given to the "bold status" attribute of node "Z", because the "un-bolded" attribute value has a timestamp (e.g., a timestamp given according to $T_6$) that is later than the timestamp given to node "Z" when the character "Z" was last bolded (e.g., a timestamp given according to $T_4$).

In some embodiments, during a synchronization event, the entireties of the local graphs are sent between collaborating devices as the basis for generating the merged graph at each collaborating device. This is advantageous when the network connectivity is unreliable, and ensuring that full local graphs are received reduces the likelihood of inconsistencies and errors. In some embodiments, only individual changes made to the local graphs are sent between collaborating devices. By sending only the changes to the local graphs (e.g., the baseline local graph is same as the merged graph obtained from the last synchronization event), the synchronization can happen faster and more frequently which is particularly suitable for real-time collaboration scenarios.

In some embodiments, fragments of the graph are archived and merged into other versions of the graph. For example, a single object (e.g., a single character) added in a document is archived as a fragment of the full graph, and the archive contains any parent object IDs, edges to the new object, and children object IDs. Delta changes can be generated from a provided timestamp, which enable to collaborating devices to exchange timestamps to compare differences and then exchange delta changes.

In some embodiments, until a string is serialized for merging with another string, any local edits can be renamed. Until serialization, any new changes or characters are given timestamps or unique IDs using a special replica ID. On serialization for merging, these identifiers with the special replica ID are updated to use the correct replica ID (e.g., device ID). This allows the IDs to be changed locally to optimize run-length encoding as late as possible.

Although many of the example scenarios are describe in terms of text characters as objects in the document, in some embodiments, the actual implementation run-length encodes ranges of strings. Since IDs of characters that are typed as sequential, they can be stored as an initial ID and a length. This may reduce the in-memory and archive size of the CRDT data structures (e.g., the graphs).

In some embodiments, an optimization for improved run-length encoding (RLE) is to loosen the character ID requirements. Instead of inserting characters that are ordered after than all characters already in the document, what is really needed is only to ensure that an inserted character has an ID that is ordered after the IDs of the characters on either side of the new character. This way, monotonicity of character IDs is still maintained. This implementation meets the topological sorting requirements but ensures that fewer jumps in character IDs that break the RLE are required. In some embodiments, this implementation improves performance in scenarios where two users are typing alternate characters. For example, previously, each user's character would be ordered after the other, so that a single user's character IDs would look something like "A5, A7, A9 . . . " which does not compress with RLE.

FIGS. 6A-6P illustrate how collaborative editing in a sketch is achieved in accordance with some embodiments. A sketch is a type of content object that is made up of different components, and each component is added to the sketch by a corresponding drawing command. In some embodiments, a corresponding drawing command is used to create a component (e.g., to draw a line, a circle, or any other shape, by simply drawing on a canvas using a currently selected drawing tool (e.g., a pencil, a marker, etc.)). In some embodiments, a corresponding drawing command is used to add a preset shape (e.g., a circle, a triangle, a line, a dot, etc.) to a document (e.g., by using a predefined gesture for the shape (e.g., a gesture with two contacts separated at a user-specified distance to define a radius of a circle or a diagonal of square)). In some embodiments, a corresponding drawing command is used to fill a shape in the sketch with a preset fill color (e.g., to fill a circle with a red color, to fill Christmas tree shape with a green color, etc.). In some embodiments, a corresponding drawing command is used to add a preset content object (e.g., a selected clip art, a green hat, a red circle, a copy of an existing component in a sketch, etc.) to the sketch. In some embodiments, a corresponding drawing command (e.g., a "delete" command) is used to delete an existing component from the sketch. In some embodiments, a corresponding drawing command (e.g., an "erase" command) is used to erase one or more pixels in the sketch. In some embodiments, a corresponding drawing command is used to change a characteristic or overall attribute of an existing component (e.g., to change a transparency of a filled circle) in the sketch. In some embodiments, a corresponding drawing command is used to move an existing component in the sketch. In some embodiments, a corresponding drawing command is used to resize an existing component in the sketch. In some embodiments, a corresponding drawing command (e.g., an "undo" command) is used to undo another drawing command that was issued immediately prior to the "undo" command. In some embodiments, after issuing an "undo" command, a corresponding drawing command (e.g., a "redo" command) is used to redo the drawing command that was issued immediately prior to the "undo" command and that was canceled by the "undo" command. In some embodiments, a corresponding drawing command (e.g., an "erase all" command) is used to erase all existing components in the sketch. Other drawing commands are possible.

In some embodiments, regardless of how complex or simple a component may be in a sketch, the component is unitary and indivisible and is only added or removed as a whole using a corresponding drawing command. Each sketch is a rendering of a sequence of drawing commands. The exact appearance of the final sketch is dependent on the order of the drawing commands in the drawing command sequence. For example, a later drawing command may modify an area of the sketch that was previously covered by a component created by an earlier drawing command.

In some embodiments, when two or more devices collaboratively edit the same sketch concurrently, there is an ambiguity in the order of the drawing commands for rendering the final appearance of the sketch. In some embodiments, sorting the drawing commands from all of the collaborating devices in accordance with the exact chronological order of the drawing commands based on a common clock shared by the collaborating devices can have a number of drawbacks. First, not all of the collaborating devices may be online at the same time and real-time merging and sorting of the drawing commands may not be possible. In addition, by merging and sorting the drawing commands based on exact chronological order, drawing commands from different collaborating devices are more likely to be interlaced finely, causing unexpected final appearance of the sketch. As described in the following example, when two or more collaborating devices modify the same sketch, the drawing command received from the different collaborating devices are merged and sorted based on a modified chronological order, as opposed to exact chronological order.

In some embodiments, the modified chronological order is an order based on the respective command sequence numbers of the drawing commands received from the different collaborating devices. In some embodiments, the command sequence number of a drawing command includes at least three parts: (1) a device identifier for a device at which the drawing command was first received, (2) a primary local sequence number representing a local synchronization epoch during which the drawing command was first received, and (3) a secondary local sequence number representing an order of the drawing command within the local synchronization epoch.

In some embodiments, the device identifier for a respective collaborating device is a unique identifier that identifies the device. In some embodiments, the device identifiers of the different collaborating devices have a deterministic order. For example, the respective Universal Unique Identifiers (UUIDs) of each collaborating device may be used as the unique device identifier in the respective command sequence numbers of the drawing commands from that collaborating device. The device identifiers of different collaborating devices have a deterministic order in accordance with a predetermined ordering rule. In some embodiments, other types of unique identifiers can be used as the device identifiers, e.g., IP addresses, device serial numbers, etc., device names, as long as the device identifiers of all of the collaborating devices involved in the editing of the same sketch have a deterministic order and can be sorted deterministically into a sequence based on a predetermined ordering rule.

In some embodiments, a local synchronization epoch is represented by a number that is incremented each time a local synchronization epoch is completed on a respective collaborating device. In some embodiments, a local synchronization epoch at a collaborating device does not always start and/or end at the same time that a synchronization event among all of the collaborating devices starts or ends. In fact, the same synchronization event may cause the local synchronization epoch number(s) to be incremented at some of the collaborating devices, while leaving the local synchronization epoch number(s) unchanged at others of the collaborating devices. In some embodiments, this "unsynchronized" updating of local synchronization epoch numbers in the command sequence numbers of drawing commands from multiple collaborating devices is one reason for the reduced interlacing effect produced by the merging and sorting of the drawing commands from the multiple collaborating devices during a synchronization event.

In some embodiments, for each device of the multiple collaborating devices, during each local synchronization epoch of the device, one or more drawing commands may be received locally at the device (e.g., from the user of the device) and one or more drawing commands may be received from each of the other remote collaborating devices. In some embodiments, a local synchronization epoch at a first device of multiple collaborating devices is defined as follows: when the last drawing command in all of the drawing commands received during a synchronization period was received first at a collaborating device other than the first device (e.g., the last drawing command was first received locally at a remote device and sent to the first device from the remote device during the current synchronization event), a next local synchronization epoch is started at the first device after the current synchronization event. In some embodiments, starting the next local synchronization epoch at the first device includes: incrementing the primary local sequence number for one or more subsequent drawing commands locally received at the first device.

In some embodiments, for drawing commands received locally at a respective collaborating device (e.g., drawing commands that are directly issued by the user of the collaborating device), a common primary local sequence number is assigned to each drawing command that was received locally during a respective local synchronization epoch.

In some embodiments, a secondary local sequence number is given to each drawing command received locally at a respective device. In some embodiments, during each local synchronization epoch, the secondary local sequence numbers increase monotonically. In other words, the secondary local sequence number given to each new drawing command received locally at the device is greater than the secondary local sequence numbers given to all earlier drawing commands locally received at the device during the current local synchronization epoch. In some embodiments, the secondary local sequence number is restarted at the beginning of each local synchronization epoch (e.g., when the primary local sequence number is incremented). In some embodiments, the secondary local sequence numbers for locally received drawing commands increase monotonically at the device regardless of the local synchronization epoch in which each of the drawing commands was received. In some embodiments, starting the next local synchronization epoch at a first device includes: incrementing the primary local sequence number for a subsequent drawing command locally received at the first device; and restarting the secondary local sequence number for the subsequent drawing command locally received at the first device. In some embodiments, the secondary local sequence number is not restarted, and instead, continues to be incremented through all local synchronization epochs at the first device.

In some embodiments, during each synchronization event, drawing commands received locally at a given device and drawing commands received locally at each of the other collaborating devices remote from the given device are merged and sorted in accordance with the unique command sequence numbers of all of the drawing commands. In some embodiments, merging and sorting each individual new drawing command and one or more past drawing commands in the command sequence are carried out in accordance with an ordering rule. In some embodiments, the ordering rule gives more significance to the primary local sequence number than the device identifier, and gives more significance to the device identifier than to the secondary local sequence number when comparing command sequence numbers during the sorting of the drawing commands.

In some embodiments, merging and sorting a new drawing command into an existing command sequence includes updating a status of an attribute associated with an existing drawing command in the command sequence based on the new drawing command without inserting the new drawing command into the command sequence. In some embodiments, merging and sorting a new drawing command into an existing command sequence includes finding an insertion location for the drawing command in the command sequence based on the command sequence numbers of the new drawing command and existing drawing commands in the command sequence, and inserting the new drawing command at the identified insertion location.

FIGS. 6A-6P illustrate exemplary user interfaces and changes made to backend data structures for collaborative sketch editing in accordance with some embodiments. The user interfaces and changes made to the backend data structures in these figures are used to illustrate the effect of the processes described below, including the processes in FIGS. 7B, 9A-9C, and 10A-10F. Although only two collaborating devices are shown in the following example. The principles illustrated herein are applicable to the sorting and merging of drawing commands from more than two sources in the scenario of multi-device collaborative sketch editing.

As shown in FIG. 6A, in some embodiments, the basic merging and sorting of drawing commands from two collaborating devices (e.g., Device A, and Device B) are based on straight forward comparisons of the unique command sequence numbers of the drawing commands received from the two sources. In some embodiments, the comparisons are based on the predetermined ordering rule that compare the three components (e.g., device ID, primary local sequence number, and secondary local sequence number) of the command sequence numbers. In some embodiments, the comparisons of command sequence numbers afford the highest significance to the comparison of primary local sequence numbers, less significance to the comparison of device IDs, and the least significance to the comparison of secondary local sequence numbers in the command sequence numbers.

In the example shown in FIG. 6A, the device ID for drawing commands locally received at Device A is "A" and the device ID for drawing commands locally received at Device B is "B". A predetermined ordering rule provides that "A" precedes "B". In addition, in the scenario shown in FIG. 6A, the first synchronization event has occurred at time $T_1$ after two drawing commands have been received at Device A, and one drawing command has been received at Device B. Suppose that the local synchronization epoch on both devices starts from "1". As such, the primary local sequence numbers for the two drawing commands received locally at Device A is "1", and the primary local sequence number for the one drawing command received locally at Device B is also "1". Since the secondary local sequence number of a drawing command reflects the local order of the drawing command received locally during a given local synchronization epoch, the secondary local sequence numbers for the two drawing commands received locally at Device A are "1" and "2", respectively. Similarly, the secondary local sequence number for the single drawing command received locally at Device B is "1". In some embodiments, each command sequence number is constructed from its three parts in an order of decreasing significance. In the example shown in FIG. 6A, the command sequence numbers for the first two drawing commands received locally at Device A are "1A1" and "1A2", respectively. The command sequence number for the single drawing command received locally at Device B is "1B1".

FIG. 6A also illustrates that, before the first synchronization event is completed, the local command sequence of each device includes the drawing commands received locally at the device, and each new drawing command received locally at the device is merged into the local command sequence as it is received. The rule by which the new drawing command is merged into the local command sequence is no different from the rule used to merge a new drawing command received from a remote source during a synchronization event. In fact, the order by which multiple drawing commands are evaluated for merging and insertion into an existing command sequence do not alter the result command sequence obtained when all of the multiple drawing commands have been properly merged and sorted into the existing command sequence.

As shown in FIG. 6A, during the first synchronization event occurring at $T_1$, the local command sequence at Device A includes "1A1→1A2", and a new drawing command received from Device B is "1B1". When merging the new drawing command into the existing local command sequence based on the predetermined ordering rule, the new drawing command "1B1" is inserted after the last drawing command "1A2" in the existing local command sequence at Device A, because the primary local sequence numbers are the same, and the device ID part of "1A2" precedes the device ID part of "1B1". The resulting merged local command sequence at Device A is "1A1→1A2→1B1". At device B, the local command sequence is "1B1". When merging the new drawing commands received from Device A, first "1A1" is inserted before "1B1" because the device ID part of "1A1" precedes the device ID part of "1B1". Then, the new drawing command "1A2" is inserted after "1A1" and before "1B1" in the updated local command sequence "1A1→1B1", because the secondary local sequence number part of "1A1" precedes the local sequence number part of "1A2" and the device ID part of "1A2" precedes the device ID part of "1B1". The resulting merged local command sequence at Device B is also "1A1→1A2→1B1". The merging and sorting of drawing commands are thus completed for the first synchronization event.

Figure 6B:
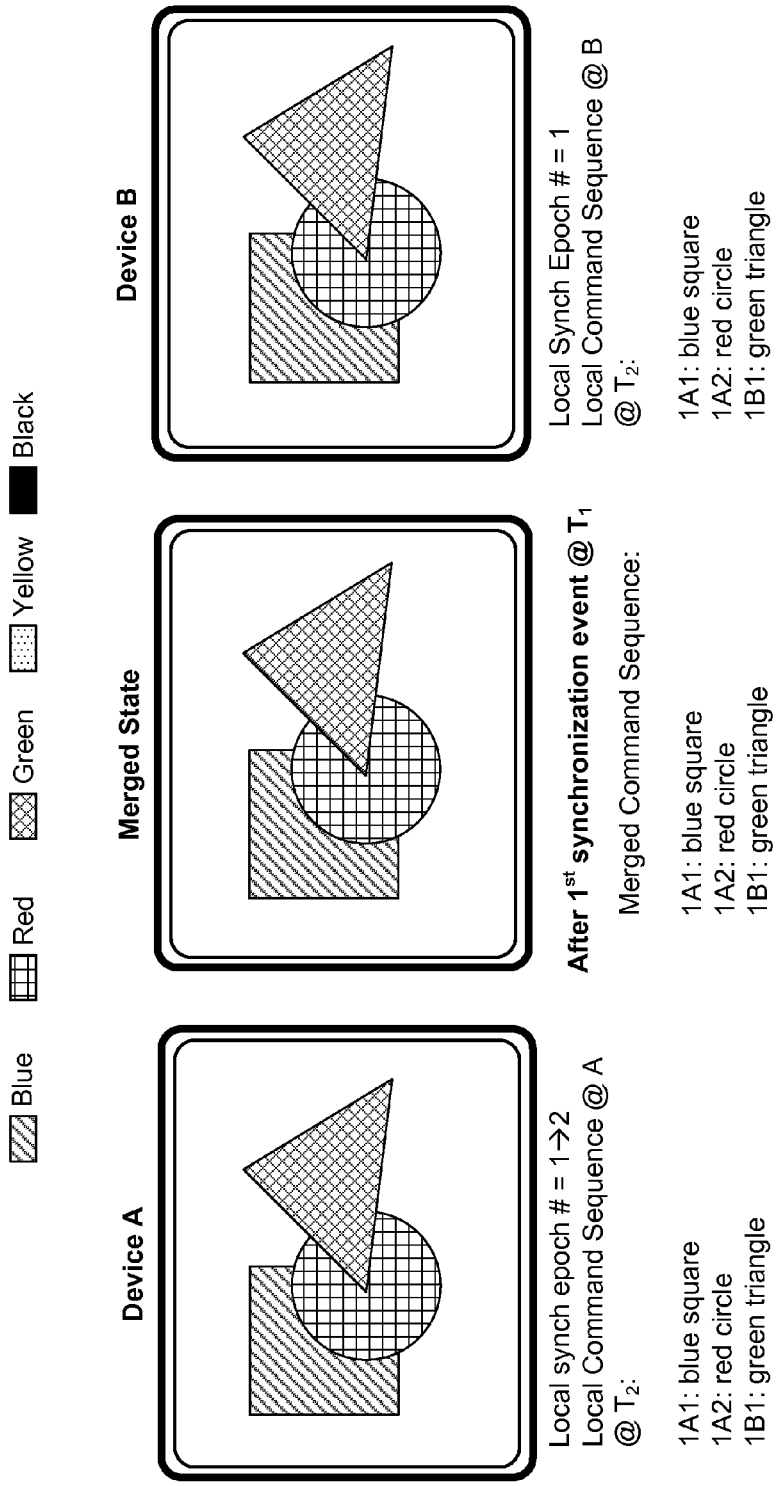
FIGS. 6A-6P illustrate exemplary user interfaces for providing collaborative document editing (e.g., collaborative sketch editing) in accordance with some embodiments.
Figure 7A:
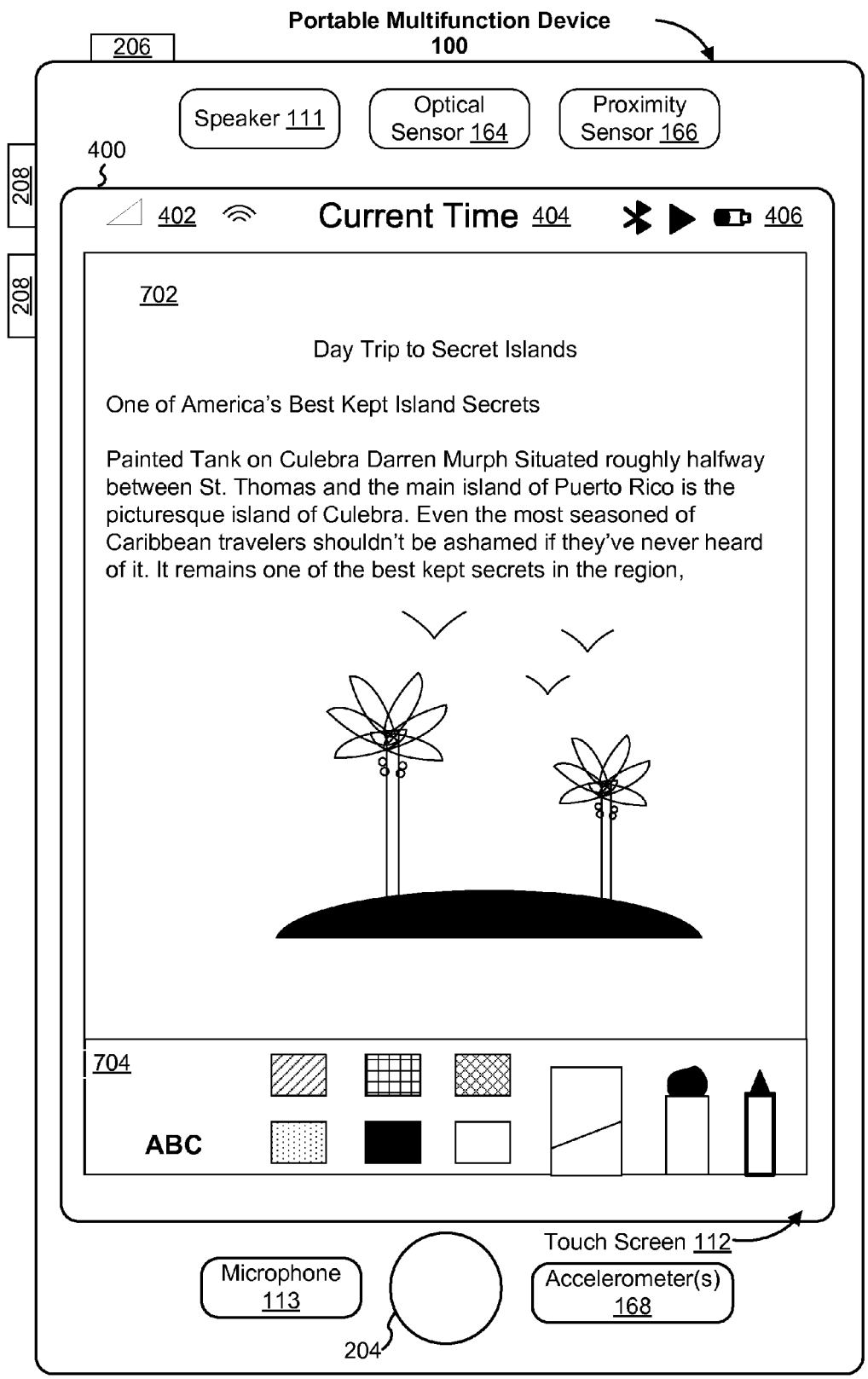
FIG. 7A illustrates an exemplary user interface for providing collaborative document editing (e.g., collaborative mixed text and sketch editing) in accordance with some embodiments.
Figure 7B:
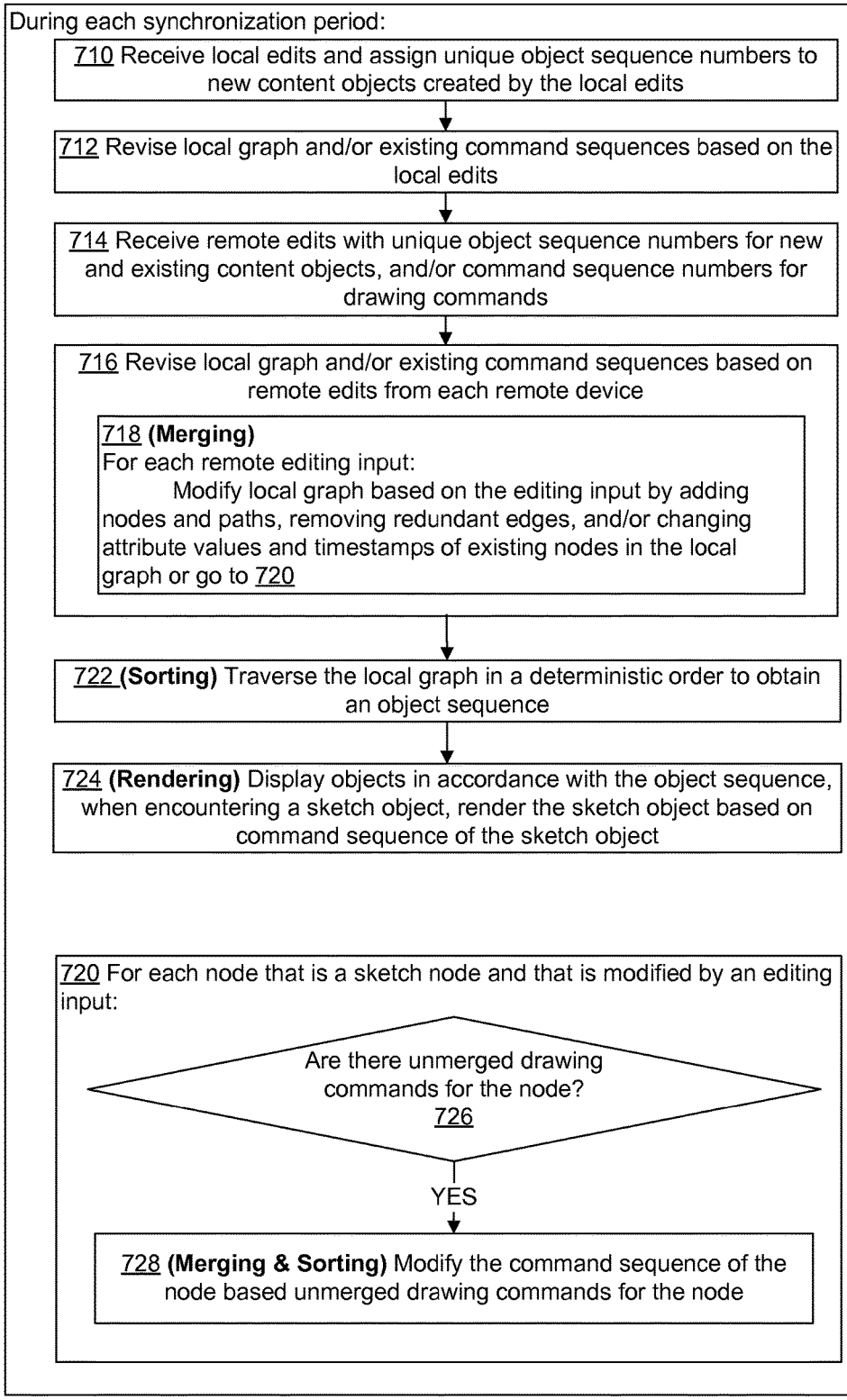
FIG. 7B is a flow diagram illustrating a method of providing collaborative document editing (e.g., collaborative mixed text and sketch editing) in accordance with some embodiments.
Figure 8A:
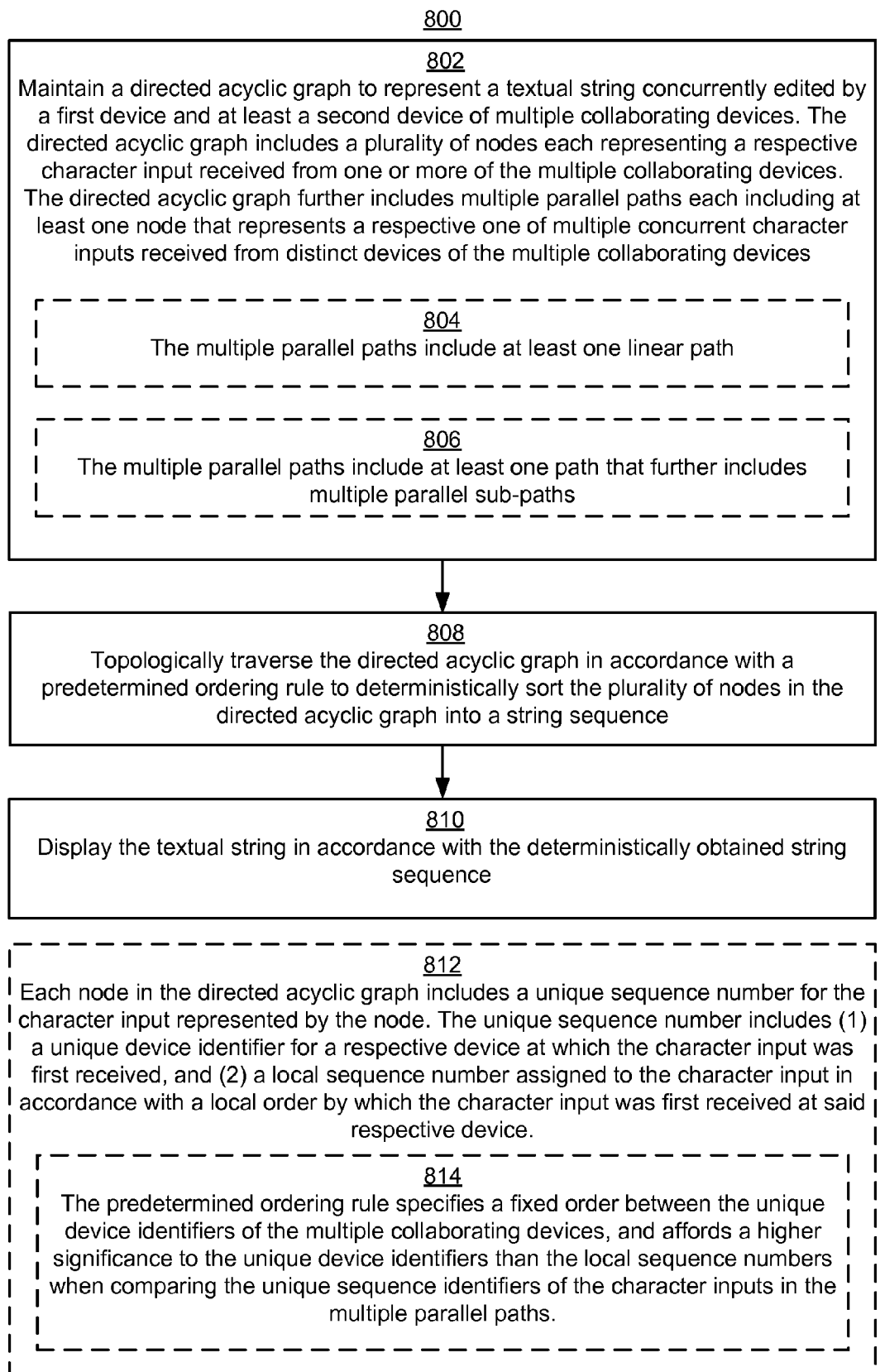

As shown in FIG. 6B, at time $T_2$, after the first synchronization event that occurred at $T_1$, the local command sequence at Device A and the local command sequence at Device B are identical, and include three drawing commands in a sequence of "1A1→1A2→1B1". The sketch on each of the two devices is updated in accordance with this new local command sequence. For example, as shown in FIG. 6B, first a blue square (1A1) is drawn, then a red circle (1A2) is drawn, and in the end a green triangle (1B1) is drawn. Each drawing command modifies the drawing canvas, and if multiple drawing commands affect the same pixel location on the drawing canvas, the last drawing command wins during the rendering process. For example, as shown in FIG. 6B, the red circle covers part of the blue square, and the green triangle covers part of the red circle.

In addition to the updates made to the local command sequences at the collaborating devices, the local epoch number for at least one of the collaborating devices is also updated at the completion of the first synchronization event. In some embodiments, if the last drawing command in the updated command sequence is not a locally received drawing command for a device, the local epoch number for the device is incremented at the completion of the synchronization event. In the example shown in FIG. 6B, the last drawing command in the updated command sequence after the first synchronization event at $T_1$ is "1B1", and it was not locally received at Device A, therefore, the local synchronization epoch number at Device A is incremented from 1 to 2. A subsequent drawing command locally received at Device A will have the incremented local synchronization epoch number as its primary local sequence number. In contrast, for Device B, the last drawing command in the updated command sequence after the first synchronization event at $T_1$ is "1B1", and it was a drawing command locally received at Device B. Therefore, the local synchronization epoch number at Device B is maintained at 1. A subsequent drawing command locally received at Device B will have the same local synchronization epoch number as before the first synchronization event.

Figure 6C:
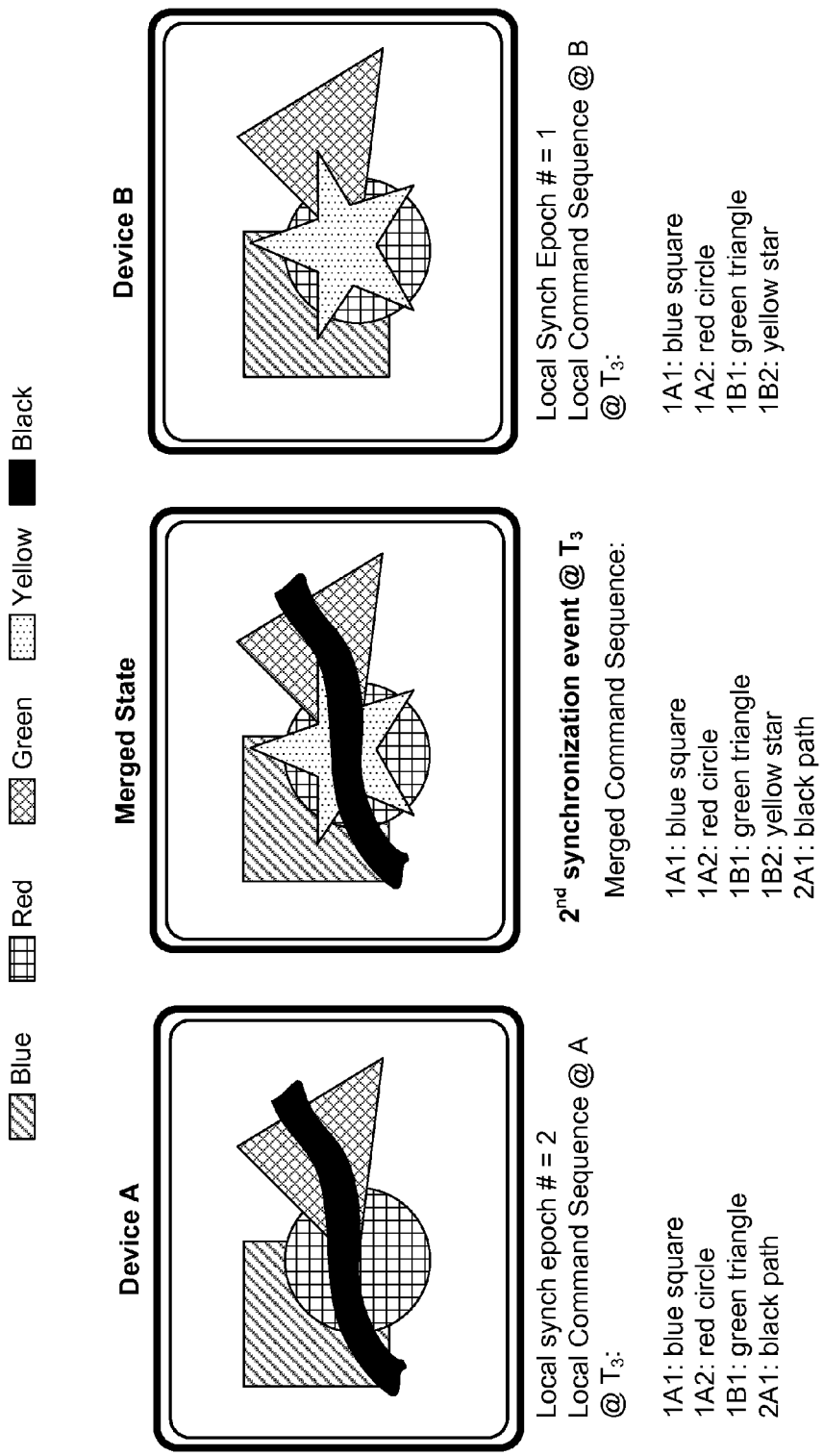

In FIG. 6C, during a time period between $T_2$ and $T_3$, before a second synchronization event has occurred, more drawing commands have been received locally at Device A and Device B, respectively. At Device A, a new drawing command for drawing a "black path" has been received, and a new command sequence number "2A1" has been assigned to the new drawing command. The new command sequence number "2A1" includes the primary local sequence number "2" which is based on the current local synchronization epoch number at Device A. Note that the current local synchronization epoch number has been incremented from "1" to "2" by the last synchronization event. The new command sequence number "2A1" also includes the secondary local sequence number "1" which indicates that the new command is the first drawing command received locally after the start of the current local synchronization epoch. The new drawing command "2A1" is added to the end of the local command sequence at Device A because it has the largest primary sequence number among all drawing commands in the local command sequence at Device A.

At device B, a new drawing command for drawing a "yellow star" has been received, and a new command sequence number "1B2" has been assigned to the new drawing command. The new command sequence number "1B2" includes the primary local sequence number "1" which is based on the current local synchronization epoch number at Device B. Note that the current local synchronization epoch number has not been altered by the last synchronization event. The new command sequence number "1B2" also includes the secondary local sequence number "2" which indicates that the new command is the second drawing command received locally after the start of the current local synchronization epoch at device B. The new drawing command "1B2" is added to the end of the local command sequence at Device B because it has the same primary sequence number and device ID as the last command (e.g., "1B1") in the local command sequence, and a larger secondary sequence number than the secondary sequence number of the last command in the local command sequence at Device B.

As shown in FIG. 6C, during the second synchronization event occurring at $T_3$, the local command sequence at Device A includes "1A1→1A2→1B1→2A1", and a new drawing command received from Device B is "1B2". When merging the new drawing command into the existing local command sequence based on the predetermined ordering rule, the new drawing command "1B2" is inserted before the last drawing command "2A1" in the existing local command sequence at Device A, because the primary local sequence number in "1B2" precedes the primary local sequence number in "2A1". The resulting merged local command sequence at Device A is "1A1→1A2→1B1→1B2→2A1". At device B, the local command sequence is "1A1→1A2→1B1→1B2". When merging the new drawing commands received from Device A, "2A1" is inserted after "1B2" because the primary sequence number of "1B2" precedes the primary sequence number of "2A1". The resulting merged local command sequence at Device B is also "1A1→1A2→1B1→1B2→2A1". The merging and sorting of drawing commands are thus completed for the second synchronization event.

Figure 6D:
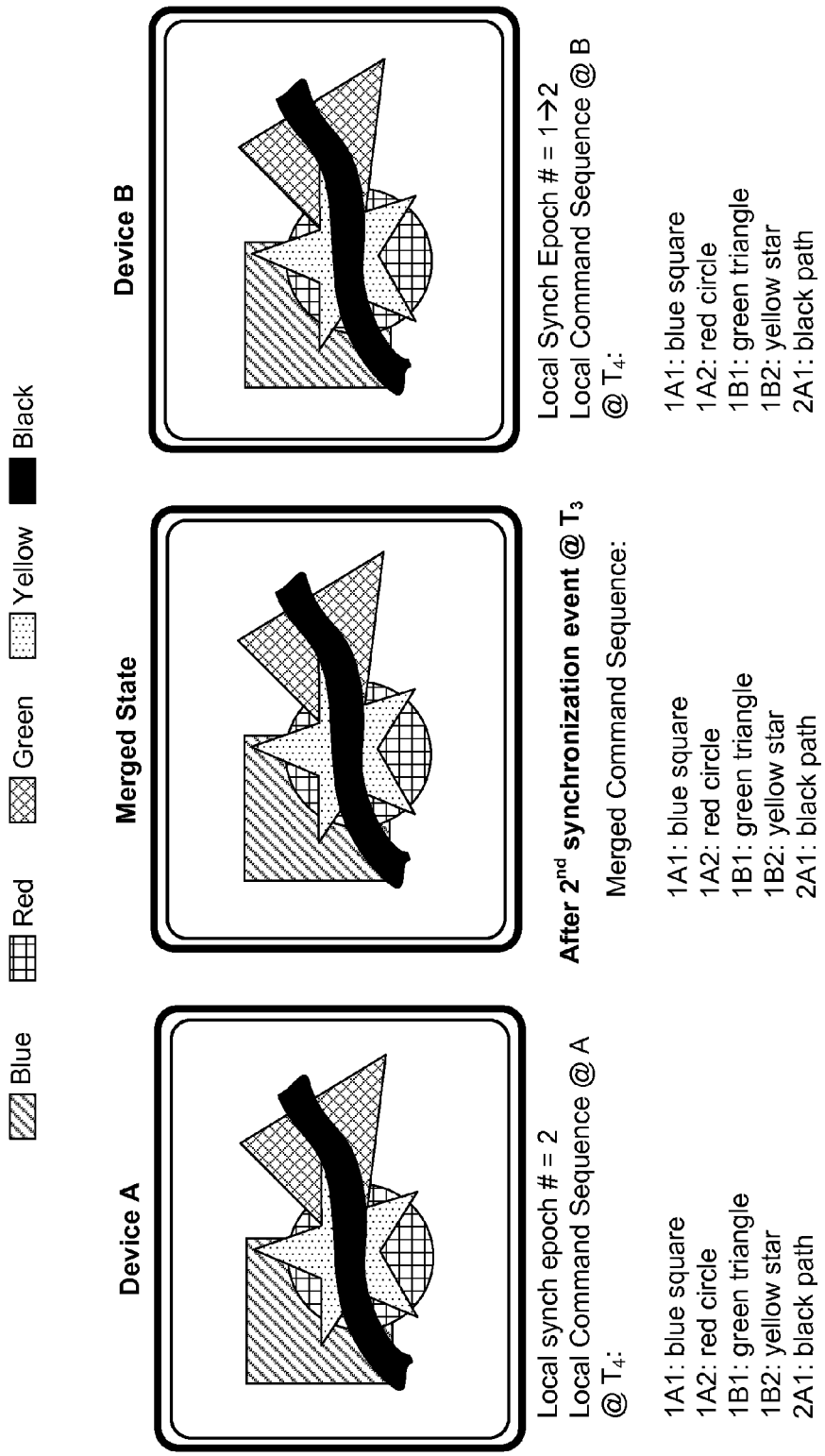

As shown in FIG. 6D, at time $T_4$, after the second synchronization event that occurred at $T_3$, the local command sequence at Device A and the local command sequence at Device B are identical, and include five drawing commands in a sequence of "1A1→1A2→1B1→1B2→2A1". The sketch on each of the two devices is updated in accordance with this new local command sequence. For example, as shown in FIG. 6D, a blue square (1A1), a red circle (1A2), a green triangle (1B1), a yellow star (1B2), and a black path (2A1) are drawn in sequence on the canvas. For example, as shown in FIG. 6D, the yellow star covers part of the blue square, the red circle, and the green triangle, and the black path covers part of the blue square, the red circle, the green triangle, and the yellow star.

In addition to the updates made to the local command sequences at the collaborating devices, the local synchronization epoch number for at least one of the collaborating devices is also updated. In the example shown in FIG. 6D, the last drawing command in the updated command sequence after the second synchronization event at $T_3$ is "2A1", and it was not locally received at Device B. Therefore, the local synchronization epoch number at Device B is incremented from 1 to 2 at the completion of the second synchronization event. A subsequent drawing command locally received at Device B will have the incremented local synchronization epoch number as its primary local sequence number. In contrast, for Device A, the last drawing command in the updated command sequence after the second synchronization event at $T_3$ is "2A1", and it was a drawing command locally received at Device A. Therefore, the local synchronization epoch number at Device A is maintained at 2. A subsequent drawing command locally received at Device A will have the same local synchronization epoch number as before the second synchronization event.

Further update to the sketch by locally received drawing commands and new drawing commands received from the remote collaborating device(s) can continue in the manner as described above, in accordance with the rules for assigning command sequence numbers to new drawing commands and the ordering rules for merging and sorting a new drawing command into an existing command sequence.

Figure 6E:
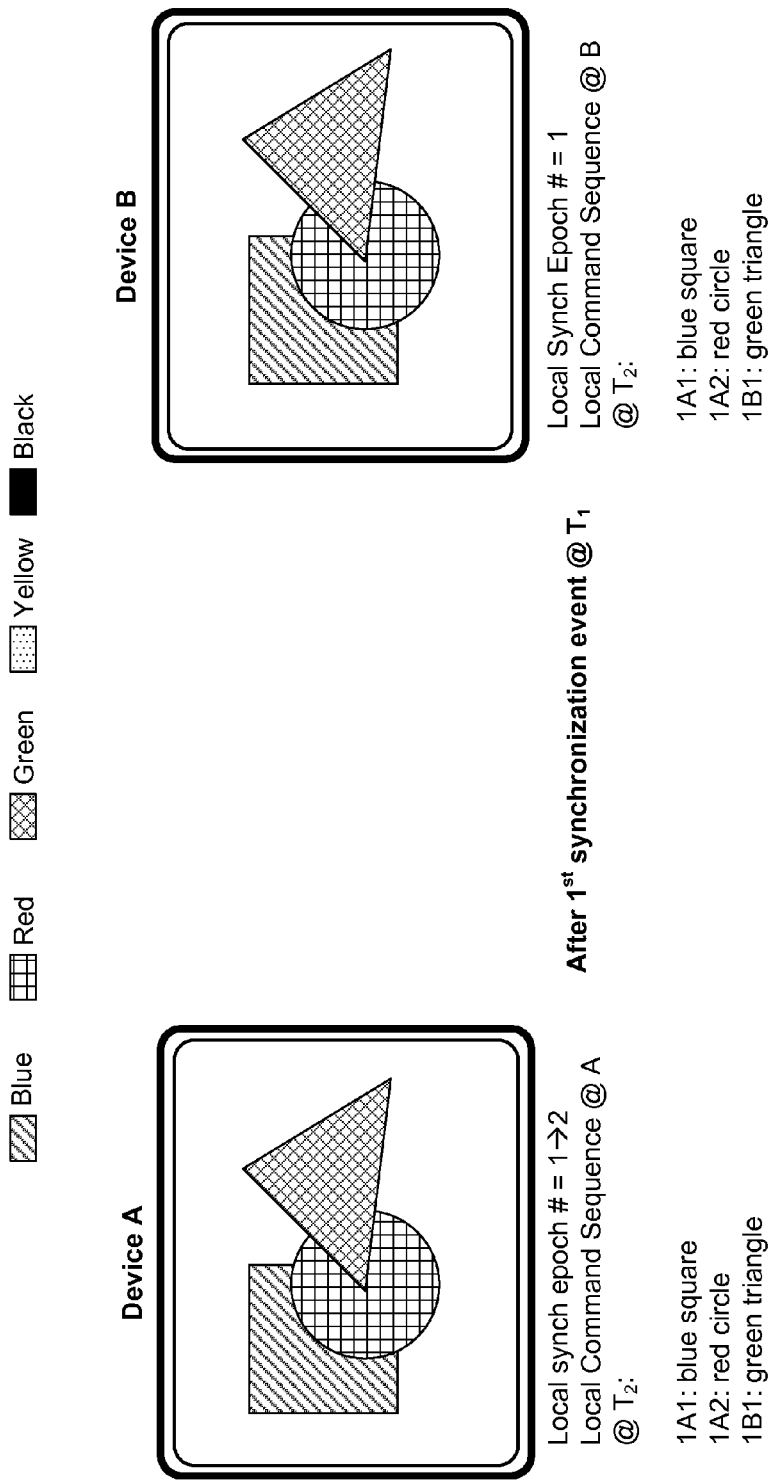
Figure 6F:
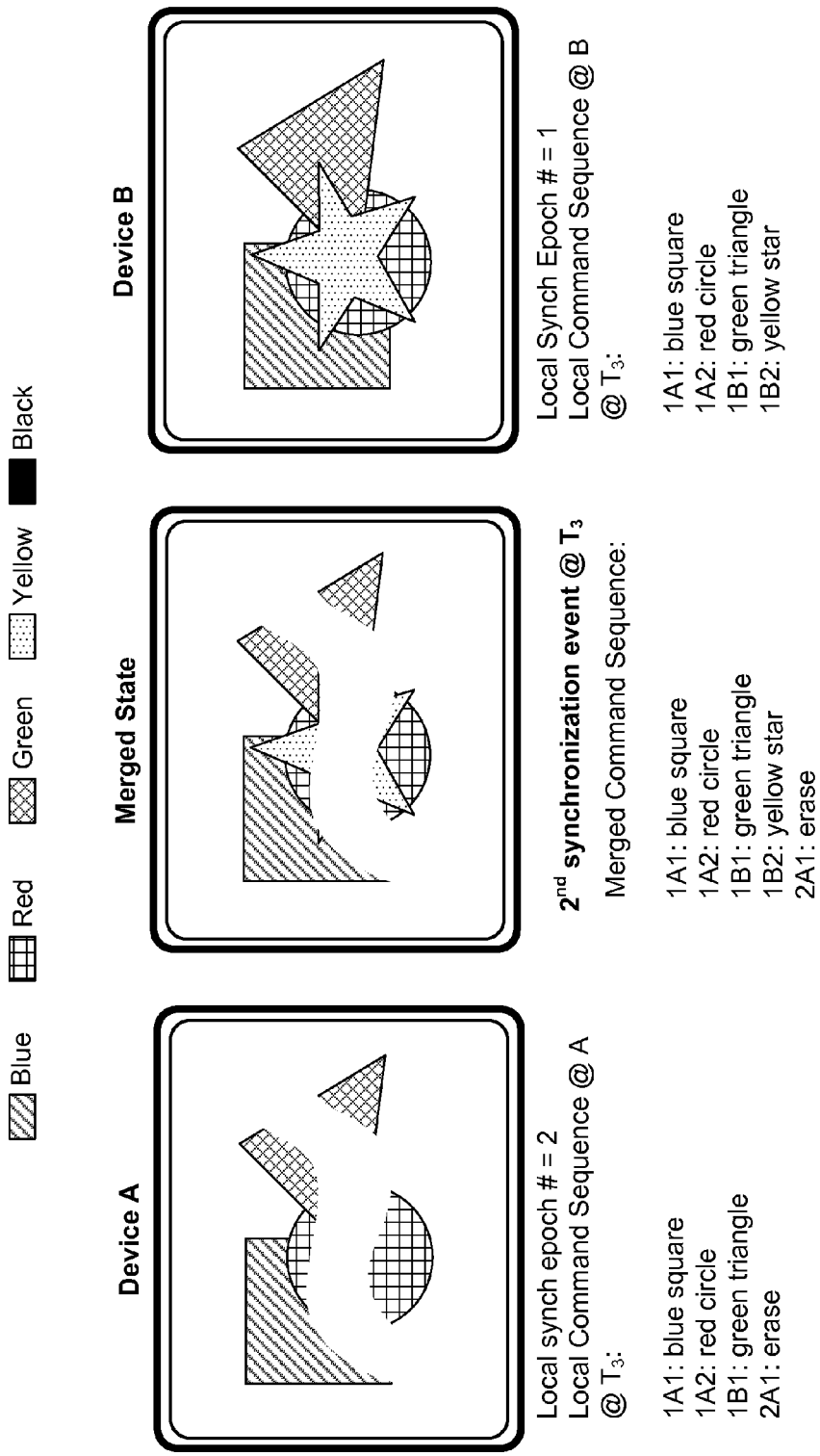
Figure 6G:
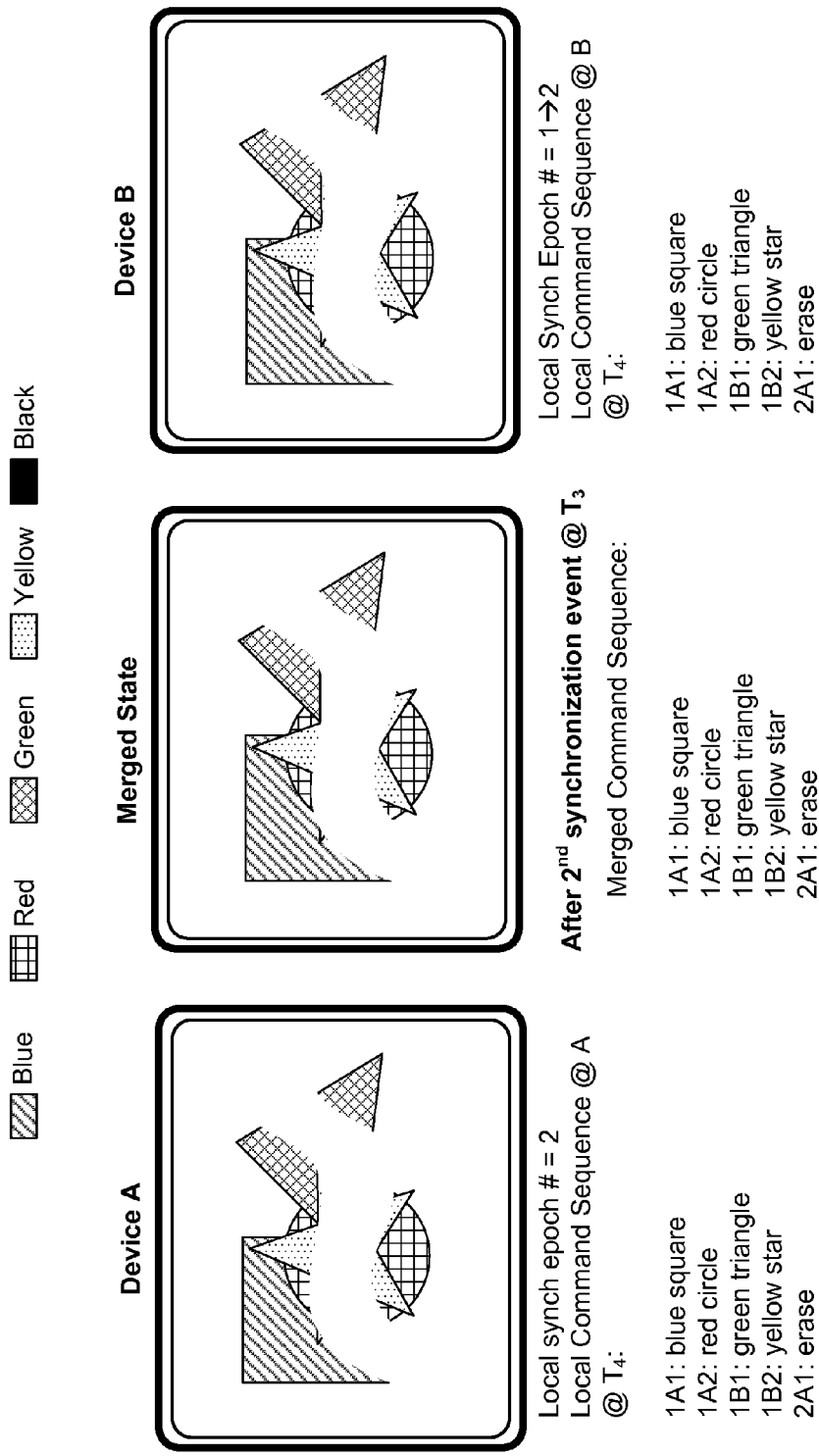

FIGS. 6E-6G illustrate a process for merging and sorting an "erase" command into an existing command sequence. An "erase" command removes all colored pixels in its path. In some embodiments, an "erase" command is issued when the user selects an "eraser" tool and drags the eraser tool across the sketch canvas. In some embodiments, the "erase" command is treated like any other drawing commands that color pixels within a shape on the canvas, when sorting and merging the "erase" command into an existing command sequence. The "erase" command differs from other drawing commands in that, instead of changing the color of pixels into a pre-selected color, the "erase" command changes all colored pixels in its path into the same color as the background color of the canvas.

As shown in FIG. 6E, suppose that, at time $T_2$, after the first synchronization event that occurred at $T_1$, the local command sequences at both Device A and Device B are "1A1→1A2→1B1". The local synchronization epoch number at Device A has been incremented from "1" to "2" at Device A, while the local synchronization epoch number at Device B is still "1".

As shown in FIG. 6F, during the time period between $T_2$ and $T_3$, and before the second synchronization event has occurred, a new drawing command "erase" (2A1) is added to the local command sequence at Device A, and a new drawing command "yellow star" (1B2) is added to the local command sequence at Device B. The local command sequence at Device A before the second synchronization event is "1A1→1A2→1B1→2A1". The local command sequence at Device B before the second synchronization event is "1A1→1A2→1B1→1B2". During the second synchronization event occurring at time $T_3$, when merging the two local command sequences, the drawing command "1B2" is inserted before the drawing command "2A1", because the primary local sequence number of "1B2" precedes the primary local sequence number of "2A1." Thus, the merged command sequence after the second synchronization event is "1A1→1A2→1B1→1B2→2A1" at both devices.

As shown in FIG. 6G, after the second synchronization event that occurred at time $T_3$, the local synchronization epoch number at Device A is maintained at "2" because subsequent new commands received locally at Device A (e.g., 2A2, 2A3, . . . ) are to be ordered after the last command in the merged command sequence, namely 2A1. In contrast, the local synchronization epoch number at Device B is incremented from "1" to "2" to ensure that subsequent new commands received locally at Device B (e.g., 2B1, 2B2, . . . ) are ordered after the last command in the merged command sequence, namely 2A1. If the local synchronization epoch number was not incremented, subsequent new commands received locally at Device B (e.g., 1B3, 1B4, . . . ) would be ordered before the last merged command, namely 2A1. When rendering the sketch based on the merged command sequence "1A1→1A2→1B1→1B2→2A1", the blue square, the red circle, the green triangle, and the yellow star are drawn in sequence. At last, when rendering the "erase" command, all colored pixels in the path of the eraser tool are turned into the background color of the canvas, as shown in FIG. 6G.

In some embodiments, each drawing command is assigned a timestamp when it is first received locally at a device. In some embodiments, the timestamp given to the drawing command is based on a local clock used at the Device at which the drawing command was first received. In some embodiments, an "undo" command is used to turn a "visibility" status of the last drawing command to "invisible", and a "redo" command is used to turn the "visibility" status of the last drawing command that has been "undone" back to "visible". In some embodiments, the timestamp of the drawing command is updated in accordance with the time that the "undo" or "redo" command was locally received at the device. In some embodiments, the "undo" command and the "redo" command do not create a separate command entry in the command sequence. In some embodiments, when merging the "undo" command into the existing command sequence, one of the existing command in the command sequence (e.g., the last "visible" drawing command in the command sequence) is identified as the "target" of the "undo" command, and the "undo" command hides the "target" command (e.g., turns the visibility status of the "target" command to "invisible"). In some embodiments, when merging the "redo" command into the existing command sequence, one of the existing command in the command sequence (e.g., the drawing command in the command sequence that was last turned "invisible") is identified as the "target" of the "redo" command, and the "redo" command un-hides the "target" command (e.g., turns the visibility status of the command back to "visible").

Figure 6H:
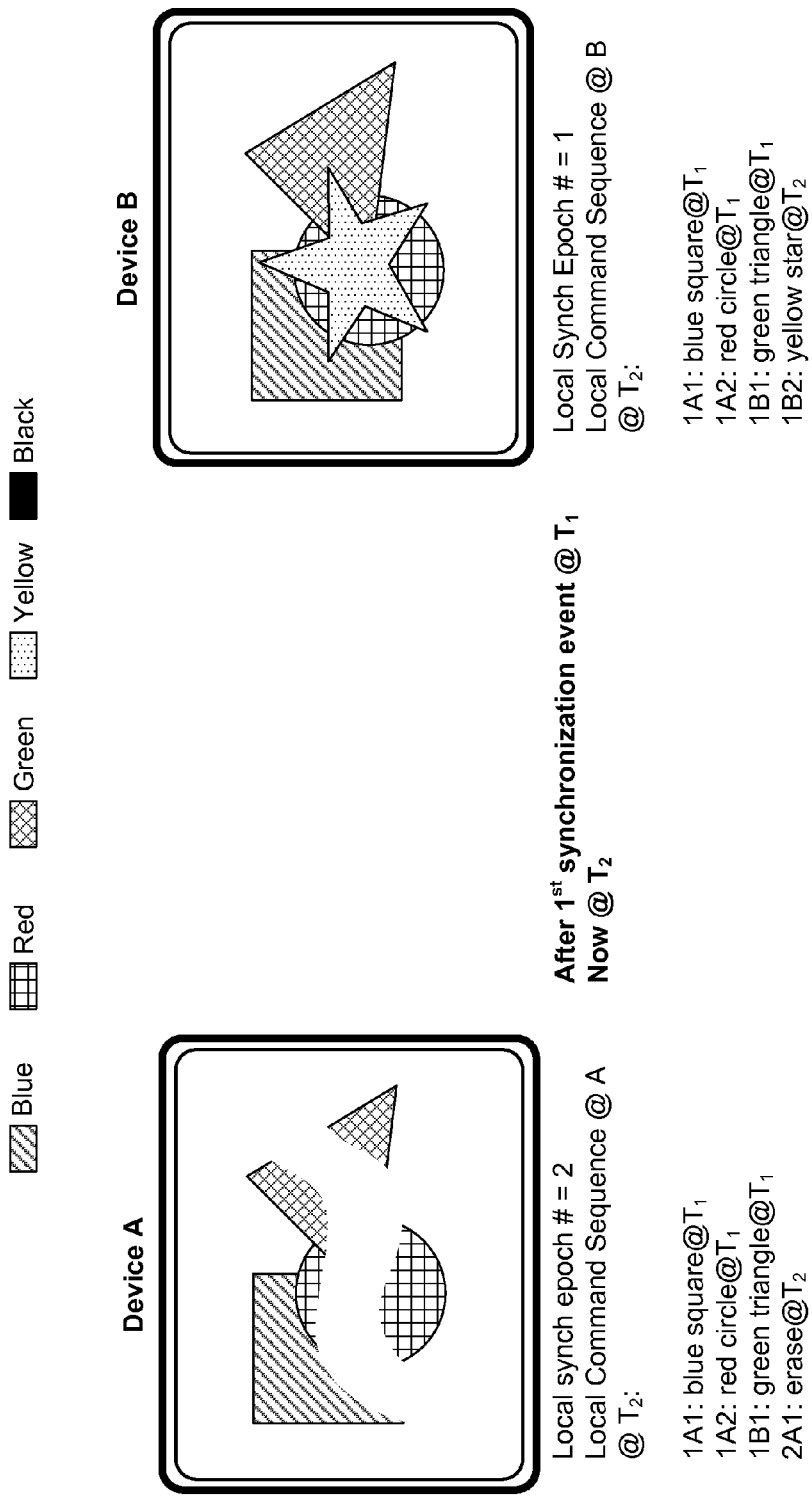
Figure 6I:
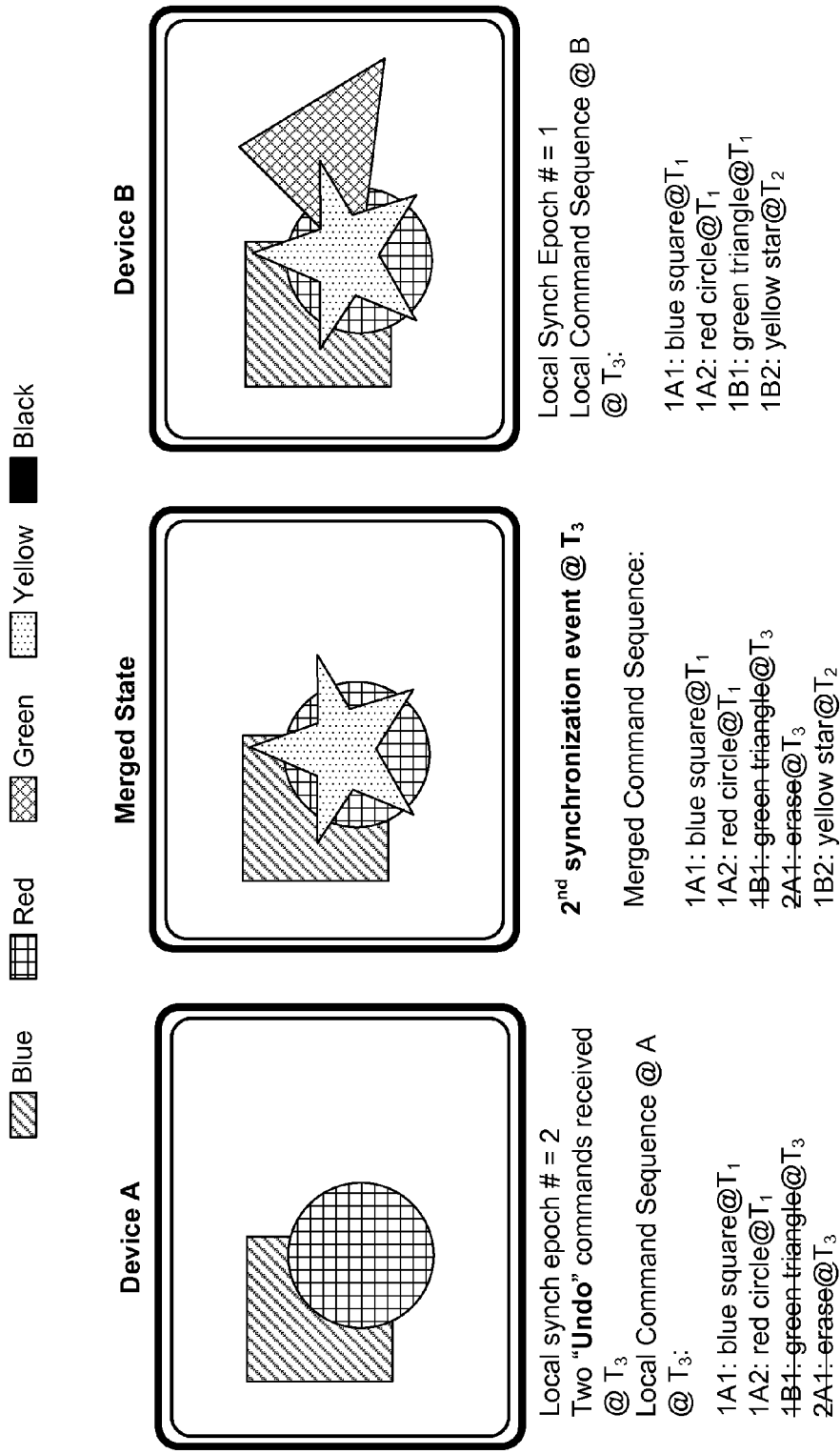
Figure 6J:
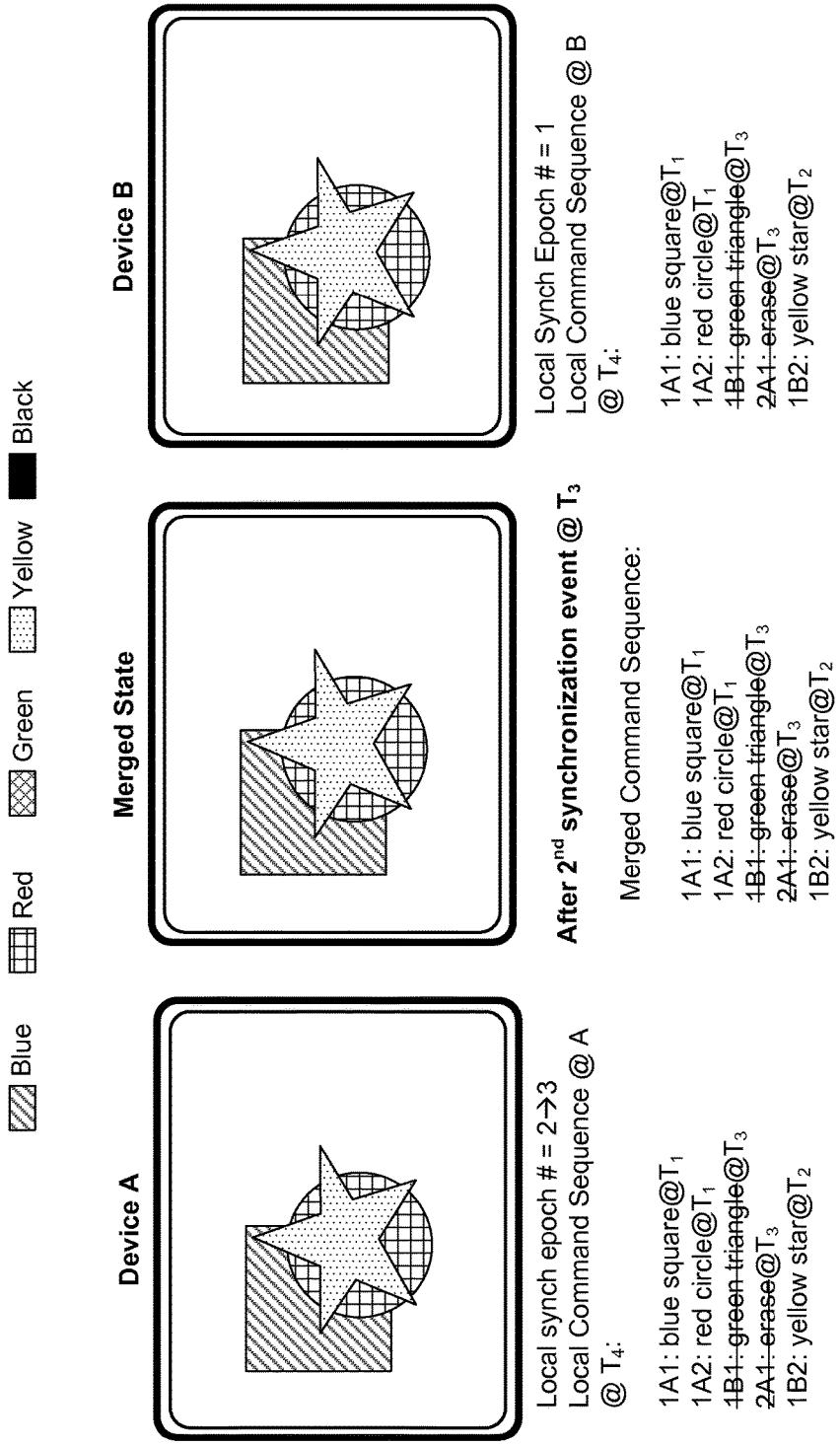

FIGS. 6H-6J illustrate the merging and sorting of an "undo" command into an existing command sequence when the "undo" command is first received locally at a device (e.g., Device A), and the merging and sorting of an "undo" command into an existing command sequence during a synchronization event, in accordance with some embodiments.

As shown in FIG. 6H, at time $T_2$ after a previous synchronization event that occurred at $T_1$, the local command sequence at Device A is "1A1→1A2→1B1→2A1" and the local command sequence at Device B is "1A1→1A2→1B1→1B2". The last two drawing commands 1B1→2A1 in the local command sequence at Device A is a command for drawing a green triangle and an "erase" command. The timestamps associated with command 1B1 is based on $T_1$, and the timestamp associated with command 2A1 is based on $T_2$. The timestamp associated with command 1B2 is also based on $T_2$.

As shown in FIG. 6I, during a time period between $T_2$ and $T_3$, and before the second synchronization event, two consecutive "undo" commands are received locally at Device A. When merging the first "undo" command into the local command sequence at Device A, the last visible drawing command (e.g., the "erase" command (2A1)) in the local command sequence prior to the receipt of the first "undo" command is identified as the target of the first "undo" command, and the visibility status of the last visible drawing command is turned to "invisible", as indicated by the strike-through line across the "erase" command in the command sequence at Device A. The timestamp of the "erase" command (2A1) in the local command sequence at device A is updated in accordance with the receipt time of the first "undo" command (e.g., labeled as @$T_3$). When merging the second "undo" command, the last visible drawing command (e.g., the "draw green triangle" command (1B1)) in the local command sequence prior to the receipt of the second "undo" command was identified as the target of the second "undo" command, and the visibility status of the last visible drawing command is turned to "invisible", as indicated by the strike-through line across the "green triangle" command in the command sequence at Device A. The timestamp of the "green triangle" command (1B1) in the local command sequence at device A is updated in accordance with the receipt time of the second "undo" command (e.g., labeled as @$T_3$). In contrast, the timestamps for the same command (e.g., "1B1") remain unchanged (e.g., based on $T_1$) at Device B.

As shown in FIG. 6I, during the next synchronization event (e.g., the second synchronization event occurring at $T_3$), when merging the two local command sequences, the "invisible" status trumps the "visible" status of the drawing command "1B1" based on the later timestamp (e.g., the timestamp based on $T_3$) associated with the drawing command having the "invisible" status (e.g., the "invisible" status of the "erase" command at Device A). Therefore, the drawing command "1B1" takes on the "invisible" status and associated timestamp (the timestamp based on $T_3$) in the merged command sequence. The "invisible" status of the other drawing command "2A1" does not raise a conflict during the merging since it only exists in one of the local command sequences that are being merged. Therefore, the drawing command "2A1" maintains its "invisible" status in the merged command sequence. When merging the drawing command "1B2" into the local command sequence of Device A, drawing command "1B2" is placed after all of the "invisible" commands, as shown in FIG. 6I. In some embodiments (not shown in FIG. 6I), the ordering of commands during merging is based on the comparison of command sequence numbers irrespective of the visibility statuses of the drawing commands that are being compared.

FIG. 6J illustrates that after the synchronization event at time $T_3$, the updated local command sequences at both devices are "1A1→1A2→→→1B2", where the strikethrough on the command sequence numbers of "1B1" and "2A1" indicates that the corresponding drawing commands are "invisible" in the updated local command sequences at both devices.

As shown in FIG. 6J, after the synchronization event at time $T_3$, the local synchronization epoch number is incremented from "2" to "3" at Device A, while the local synchronization epoch number remains at "1" at Device B.

Also shown in FIG. 6J, when the sketch is rendered at both devices in accordance with the updated command sequence, the green triangle and the path of the erase command are not rendered, as their corresponding drawing command are "invisible" in the updated command sequences at both devices. The yellow star is the last component that is rendered in the sketch because the corresponding drawing command for drawing the yellow start is the last "visible" drawing command in the updated command sequence at both devices.

FIGS. 6J-6M illustrate the merging and sorting of a "redo" command into an existing command sequence when the "redo" command is first received locally at a device (e.g., Device A) and the merging and sorting of a "redo" command into an existing command sequence during a synchronization event, in accordance with some embodiments.

Figure 6K:
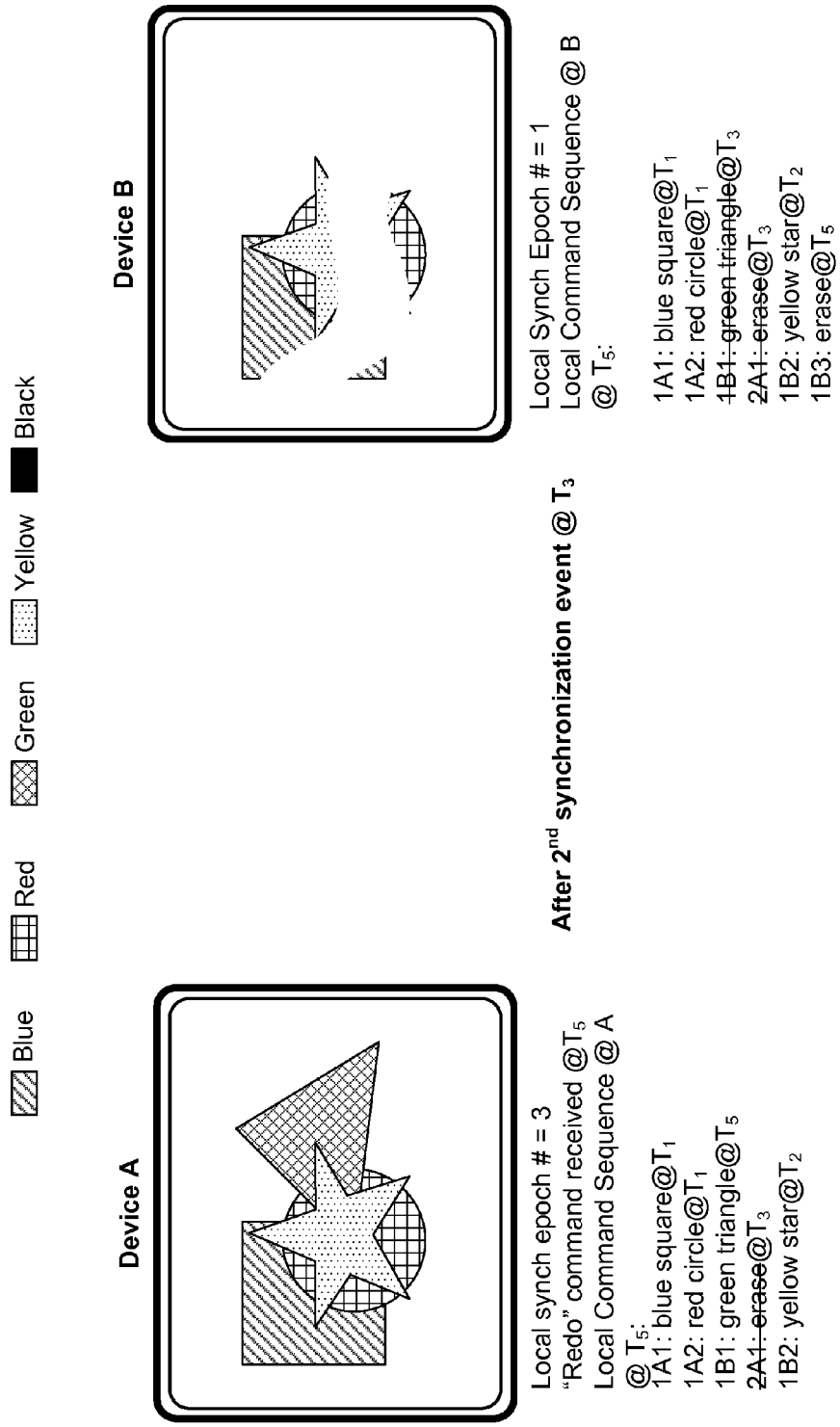

In FIG. 6J, at time $T_4$, the local command sequences at both devices are the same, and include two "invisible" drawing commands "1B1" and "2A1". In FIG. 6K, during a time period between time $T_4$ and time $T_5$, a "redo" command is received locally at Device A. In response to the "redo" command, a "target" of the "redo" command is identified. In this example, the "target" of the "redo" command is the first "invisible" drawing command (e.g., " ") in the local command sequence at Device A. When merging the "redo" command into the local command sequence at Device A, the "redo" command changes the visibility status of the target drawing command from "invisible" back to "visible" again. In addition, the timestamp associated with the target drawing command is also updated according to the time that the "redo" command was received at Device A. For example, the timestamp of command 1B1 is updated from $@T_3$ to $@T_5$ at Device A. As shown in FIG. 6K, when rendering the sketch at Device A in accordance with the updated local command sequence, the previously disappeared green triangle is restored and the relative order of the green triangle and the yellow star are also preserved based on the order of the drawing commands in the local command sequence at Device. A.

As shown in FIG. 6K, during the time period between time $T_4$ and time $T_5$, no "redo" command is issued, so the "invisible" drawing commands " " and " " remain "invisible" in the local command sequence at Device B. A new "erase" command is received at Device B and is assigned a command sequence number "1B3" in accordance with the current local synchronization epoch number (e.g., "1"), and the order of the "erase" command in the current local synchronization epoch (e.g., "3"). The new "erase" command is added to the end of the local command sequence at Device B based on a comparison between the command sequence numbers "1B2" and "1B3". FIG. 6K shows that the "erase" command is rendered last in the sketch at Device B, and changes colored pixels in its path to the background color of the canvas.

Figure 6L:
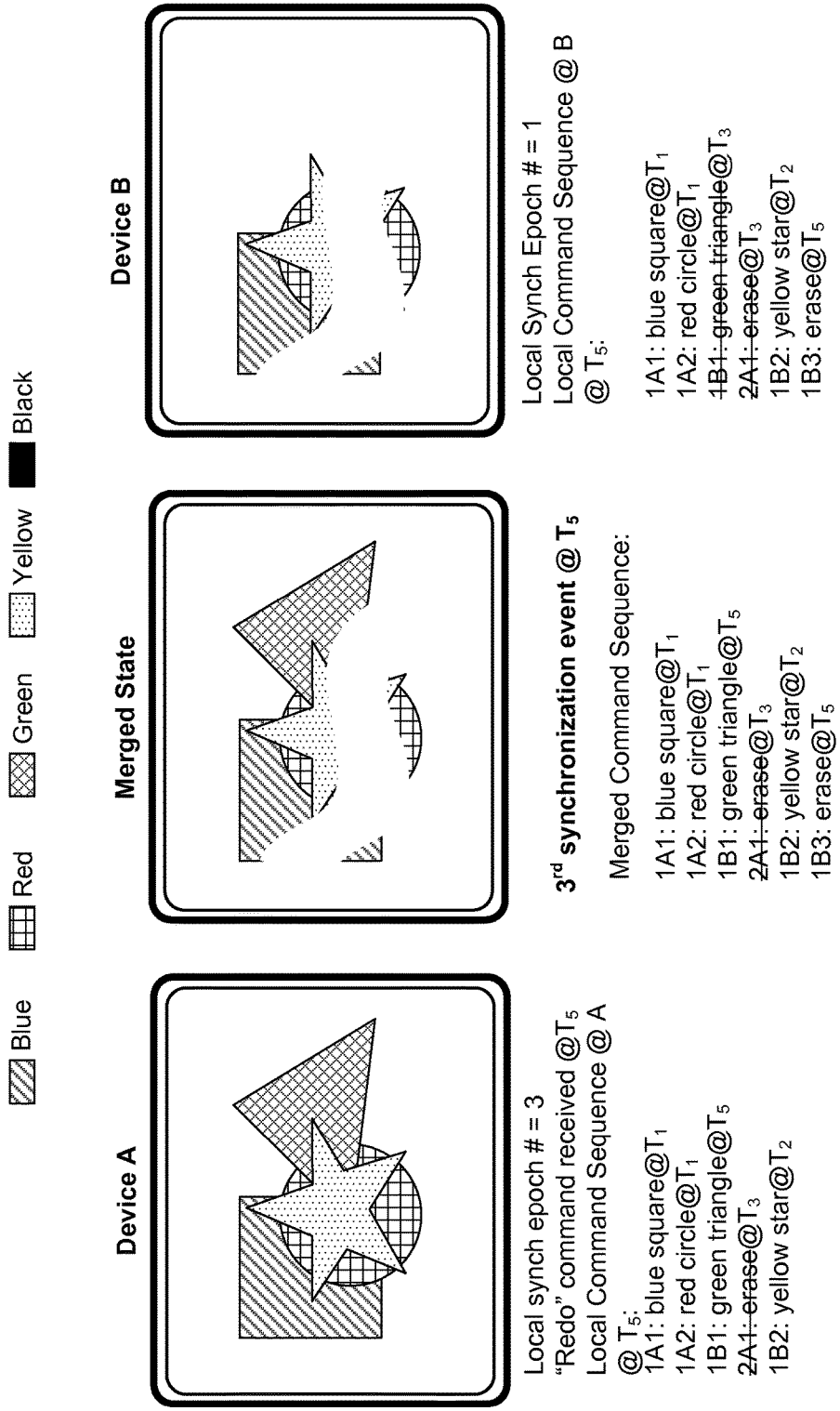
Figure 6M:
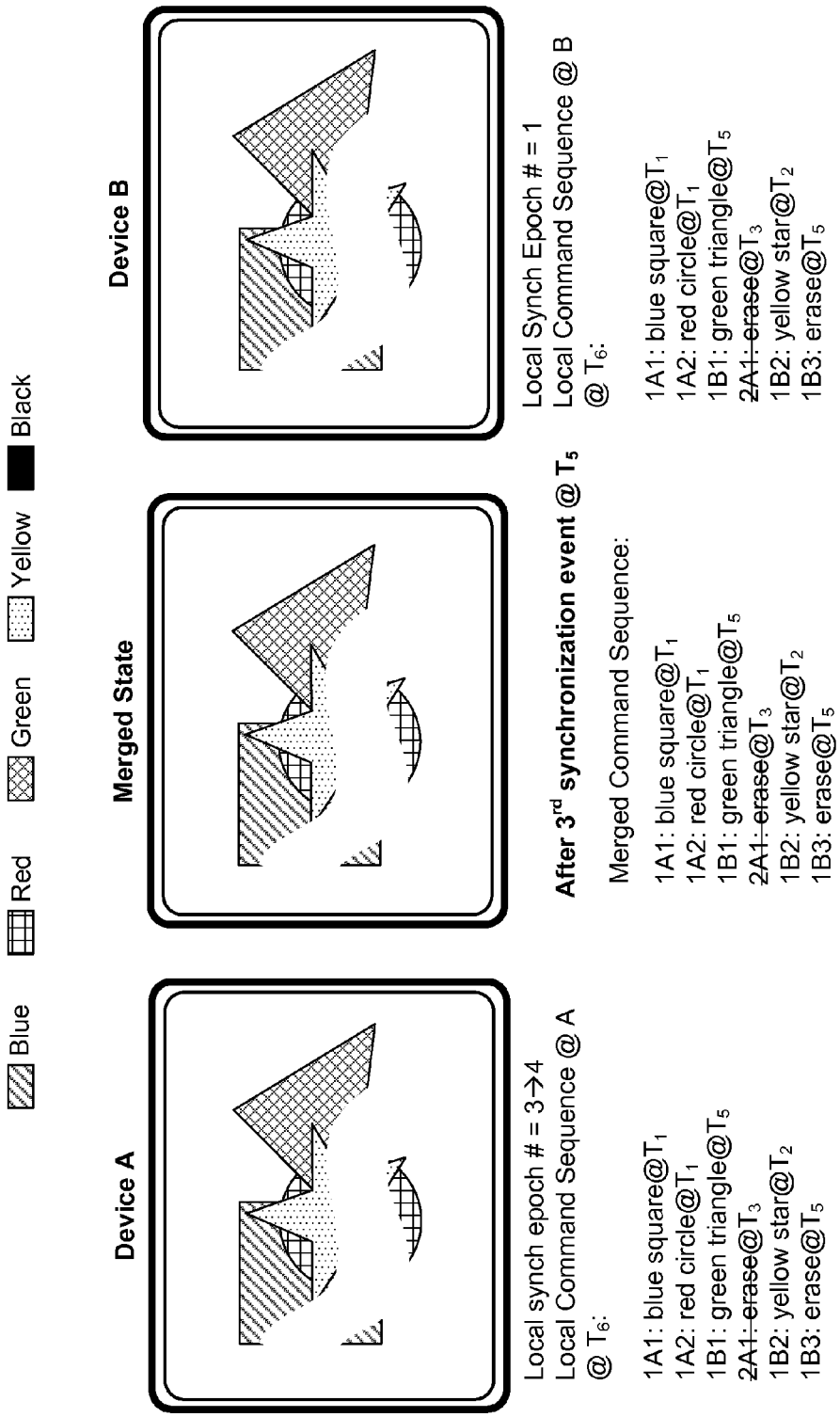

FIG. 6L shows that during the next synchronization event (e.g., the third synchronization event occurring at $T_5$), the local command sequences from the two devices are merged. When merging the drawing commands for drawing the green triangle (1B1), the visibility status associated with the later timestamp wins. In other words, the visibility status of the command "1B1" is "visible" in the merged command sequence, and the timestamp associated with the command is based on $T_5$. When merging the new drawing command "erase" (1B3) to the command sequence, the new drawing command "erase" (1B3) is added at the end, after the command "1B2". FIG. 6M shows that, at time $T_6$, after the completion of the third synchronization event that occurred at time $T_5$, both devices have the updated command sequence "1A1→1A2→1B1→→1B2→1B3". As a result of the third synchronization event, the local synchronization epoch number at Device A is updated from "3" to "4", while the local synchronization epoch number at Device B remains at "1". As shown in FIG. 6M, the sketches on both devices include the green triangle below the yellow star, and the erase command is rendered last to change all colored pixels in its path to the background color of the canvas.

Figure 6N:
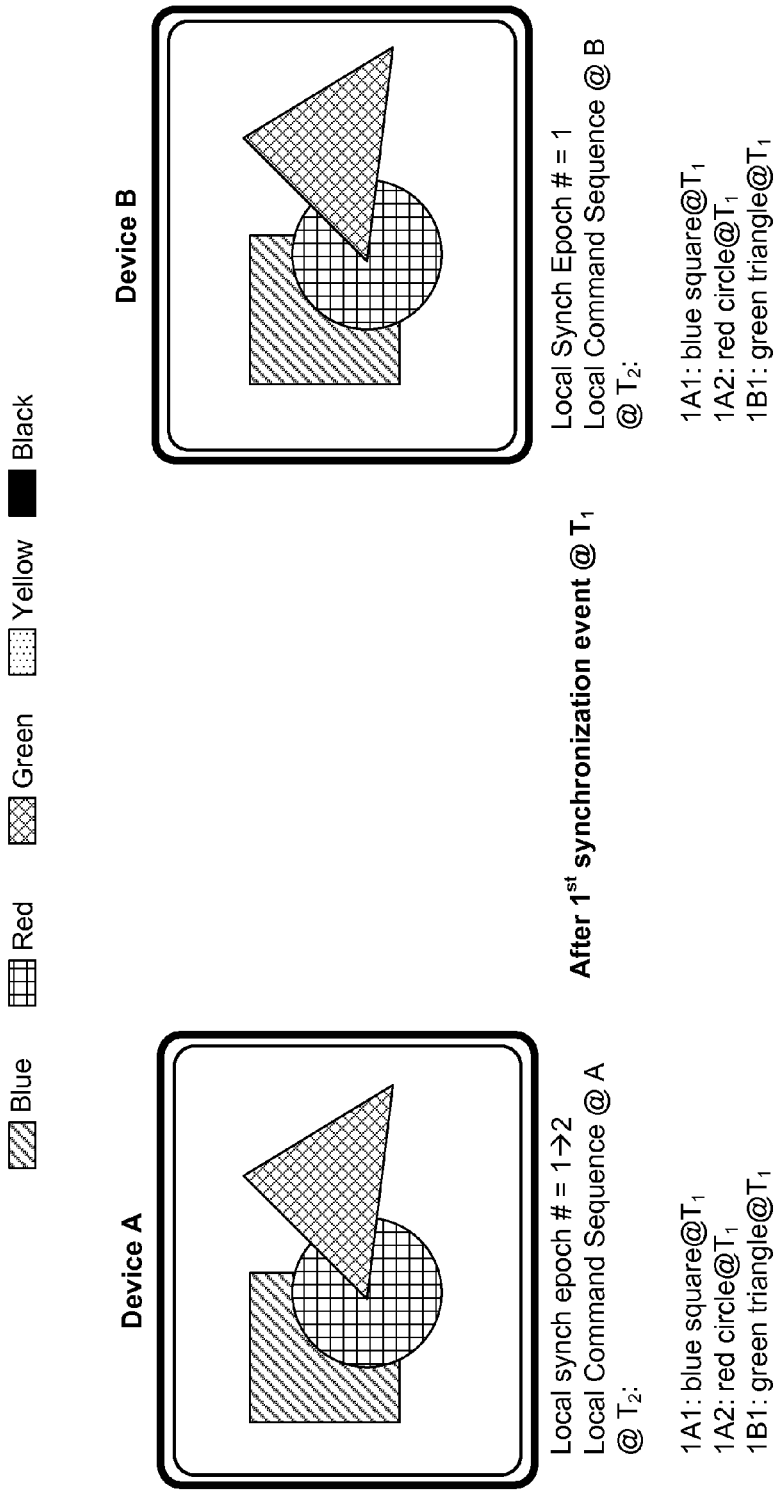
Figure 6O:
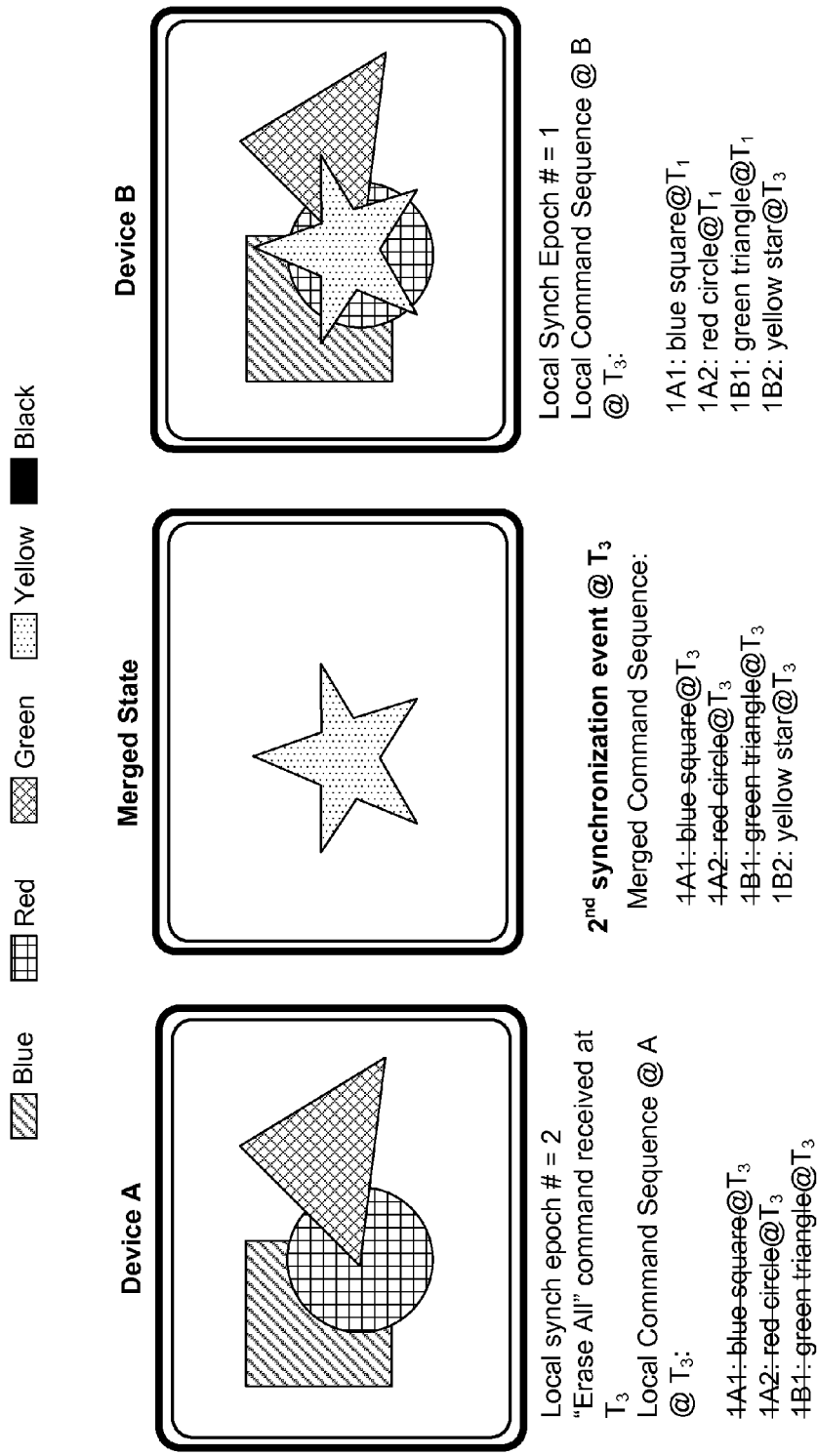

FIGS. 6N-6P illustrate the case where an "erase all" command is received on one of the two devices before the occurrence of the next synchronization event, in accordance with some embodiments. As shown in FIG. 6N, the local command sequences at Device A and Device B are identical after a previous synchronization event (e.g., the first synchronization event that occurred at $T_1$). At time $T_2$, the local command sequence at both devices is "1A1→1A2→1B1", for example. The local synchronization epoch number at Device A is updated to "2", while the local synchronization epoch number at Device B remains at "1".

In FIG. 6O, during a time period between time $T_2$ and $T_3$, an "erase all" command is received locally at Device A. When merging the "erase all" command into the existing local command sequence at Device A, no new command is added to the local command sequence, instead, the "erase all" command changes the visibility status of all existing drawing commands in the local command sequence to "invisible". The timestamps of the "invisible" drawing commands are updated in accordance with the time that the "erase all" command was received at Device A (e.g., the updated timestamp is labeled as "$@T_3$"). As shown in FIG. 6O, in this example, a new drawing command for drawing a yellow star (1B2) is received at Device B during the time period between time $T_2$ and time $T_3$, and the local command sequence at Device B is updated to "1A1→1A2→1B1→1B2", where the timestamp for command "1B2" is based on receipt time of the command (e.g., the timestamp is labeled as $@T_3$).

FIG. 6O shows that when merging the two local command sequences from Device A and Device B, for the common drawing commands (e.g., 1A1, 1A2, and 1B1), the visibility status associated with the later timestamp wins, and accordingly, the visibility status of these common commands are set to "invisible" in accordance with the visibility status of the drawing commands at Device A. The drawing command "1B2" is added at the end of the merged command sequence, as shown in FIG. 6O.

FIG. 6P shows that, after the second synchronization event that occurred at time $T_3$, both devices have the same merged command sequence "→→→1B2", and only the yellow star (1B2) is rendered in the sketch shown on both devices.

The examples shown in FIGS. 6A-6P are merely illustrative. In some embodiments, other types of drawing commands may be used to add a component in the sketch or change a visual attribute of an existing component in the sketch. In some embodiments, when merging a new drawing command that adds a component to the sketch, a new command entry for the new drawing command is added to the command sequence at an appropriate position based on comparison of the command sequence number of the new drawing command and the command sequence number(s) of existing drawing commands in the command sequence.

In some embodiments, an "undo" command changes the visibility status of a target command that adds a component to the sketch, and a "redo" command following such an "undo" command restores the visibility status of the target command. The "undo" and "redo" commands do not create new entries in the command sequence, but alter the timestamp associated with the altered visibility status. When merging conflicting visibility statuses of the same drawing command, the visibility status associated with the latest timestamp wins.

In some embodiments, when merging a new drawing command that changes the value of a style attribute (e.g., size, color, transparency, etc.) associated with an existing component in the sketch, the new drawing command does not create a new entry in the command sequence, and only updates the value of the style attribute and timestamp associated with the style attribute for the drawing command. When merging drawing commands with different values for the same style attribute, the value associated with the latest timestamp wins.

In some embodiments, an "undo" command immediately following a style changing drawing command restores the previous value of a corresponding style attribute (e.g., color, magnification, transparency, etc.) for an existing component in the sketch, and a "redo" command following such an "undo" command restores the value specified by the style changing drawing command for the existing component. The "undo" and "redo" commands do not create new entries in the command sequence, but changes the timestamp associated with the altered style value. When merging drawing commands with different values for the same style attribute, the value associated with the latest timestamp wins.

FIGS. 7A-7B illustrate an exemplary user interface and a process for mixed collaborative text and sketch editing, in accordance with some embodiments.

As shown in FIG. 7A, in some embodiments, on an electronic device (e.g., device 100, FIG. 1A), an application (e.g., a note application) provides a document editing interface 702 (e.g., a note) that allows combined text and sketch editing. In the document editing interface 702, a displayed document includes both editable text and one or more editable sketches. In a collaboration scenario, the document may be concurrently edited by multiple users (e.g., using the drawing or character input tools selected from tools menu 704) on multiple collaborating devices. The editing inputs received from each of the collaborating devices (including the editing inputs received locally at device 100, and the editing inputs received from other devices separately located from device 100. Sometimes, the editing inputs are a mix of some or all of the following: (1) text editing inputs (e.g., insertion, deletion textual characters, changing the styles of existing characters, undo and redo of text editing inputs, etc.), (2) sketch editing inputs that affect an entire sketch (e.g., creation of a new sketch, deletion of an existing sketch, moving the position of an existing sketch in the document, changing the size of the sketch, etc.), and (3) sketch editing inputs that affect only the internal appearances of existing sketches (e.g., adding and deleting a sketch component (e.g., a line, a circle, etc.), moving a sketch component, changing the size of a sketch component, changing other appearance attribute of a sketch component, undo and redo command that affect the visibility or appearance attribute of an existing sketch component, etc.).

In some embodiments, when collaborative editing inputs affect a content object as a whole (e.g., a textual character, a sketch), the collaborative editing inputs are merged in a first manner, e.g., as described with respect to collaborative text editing in FIGS. 5A-5H. In some embodiments, when collaborative editing inputs affect the internal appearance of a sketch, the collaborating editing inputs are merged in a second manner, e.g., as described with respect to collaborative sketch editing in FIGS. 6A-6P. FIG. 7B illustrate an exemplary process for combined collaborative text and sketch editing, in accordance with some embodiments.

As shown in FIG. 7B, in some embodiments, during each synchronization period, locally at each of the collaborating device, the device receives (710) local edits to a document and assigns unique object sequence numbers to new content objects (e.g., text characters, sketches, images, clip arts, attachments, hyperlinks, etc.) created by the local edits. In some embodiments, the local edits are received as raw inputs (e.g., typed characters, strokes for drawing, etc.), and are rendered on the local content page immediately. In some embodiments, the device revises (712) the local graph and/or existing command sequences for the document based on the received local edits. In some embodiments, the device also receives (714) remote edits with unique object sequence numbers for new and existing content objects, and/or remote edits with command sequence numbers for drawing commands, from other collaborating devices. In some embodiments, edits received from remote sources (e.g., other collaborating devices) are optionally in the form of full graphs, partial graphs indicating changes to the full graph, or raw inputs. In some embodiments, for edits on sketch objects, full command sequences for changed or new sketch objects, or changed portions of command sequences for changed sketch objects are optionally received from remote collaborating devices.

In some embodiments, the device revises (716) the local graph and/or existing command sequences based on remote edits from each remote collaborating device. In some embodiments, for each of the remote editing inputs, the device modifies (718) the local graph based on the remote editing input by adding nodes and/or paths, removing redundant edges, and/or changing attribute values and associated timestamps of existing nodes in the local graph. This is also referred to as the merging of the graphs. In some embodiments, the types of editing inputs that result in a change in the local graph include insertion of text, deletion of text, formatting of text, undo of a previous text edit, redo of a previous text edit, creation of a new sketch, deletion of an existing sketch, undo of a deletion or resize of an existing sketch, change in the position of an existing sketch, and resizing of an existing sketch, for example. In some embodiments, if the remote editing input includes modification to the internal appearance of an existing sketch, such remote editing input is processed separately based on the rules for merging and sorting drawing commands (see process 720).

In some embodiments, the device traverses (722) the local graph obtained after merging all edits (local and remote) received during the current synchronization period, in a deterministic order (e.g., based on the traversal rules described with respect to FIGS. 5A-5H), to obtain an object sequence. This is the sorting of the nodes in the merged local graph. Then, the device renders and displays (724) content objects in the document in accordance with the object sequence. When encountering a sketch object in the object sequence, the device renders the sketch object based on the merged command sequence of the sketch object (see process 720 for merging sketch edits to existing command sequences).

In some embodiments, in the process 720 for merging and sorting drawing commands, the device determines (726), for each node that is a sketch node and that is modified by an editing input (local or remote) received during the current synchronization period, whether there is any unmerged drawing command for the node in the editing input. If so, the device modifies (728) the command sequence of the node based on the unmerged drawing command for the node until there is no more unmerged drawing command for the node in the editing input. This is the merging and sorting process for drawing commands that determine the internal appearance of a modified sketch object. Once there is no more unmerged drawing command in the current editing input, the process returns to 718. In some embodiments, merging of different command sequences for the same sketch object may happen during the merging of graphs. Alternatively, in some embodiments, an attribute can be used to flag a modified sketch node during the merging of graphs so that merging of command sequences happen later during the sorting or the rendering of the nodes in the graph.

More details of the combined text and sketch editing are described with respect to FIGS. 5A-5H and 6A-6P above, and are not repeated in the interest of brevity. An exemplary process for providing mixed collaborative text and sketch editing is also described with respect to FIG. 10A-10F.

FIGS. 8A-8D illustrate a flow diagram of a method 800 of maintaining a consistent output based on concurrent textual edits received at multiple collaborating devices. The method 800 is performed at a first electronic device (e.g., device 300, FIG. 3, or portable multifunction device 100, FIG. 1A) of the multiple collaborating devices. The first device has a display. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 provides an intuitive way to provide collaborative text editing. The method reduces the cognitive burden on a user when editing text collaboratively, thereby creating a more efficient human-machine interface. Further, method 800 reduces the processing power consumed to process user inputs, conserves power, reduces unnecessary/extraneous/repetitive inputs, and potentially reduces memory usage. For battery-operated devices, such methods and interfaces conserve battery power and increase the time between battery charges. For some collaborative contexts, the method may also support short-distance communication between devices without the need for Internet access or a central server.

The first device maintains (802) a directed acyclic graph to represent a textual string concurrently edited by the first device and at least a second device of the multiple collaborating devices. The directed acyclic graph includes a plurality of nodes each representing a respective character input received from one or more of the multiple collaborating devices. The directed acyclic graph further includes multiple parallel paths each including at least one node that represents a respective one of multiple concurrent character inputs received from distinct devices of the multiple collaborating devices. Examples of the directed acyclic graph are shown in FIGS. 5B-5H, for example, as the local graphs used at Devices A and B.

In some embodiments, the multiple parallel paths include (804) at least one linear path (e.g., as in the local graphs shown in FIG. 5B). In some embodiments, the multiple parallel paths include (806) at least one path that further includes multiple parallel sub-paths (e.g., as in the local graphs shown in FIG. 5E).

The first device topologically traverses (808) the directed acyclic graph in accordance with a predetermined ordering rule to deterministically sort the plurality of nodes in the directed acyclic graph into a string sequence, e.g., as illustrated in FIGS. 5A-5H. The first device displays (810) the textual string in accordance with the deterministically obtained string sequence.

In some embodiments, each node in the directed acyclic graph includes (812) a unique sequence number for the character input represented by the node. The unique sequence number includes (1) a unique device identifier for a respective device at which the character input was first received, and (2) a local sequence number assigned to the character input in accordance with a local order by which the character input was first received at said respective device. In some embodiments, the predetermined ordering rule specifies (814) a fixed order between the unique device identifiers of the multiple collaborating devices and affords a higher significance to the unique device identifiers than the local sequence numbers when comparing the unique sequence identifiers of the character inputs in the multiple parallel paths.

In some embodiments, topologically traversing the directed acyclic graph in accordance with the predetermined ordering rule to deterministically sort the plurality of nodes in the directed acyclic graph into the string sequence includes (816) sorting nodes from a starting node to an end node of the multiple parallel paths by traversing the multiple parallel paths in an order based on a comparison between respective lowest character sequence numbers present in each of the multiple parallel paths.

In some embodiments, maintaining a directed acyclic graph to represent a textual string concurrently edited by the first device and at least a second device of the multiple collaborating devices includes (818) creating the directed acyclic graph based on initial textual edits received locally at the first device and modifying the directed acyclic graph based on additional textual edits received from each of the multiple collaborating devices based on relative timing and relative locations of the additional textual edits to the initial textual edits.

In some embodiments, modifying the directed acyclic graph based on additional textual edits received from each of the multiple collaborating devices based on the relative timing and locations of the additional textual edits to the initial textual edits includes (820) receiving concurrent insertion inputs between a first node and a second node in the directed acyclic graph from multiple ones of the multiple collaborating devices, and for each of the concurrent insertion inputs, creating a respective path from the first node to the second node in the directed acyclic graph to include one or more nodes representing the insertion input. In some embodiments, the received insertion inputs from another node comprise updates to the directed acyclic graph at the other node since a last synchronization or merge.

In some embodiments, modifying the directed acyclic graph based on additional textual edits received from each of the multiple collaborating devices based on the relative timing and locations of the additional textual edits to the initial textual edits includes (822) receiving a deletion input deleting a character represented by a respective node in the directed acyclic graph and, in response to the deletion input, changing a status of the respective node for the character to "deleted." The respective node having the "deleted" status is omitted in the string sequence or skipped when the textual string is displayed at the first device in accordance with the string sequence. This is illustrated in FIG. 5C, for example, for the deletion of the character "Y" at device A, and the deletion of the character "X" at device B.

In some embodiments, modifying the directed acyclic graph based on additional textual edits received from each of the multiple collaborating devices based on the relative timing and locations of the additional textual edits to the initial textual edits includes (824) receiving an undo input restoring a deleted character represented by a respective node in the directed acyclic graph. A status of the respective node is a "deleted" status. In response to the undo input, the first device removes the "deleted" status from the respective node for the deleted character in the directed acyclic graph and updates a unique sequence number of the respective node for the deleted character in the directed acyclic graph based on a respective timestamp associated with the undo input. This is illustrated in FIG. 5E, for example, for the un-deletion of the character "Y" at device A.

In some embodiments, modifying the directed acyclic graph based on additional textual edits received from each of the multiple collaborating devices based on the relative timing and locations of the additional textual edits to the initial textual edits includes (826) receiving a redo input re-deleting a previously un-deleted character represented by a respective node in the directed acyclic graph, wherein the status of the respective node is an "un-deleted" status; and in response to the redo input, changing the status of the respective node for the previously un-deleted character to a "re-deleted" status; and updating the unique sequence number of the respective node for the re-deleted character in the directed acyclic graph based on a respective timestamp associated with the redo input. This is illustrated in FIG. 5G, for example, for the re-deletion of the character "Y" at device A.

In some embodiments, modifying the directed acyclic graph based on additional textual edits received from each of the multiple collaborating devices based on the relative timing and locations of the additional textual edits to the initial textual edits includes (828) receiving a style input changing a style of a character represented by a respective node in the directed acyclic graph, and, in response to the style input, changing a style attribute of the respective node for the character in the directed acyclic graph. The style attribute includes a respective style and a respective timestamp associated with the style input. This is illustrated in FIG. 5E, for example, for the bolding of the character "Z" at device B.

In some embodiments, modifying the directed acyclic graph based on additional textual edits received from each of the multiple collaborating devices based on the relative timing and locations of the additional textual edits to the initial textual edits includes (830) receiving concurrent style inputs changing a style of a character represented by a respective node in the directed acyclic graph, wherein the concurrent style inputs are associated with different devices and timestamps, and, in response to receiving the concurrent style inputs, changing a style attribute of the respective node for the character in the directed acyclic graph in accordance with the style input having the latest timestamp among the concurrent style inputs. This is illustrated in FIG. 5F, for example, for determining whether the character "Z" should be bolded or not after the synchronization event.

It should be understood that the particular order in which the operations in FIGS. 8A-8D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1000, and the methods described with respect to FIGS. 5A-5H, 6A-6P, and 7B) are also applicable in an analogous manner to method 800 described above with respect to FIGS. 8A-8D. For example, the editing inputs, modifications to the directed acyclic graph, ordering rules, etc. described above with reference to method 800 optionally have one or more of the characteristics of the editing inputs, modifications to the directed acyclic graph, ordering rules, etc. described herein with reference to other methods described herein (e.g., methods 900, and 1000 and the methods described with respect to FIGS. 5A-5H, 6A-6P, and 7B). For brevity, these details are not repeated here.

FIGS. 9A-9C illustrate a flow diagram of a method 900 of maintaining a consistent output based on concurrent drawing edits received at multiple collaborating devices. The method 900 is performed at a first electronic device (e.g., device 300, FIG. 3, or portable multifunction device 100, FIG. 1A) of the multiple collaborating devices. The first device has a display. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, the method 900 provides an intuitive way to provide collaborative sketch editing. The method reduces the cognitive burden on a user when editing a sketch in collaboration with others, thereby creating a more efficient human-machine interface. The method reduces the cognitive burden on a user when editing text collaboratively, thereby creating a more efficient human-machine interface. Further, method 800 reduces the processing power consumed to process user inputs, conserves power, reduces unnecessary/extraneous/repetitive inputs, and potentially reduces memory usage. For battery-operated devices, such methods and interfaces conserve battery power and increase the time between battery charges. For some collaborative contexts, the method may also support short-distance communication between devices without the need for Internet access or a central server.

The first device maintains (902) a command sequence for a drawing currently rendered at the first device. The command sequence includes a plurality of past drawing commands sorted according to respective sequence numbers of the past drawing commands. A sequence number of a drawing command is defined by (1) a device identifier for a device at which the drawing command was first received, (2) a primary local sequence number representing a local synchronization epoch during which the drawing command was first received, and (3) a secondary local sequence number representing an order of the drawing command within the local synchronization epoch.

The first device (904) receives a plurality of additional drawing commands from two or more devices of the multiple collaborating devices. Each of the plurality of additional drawing commands has a respective sequence number.

The first device updates (906) the command sequence, including merging and sorting the plurality of additional drawing commands and the plurality of past drawing commands in accordance with an ordering rule based on the respective sequence numbers of the plurality of past drawing commands and the plurality of additional drawing commands. The ordering rule gives more significance to the primary local sequence number than the device identifier, and gives more significance to the device identifier than to the secondary local sequence number when comparing the respective sequence numbers.

The first device re-renders (908) at least a portion of the drawing based on the command sequence after updating the command sequence (e.g., after having merged and sorted the plurality of additional drawing commands into the command sequence).

In some embodiments, a last drawing command in the plurality of additional drawing commands was received (910) first at a collaborating device other than the first device. The first device starts a next local synchronization epoch. Starting the next local synchronization epoch includes incrementing the primary local sequence number for a subsequent drawing command locally received at the first device and restarting the secondary local sequence number for the subsequent drawing command locally received at the first device. In some embodiments, the secondary local sequence number is not restarted, and instead continues being incremented through all epochs.

In some embodiments, a last drawing command in the plurality of additional drawing commands was received (912) first at the first device. The first device increments the secondary local sequence number for a subsequent drawing command locally received at the first device, while maintaining the primary local sequence number of a current local synchronization epoch for the subsequent drawing command locally received at the first device.

In some embodiments, the plurality of additional drawing commands include (914) an undo command directed to a respective past command in the command sequence. Updating the command sequence by merging and sorting the plurality of additional drawing commands and the plurality of past drawing commands includes merging the undo command with the respective past command in the command sequence by identifying the corresponding past drawing command in the command sequence and changing a visibility attribute of the corresponding past drawing command in the command sequence to "invisible." The "invisible" attribute of the corresponding past drawing command causes said drawing command to be skipped during the re-rendering of the drawing. This is illustrated in FIG. 6I, for example, by the merging of the two undo commands received at device A.

In some embodiments, after receiving the undo command, the first device receives (916) a redo command directed to the undo command. In response receiving the redo command, the first device (918) changes the visibility attribute of the corresponding past drawing command in the command sequence to "visible", wherein the "visible" attribute of the corresponding past drawing command causes said drawing command to be rendered in a next re-rendering of the drawing. This is illustrated in FIG. 6K, for example, by the merging of the redo command received at device A.

In some embodiments, the plurality of additional drawing commands includes (920) an "erase all" command. Merging the "erase all" command with the plurality of past drawing commands in the command sequence includes: identifying all past drawing commands in the command sequence that were present at the first device before receipt of the "erase all" command and changing respective visibility attributes of the identified past drawing commands in the command sequence to "invisible." The respective "invisible" attributes of the identified past drawing commands cause said identified past drawing commands to be skipped during the re-rendering of the drawing. This is illustrated in FIG. 6O, for example, by the merging of the "erase all" command received at device A.

In some embodiments, for each change in a respective visibility status of a respective drawing command, the first device updates (922) a timestamp associated with the respective drawing command in accordance with a receipt time of a respective drawing command that triggered the change in the respective visibility status of the respective drawing command.

In some embodiments, merging and sorting the plurality of additional drawing commands and the plurality of past drawing commands in accordance with the respective sequence numbers of the plurality of past drawing commands and the plurality of additional drawing commands further includes (924): comparing respective timestamps assigned to two or more conflicting drawing commands in the plurality of past drawing commands and the plurality of additional drawing commands; and selecting one of the two or more conflicting drawing commands for inclusion in the updated command sequence in lieu of the two or more conflicting drawing commands, wherein the selected drawing command has a latest timestamp among the respective timestamps assigned to the two or more conflicting drawing commands.

In some embodiments, the plurality of additional drawing commands include (926) an erase command to erase one or more existing pixels in the drawing. Updating the command sequence by merging and sorting the plurality of additional drawing commands and the plurality of past drawing commands includes sorting the erase command against at least a first additional drawing command in the plurality of additional drawing commands based on the ordering rule. The sorting places the erase command after the first additional drawing in the updated command sequence. Re-rendering the drawing includes erasing at least some pixels that would have been drawn in accordance with the first additional drawing command. This is illustrated in FIG. 6F, by the merging of the "erase" command at device A.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 1000, and the methods described with respect to FIGS. 5A-5H, 6A-6P, and 7B) are also applicable in an analogous manner to method 900 described above with respect to FIGS. 9A-9C. For example, the editing inputs, modifications to the directed acyclic graph, ordering rules, etc. described above with reference to method 900 optionally have one or more of the characteristics of the editing inputs, modifications to the directed acyclic graph, ordering rules, etc. described herein with reference to other methods described herein (e.g., methods 800, and 1000 and the methods described with respect to FIGS. 5A-5H, 6A-6P, and 7B). For brevity, these details are not repeated here.

FIGS. 10A-10F illustrate a flow diagram of a method 1000 of supporting collaborative editing. The method 1000 is performed at a first electronic device (e.g., device 300, FIG. 3, or portable multifunction device 100, FIG. 1A) of multiple collaborating devices. The first device has a display. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, the method 1000 provides an intuitive way to support collaborative editing, such as mixed collaborative text and sketch editing. The method reduces the cognitive burden on a user when editing collaboratively, thereby creating a more efficient human-machine interface. The method reduces the cognitive burden on a user when editing text collaboratively, thereby creating a more efficient human-machine interface. Further, method 800 reduces the processing power consumed to process user inputs, conserves power, reduces unnecessary/extraneous/repetitive inputs, and potentially reduces memory usage. For battery-operated devices, such methods and interfaces conserve battery power and increase the time between battery charges. For some collaborative contexts, the method may also support short-distance communication between devices without the need for Internet access or a central server.

The first device maintains (1002) a directed acyclic graph to represent content collaboratively edited by the first device and one or more second devices of the multiple collaborating devices. The directed acyclic graph includes a plurality of nodes each representing a respective content object that is created or edited by one or more of the multiple collaborating devices. Each node is connected to at least one neighboring node by a respective directed edge in accordance with a relative positional order of the respective content objects represented by the node and the at least one neighboring node. At least a first node of the plurality of nodes represents a textual content object and at least a second node of the plurality of nodes represents a sketch content object. Each node representing a corresponding sketch content object is associated with a respective command sequence used to create internal content of the corresponding sketch content object. In some embodiments, the directed cyclic graph has nodes to represent both textual content objects such as typed characters, and sketch content objects such as sketches.

In some embodiments, during a respective synchronization period, the first device receives (1004) one or more editing inputs from one or more devices of the multiple collaborating devices. For example, each of the editing inputs may be received locally from the first device or from any of the other collaborating devices. In addition, each editing input may be a character input specifying an edit action (e.g., insert, delete, style change, etc.) on a string or a character, or a sketch input specifying a sequence of sketch commands (e.g., various strokes, undo, redo, erase, etc.) on a sketch. In addition, an editing input may also include an input to start a new sketch or delete an existing sketch as a whole.

The first device modifies (1006) the directed acyclic graph based on relationships between the editing inputs and existing content objects embodied in the directed acyclic graph. In some embodiments, the modifying of the graph is in accordance with the set of rules for merging textual edits. The affected node can represent a typed character, a handwritten word, and/or a sketch as a whole, where each editing input is treated as a single discrete operation on a single content object represented by a node, or a sequence of content objects represented by a sequence of nodes (e.g., insertion of a string of characters between two existing characters).

In some embodiments, modifying the directed acyclic graph based on relationships between the editing inputs and existing content objects embodied in the directed acyclic graph includes (1008) detecting that the one or more editing inputs include at least two concurrent insertion inputs between a first node and a second node in the directed acyclic graph from multiple ones of the multiple collaborating devices, and, for each of the concurrent insertion inputs, creating a respective path from the first node to the second node in the directed acyclic graph to include one or more nodes represented in the insertion input. This is applicable to concurrent insertion of two or more sketch objects at the same location by two or more collaborating devices, for example.

In some embodiments, modifying the directed acyclic graph based on relationships between the editing inputs and existing content objects embodied in the directed acyclic graph includes (1010) detecting that the one or more editing inputs include a deletion input deleting a content object represented by a respective node in the directed acyclic graph, and, in response to the deletion input, changing a status of the respective node for the object to "deleted." The respective node having the "deleted" status is omitted during display rendering of the content based on the modified directed acyclic graph. This is applicable to deletion of a sketch object, for example.

In some embodiments, modifying the directed acyclic graph based on relationships between the editing inputs and existing content objects embodied in the directed acyclic graph includes (1012) detecting that the one or more editing inputs include an undo input restoring a deleted content object represented by a respective node in the directed acyclic graph, where a status of the respective node is a "deleted" status. Modifying the directed acyclic graph based on relationships between the editing inputs and existing content objects embodied in the directed acyclic graph further includes, in response to the undo input, removing the "deleted" status from the respective node for the deleted content object in the directed acyclic graph and updating a unique object sequence number of the respective node for the deleted content object in the directed acyclic graph based on a respective timestamp and a respective source device associated with the undo input. This is applicable to undoing the deletion of a sketch object, for example.

In some embodiments, modifying the directed acyclic graph based on relationships between the editing inputs and existing content objects embodied in the directed acyclic graph includes (1014) detecting that the one or more editing inputs include a style input changing a style of a content object represented by a respective node in the directed acyclic graph and, in response to the style input, changing a style attribute of the respective node for the content object in the directed acyclic graph. The style attribute includes a respective style and a respective timestamp associated with the style input. This is applicable to a resizing of a sketch object, for example.

In some embodiments, modifying the directed acyclic graph based on relationships between the editing inputs and existing content objects embodied in the directed acyclic graph includes (1016) detecting that the one or more editing inputs include at least two concurrent style inputs changing a style of a content object represented by a respective node in the directed acyclic graph, wherein the concurrent style inputs are associated with difference devices and timestamps and, in response to receiving the concurrent style inputs, changing a style attribute of the respective node for said content object in the directed acyclic graph in accordance with the style input having the latest timestamp among the concurrent style inputs. This is applicable to resolving conflicting concurrent style changes (e.g., resizing) to a sketch object by multiple collaborating devices, for example.

The first device traverses (1018) the directed acyclic graph in accordance with a predetermined ordering rule to obtain an object sequence.

The first device determines (1020) whether the one or more editing inputs modifies an existing sketch content object represented in the directed acyclic graph. In some embodiments, an existing sketch content object is represented in the graph by a respective node just like a typed character or a handwritten word, except that the node is associated with a command sequence used to create the sketch content object. In some embodiments, an editing input associated with a sketch content object includes a sequence of one or more drawing commands directed to the sketch content object.

In accordance with a determination that a first editing input of the one or more editing inputs modifies a first existing sketch content object represented in the directed acyclic graph, the first device updates (1022) a command sequence associated with the first existing sketch content object by merging each individual drawing command included the first editing input with the command sequence associated with the first existing sketch content object. In some embodiments, the additional editing input includes a sequence of one or more drawing commands, and they are merged with the sequence of existing drawing commands in the sketch object in a manner to avoid interlacing of the commands.

In some embodiments, the first device renders (1024) the first existing sketch content object represented in the modified directed acyclic graph. For example, the rendering of the first existing sketch content object can be part of re-rendering of the whole content in response to the synchronization. The rendering includes determining a global position or state of the first existing sketch content object in the content in accordance with a topological traversal of the directed acyclic graph. For example, the position of the sketch may have shifted due to insertion of characters somewhere before its original position; or the sketch may have been resized, where the resizing can be implemented as a changed style or attribute on the node representing the sketch; or the global position or state of the sketch may have remained unchanged during this synchronization period. The rendering further includes determining an internal appearance of the first existing sketch content object in accordance with the updated command sequence associated with the first existing sketch content object. The rendering further includes rendering the first existing sketch content in accordance with the determined global position or state of the first existing sketch content object and in accordance with the determined internal appearance of the first existing sketch content object.

In some embodiments, the directed acyclic graph includes (1026) multiple parallel paths each including at least one node that represents a respective one of multiple concurrent editing inputs received from distinct devices of the multiple collaborating devices. In some embodiments, concurrent editing inputs include conflicting editing inputs received during the same synchronization period, and not necessarily at exactly the same instant in time. An example of conflicting inputs is insertions of two different characters between two existing characters in a string by two different devices.

In some embodiments, each node in the directed acyclic graph includes (1028) a unique object sequence number for the respective content object associated with the node. The unique object sequence number includes (1) a unique device identifier for a respective device at which the respective content object was first created, and (2) a local sequence number assigned to the respective content object in accordance with a local order by which the respective content object was first created at said respective device. In some embodiments, each content object (e.g., a typed character, a handwritten word, or a sketch) is assigned its content sequence number locally, and when merging, the node for the same typed character from multiple sources takes the lowest object sequence number generated for the node by multiple input sources. Typically, each sketch and handwriting word has just one original creator, so the object sequence number given by its creator is used as the object sequence number of the node representing the sketch or handwritten word.

In some embodiments, for each node representing a sketch content object, the node is associated (1030) with a sequence of one or more drawing commands directed to the sketch content object. Each of the one or more drawing commands has a respective command sequence number, and the respective command sequence number includes (1) a device identifier for a device at which the drawing command was first received, (2) a primary local sequence number representing a local synchronization epoch during which the drawing command was first received, and (3) a secondary local sequence number representing an order of the drawing command within the local synchronization epoch.

In some embodiments, epoch numbers are updated at a device as follows: when a last drawing command in all of drawing command received during a synchronization period was received first at a collaborating device other than the first device, a next local synchronization epoch is started at the first device. Starting a next local synchronization epoch at the first device includes: incrementing the primary local sequence number for a subsequent drawing command locally received at the first device; and restarting the secondary local sequence number for the subsequent drawing command locally received at the first device. In some embodiments, the secondary local sequence number is not restarted, and instead continues being incremented through all epochs.

In some embodiments, the first device topologically traverses (1032) the directed acyclic graph in accordance with a predetermined ordering rule to deterministically sort the plurality of nodes in the directed acyclic graph into an object sequence. In some embodiments, topologically traversing the directed acyclic graph in accordance with the predetermined ordering rule to deterministically sort the plurality of nodes in the directed acyclic graph into the object sequence includes (1034) sorting nodes between a starting node to an end node of a set of multiple parallel paths by traversing the set of multiple parallel paths in an order based on a comparison between respective lowest object sequence numbers present in each of the set of multiple parallel paths. Note that, the lowest object sequence number in a particular path is not necessarily the first node in the path. In some embodiments, the parallel paths between the same starting and end nodes are traversed in the order of ascending lowest object sequence numbers. In some embodiments, the predetermined ordering rule specifies (1036) a fixed order between the unique device numbers of the multiple collaborating devices, and affords a higher significance to the unique device numbers than the local sequence numbers when comparing unique object sequence numbers. The first device renders (1038) the content in accordance with the deterministically obtained object sequence for display at the first device.

In some embodiments, in accordance with a determination that a first editing input of the one or more editing inputs modifies the first existing sketch content object represented in the directed acyclic graph, updating the command sequence associated with the first existing sketch content object by merging each individual drawing command included the first editing input with the command sequence associated with the first existing sketch content object includes (1040) merging and sorting each individual drawing command and one or more past drawing commands in the command sequence in accordance with an ordering rule based on respective command sequence numbers of the one or more past drawing commands and said each individual drawing command. The ordering rule gives more significance to the primary local sequence number than the device identifier, and gives more significance to the device identifier than to the secondary local sequence number when comparing command sequence numbers.

In some embodiments, in accordance with a determination that a first editing input of the one or more editing inputs modifies the first existing sketch content object represented in the directed acyclic graph, updating the command sequence associated with the first existing sketch content object by merging each individual drawing command included the first editing input with the command sequence associated with the first existing sketch content object includes (1042) detecting that the first editing input is an undo command directed to a respective past drawing command in the command sequence and changing a visibility attribute of the respective past drawing command in the command sequence to "invisible." The "invisible" attribute of the respective past drawing command causes said past drawing command to be skipped during a re-rendering of the existing first sketch content object at the first device. In some embodiments, the first device receives (1044) a redo command directed to the undo command in a later synchronization period. In response receiving the redo command, the first device changes (1046) the visibility attribute of the respective past drawing command in the command sequence to "visible." The "visible" attribute of the respective past drawing command causes said past drawing command to be rendered in a next re-rendering of the existing first sketch object associated with the later synchronization period.

In some embodiments, in accordance with a determination that a first editing input of the one or more editing inputs modifies the first existing sketch content object represented in the directed acyclic graph, updating the command sequence associated with the first existing sketch content object by merging each individual drawing command included the first editing input with the command sequence associated with the first existing sketch content object further includes (1048) detecting that the first editing input is an "erase all" command, identifying all past drawing commands in the command sequence that were present at the first device before receipt of the "erase all" command, and changing respective visibility attributes of the identified past drawing commands in the command sequence to "invisible." The respective "invisible" attributes of the identified past drawing commands cause said identified past drawing commands to be skipped during a re-rendering of the first existing sketch content object.

In some embodiments, in accordance with a determination that a first editing input of the one or more editing inputs modifies the first existing sketch content object represented in the directed acyclic graph, updating the command sequence associated with the first existing sketch content object by merging each individual drawing command included the first editing input with the command sequence associated with the first existing sketch content object includes (1050) detecting that the first editing input is an erase command to erase one or more existing pixels in the first existing sketch content object and sorting the erase command against at least a first additional drawing command in the editing inputs based on the ordering rule. The sorting places the erase command after the first additional drawing in the updated command sequence. Re-rendering the first existing sketch content object includes erasing at least some pixels that would have been drawn in accordance with the first additional drawing command.

It should be understood that the particular order in which the operations in FIGS. 10A-10F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 900, and the methods described with respect to FIGS. 5A-5H, 6A-6P, and 7B) are also applicable in an analogous manner to method 1000 described above with respect to FIGS. 10A-10F. For example, the editing inputs, modifications to the directed acyclic graph, ordering rules, etc. described above with reference to method 1000 optionally have one or more of the characteristics of the editing inputs, modifications to the directed acyclic graph, ordering rules, etc. described herein with reference to other methods described herein (e.g., methods 800, and 900 and the methods described with respect to FIGS. 5A-5H, 6A-6P, and 7B). For brevity, these details are not repeated here.

Figure 11:
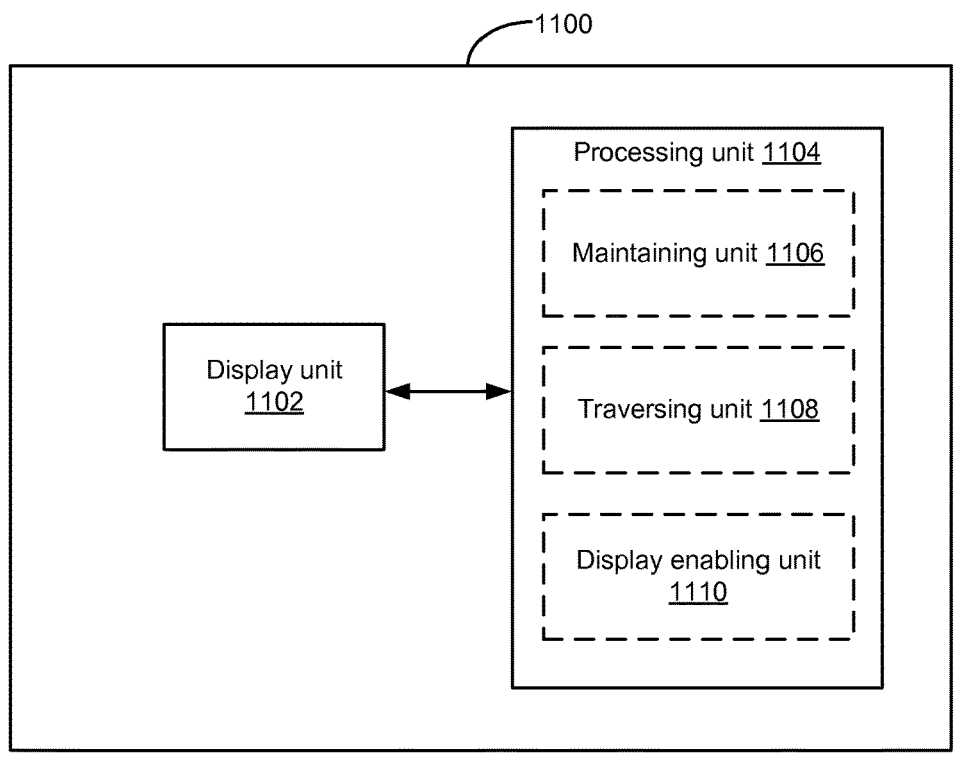
FIGS. 11-13 are functional block diagrams of an electronic device in accordance with some embodiments.

In accordance with some embodiments, FIG. 11 shows a functional block diagram of an electronic device 1100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured to display a user interface and a processing unit 1104 coupled with the display unit 1102. In some embodiments, the processing unit 1104 includes: a maintaining unit 1106, a traversing unit 1108, and a display enabling unit 1110.

The processing unit 1104 is configured to maintain (e.g., with the maintaining unit 1106) a directed acyclic graph to represent a textual string concurrently edited by the first electronic device and at least a second electronic device of multiple collaborating devices. The directed acyclic graph includes a plurality of nodes each representing a respective character input received from one or more of the multiple collaborating devices. The directed acyclic graph further includes multiple parallel paths each including at least one node that represents a respective one of multiple concurrent character inputs received from distinct devices of the multiple collaborating devices. The processing unit 1104 is further configured to topologically traverse (e.g., with the traversing unit 1108) the directed acyclic graph in accordance with a predetermined ordering rule to deterministically sort the plurality of nodes in the directed acyclic graph into a string sequence. The processing unit 1104 is further configured to enable display (e.g., with the display enabling unit 1110) of the textual string in accordance with the deterministically obtained string sequence.

In some embodiments, each node in the directed acyclic graph includes a unique sequence number for the character input represented by the node. The unique sequence number includes (1) a unique device identifier for a respective device at which the character input was first received, and (2) a local sequence number assigned to the character input in accordance with a local order by which the character input was first received at said respective device.

In some embodiments, topologically traversing the directed acyclic graph in accordance with the predetermined ordering rule to deterministically sort the plurality of nodes in the directed acyclic graph into the string sequence further includes: sorting nodes from a starting node to an end node of the multiple parallel paths by traversing the multiple parallel paths in an order based on a comparison between respective lowest character sequence numbers present in each of the multiple parallel paths.

In some embodiments, the multiple parallel paths include at least one linear path.

In some embodiments, the multiple parallel paths include at least one path that further includes multiple parallel sub-paths.

In some embodiments, the predetermined ordering rule specifies a fixed order between the unique device identifiers of the multiple collaborating devices, and affords a higher significance to the unique device identifiers than the local sequence numbers when comparing the unique sequence identifiers of the character inputs in the multiple parallel paths.

In some embodiments, maintaining a directed acyclic graph to represent a textual string concurrently edited by the first electronic device and at least a second electronic device of the multiple collaborating devices further includes: creating the directed acyclic graph based on initial textual edits received locally at the first electronic device; and modifying the directed acyclic graph based on additional textual edits received from each of the multiple collaborating devices based on relative timing and relative locations of the additional textual edits to the initial textual edits.

In some embodiments, modifying the directed acyclic graph based on additional textual edits received from each of the multiple collaborating devices based on the relative timing and locations of the additional textual edits to the initial textual edits further comprises: receiving concurrent insertion inputs between a first node and a second node in the directed acyclic graph from multiple ones of the multiple collaborating devices; and for each of the concurrent insertion inputs, creating a respective path from the first node to the second node in the directed acyclic graph to include one or more nodes representing the insertion input.

In some embodiments, modifying the directed acyclic graph based on additional textual edits received from each of the multiple collaborating devices based on the relative timing and locations of the additional textual edits to the initial textual edits further comprises: receiving a deletion input deleting a character represented by a respective node in the directed acyclic graph; and in response to the deletion input, changing a status of the respective node for the character to "deleted," wherein the respective node having the "deleted" status is omitted in the string sequence or skipped when the textual string is displayed at the first electronic device in accordance with the string sequence.

In some embodiments, modifying the directed acyclic graph based on additional textual edits received from each of the multiple collaborating devices based on the relative timing and locations of the additional textual edits to the initial textual edits further comprises: receiving an undo input restoring a deleted character represented by a respective node in the directed acyclic graph, wherein a status of the respective node is a "deleted" status; and in response to the undo input, removing the "deleted" status from the respective node for the deleted character in the directed acyclic graph; and updating a unique sequence number of the respective node for the deleted character in the directed acyclic graph based on a respective timestamp associated with the undo input.

In some embodiments, modifying the directed acyclic graph based on additional textual edits received from each of the multiple collaborating devices based on the relative timing and locations of the additional textual edits to the initial textual edits further comprises: receiving a redo input re-deleting a previously un-deleted character represented by a respective node in the directed acyclic graph, wherein the status of the respective node is an "un-deleted" status; and in response to the redo input, changing the status of the respective node for the previously un-deleted character to a "re-deleted" status; and updating the unique sequence number of the respective node for the re-deleted character in the directed acyclic graph based on a respective timestamp associated with the redo input.

In some embodiments, modifying the directed acyclic graph based on additional textual edits received from each of the multiple collaborating devices based on the relative timing and locations of the additional textual edits to the initial textual edits further comprises: receiving a style input changing a style of a character represented by a respective node in the directed acyclic graph; and in response to the style input, changing a style attribute of the respective node for the character in the directed acyclic graph, wherein the style attribute includes a respective style and a respective timestamp associated with the style input.

In some embodiments, modifying the directed acyclic graph based on additional textual edits received from each of the multiple collaborating devices based on the relative timing and locations of the additional textual edits to the initial textual edits further comprises: receiving concurrent style inputs changing a style of a character represented by a respective node in the directed acyclic graph, wherein the concurrent style inputs are associated with different devices and timestamps; and in response to receiving the concurrent style inputs, changing a style attribute of the respective node for the character in the directed acyclic graph in accordance with the style input having the latest timestamp among the concurrent style inputs.

Figure 12:
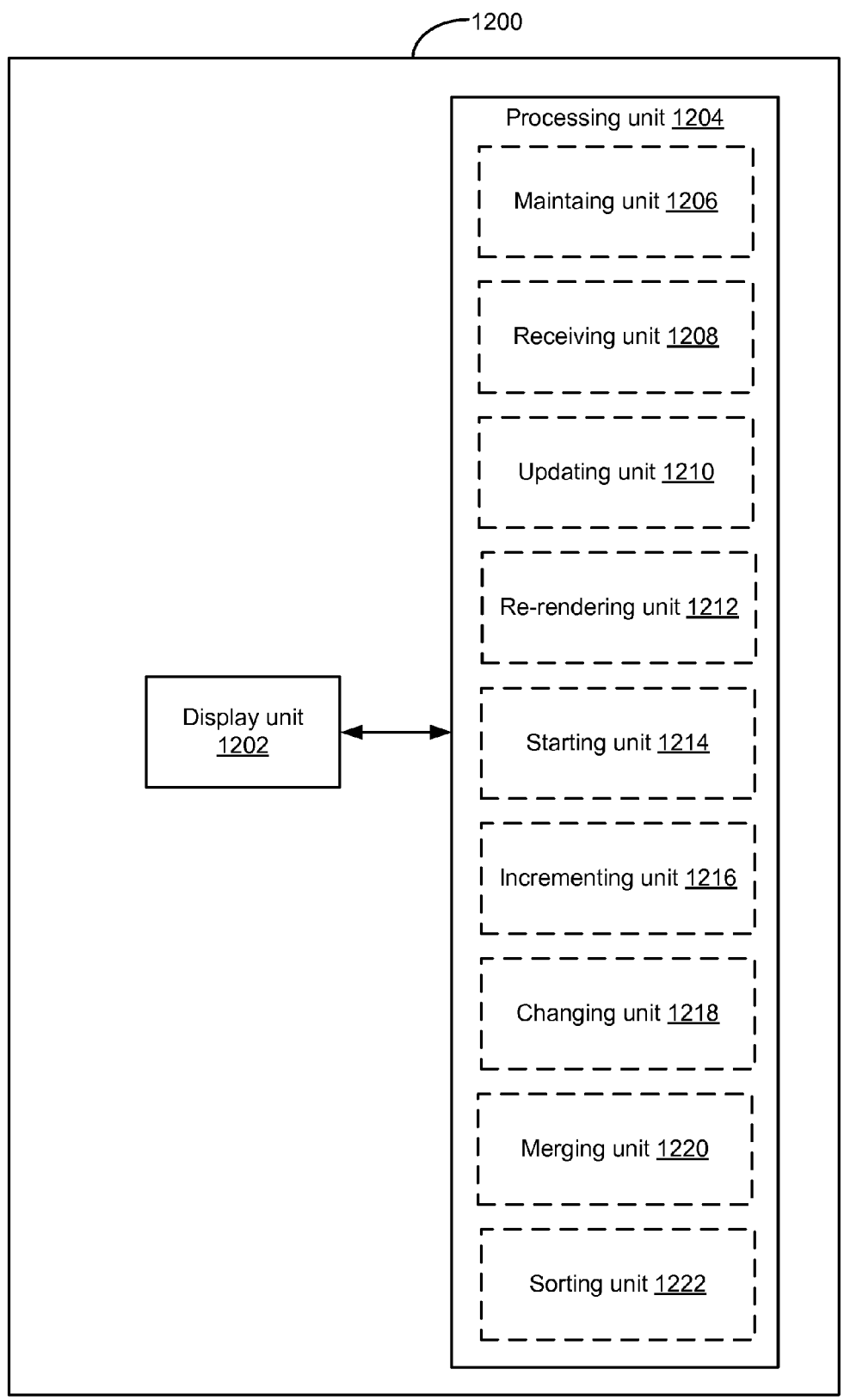

In accordance with some embodiments, FIG. 12 shows a functional block diagram of an electronic device 1200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 configured to display a user interface and a processing unit 1204 coupled with the display unit 1202. In some embodiments, the processing unit 1204 includes: a maintaining unit 1206, a receiving unit 1208, an updating unit 1210, a re-rendering unit 1212, a starting unit 1214, an incrementing unit 1216, a changing unit 1218, a merging unit 1220, and a sorting unit 1222.

The processing unit 1204 is configured to: maintain (e.g., with the maintaining unit 1206) a command sequence for a drawing currently rendered at the first electronic device, wherein the command sequence includes a plurality of past drawing commands sorted according to respective sequence numbers of the past drawing commands, and wherein a sequence number of a drawing command is defined by (1) a device identifier for a device at which the drawing command was first received, (2) a primary local sequence number representing a local synchronization epoch during which the drawing command was first received, and (3) a secondary local sequence number representing an order of the drawing command within the local synchronization epoch. The processing unit 1204 is further configured to receive (e.g., with the receiving unit 1208) a plurality of additional drawing commands from two or more devices of multiple collaborating devices, each of the plurality of additional drawing commands having a respective sequence number. The processing unit 1204 is further configured to update (e.g., with the updating unit 1210) the command sequence, including merging and sorting the plurality of additional drawing commands and the plurality of past drawing commands in accordance with an ordering rule based on the respective sequence numbers of the plurality of past drawing commands and the plurality of additional drawing commands, wherein the ordering rule gives more significance to the primary local sequence number than the device identifier, and gives more significance to the device identifier than to the secondary local sequence number when comparing the respective sequence numbers. The processing unit 1204 is further configured to re-render (e.g., with the re-rendering unit 1212) at least a portion of the drawing based on the command sequence after updating the command sequence.

In some embodiments, a last drawing command in the plurality of additional drawing commands was received first at a collaborating device other than the first device, and the processing unit 1204 is further configured to: start (e.g., with the starting unit 1214) a next local synchronization epoch at the first device, comprising: incrementing the primary local sequence number for a subsequent drawing command locally received at the first device; and restarting the secondary local sequence number for the subsequent drawing command locally received at the first device.

In some embodiments, a last drawing command in the plurality of additional drawing commands was received first at the first device, and the processing unit 1204 is further configured to: increment (e.g., with the incrementing unit 1216) the secondary local sequence number for a subsequent drawing command locally received at the first device, while maintaining the primary local sequence number of a current local synchronization epoch for the subsequent drawing command locally received at the first device.

In some embodiments, the plurality of additional drawing commands include an undo command directed to a respective past command in the command sequence, and wherein updating the command sequence by merging and sorting the plurality of additional drawing commands and the plurality of past drawing commands further comprises: merging the undo command with the respective past command in the command sequence by: identifying the corresponding past drawing command in the command sequence; and changing a visibility attribute of the corresponding past drawing command in the command sequence to "invisible", wherein the "invisible" attribute of the corresponding past drawing command causes said drawing command to be skipped during the re-rendering of the drawing.

In some embodiments, the processing unit 1204 is further configured to: after receiving the undo command, receive (e.g., with the receiving unit 1208) a redo command directed to the undo command; and in response receiving the redo command, change (e.g., with the changing unit 1218) the visibility attribute of the corresponding past drawing command in the command sequence to "visible", wherein the "visible" attribute of the corresponding past drawing command causes said drawing command to be rendered in a next re-rendering of the drawing.

In some embodiments, the plurality of additional drawing commands includes an "erase all" command, and wherein merging the "erase all" command with the plurality of past drawing commands in the command sequence further comprises: identifying all past drawing commands in the command sequence that were present at the first device before receipt of the "erase all" command; and changing respective visibility attributes of the identified past drawing commands in the command sequence to "invisible," wherein the respective "invisible" attributes of the identified past drawing commands cause said identified past drawing commands to be skipped during the re-rendering of the drawing.

In some embodiments, the processing unit 1204 is further configured to update (e.g., with the updating unit 1210), for each change in a respective visibility status of a respective drawing command, a timestamp associated with the respective drawing command in accordance with a receipt time of a respective drawing command that triggered the change in the respective visibility status of the respective drawing command.

In some embodiments, merging and sorting the plurality of additional drawing commands and the plurality of past drawing commands in accordance with the respective sequence numbers of the plurality of past drawing commands and the plurality of additional drawing commands further includes: comparing respective timestamps assigned to two or more conflicting drawing commands in the plurality of past drawing commands and the plurality of additional drawing commands; and selecting one of the two or more conflicting drawing commands for inclusion in the updated command sequence in lieu of the two or more conflicting drawing commands, wherein the selected drawing command has a latest timestamp among the respective timestamps assigned to the two or more conflicting drawing commands.

In some embodiments, the plurality of additional drawing commands include an erase command to erase one or more existing pixels in the drawing, and updating the command sequence by merging and sorting the plurality of additional drawing commands and the plurality of past drawing commands further comprises: sorting the erase command against at least a first additional drawing command in the plurality of additional drawing commands based on the ordering rule, wherein the sorting places the erase command after the first additional drawing in the updated command sequence, and wherein re-rendering the drawing further comprises: erasing at least some pixels that would have been drawn in accordance with the first additional drawing command.

Figure 13:
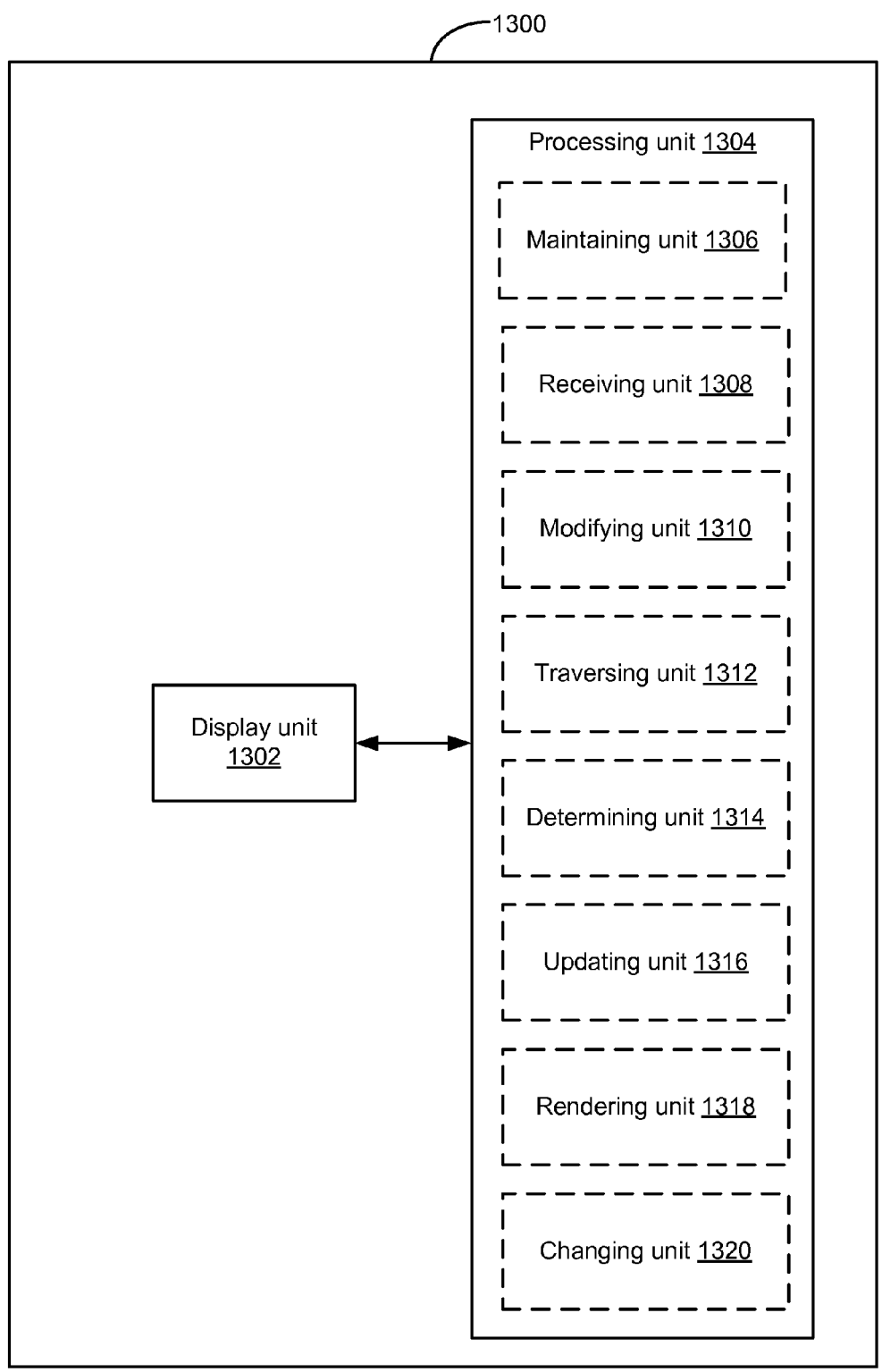

In accordance with some embodiments, FIG. 13 shows a functional block diagram of an electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a user interface and a processing unit 1304 coupled with the display unit 1302. In some embodiments, the processing unit 1304 includes: a maintaining unit 1306, a receiving unit 1308, a modifying unit 1310, a traversing unit 1312, a determining unit 1314, an updating unit 1316, a rendering unit 1318, and a changing unit 1320.

The processing unit 1304 is configured to maintain (e.g., with the maintaining unit 1306) a directed acyclic graph to represent content collaboratively edited by the first device and one or more second devices of the multiple collaborating devices. The directed acyclic graph includes a plurality of nodes each representing a respective content object that is created or edited by one or more of multiple collaborating devices. Each node is connected to at least one neighboring node by a respective directed edge in accordance with a relative positional order of the respective content objects represented by the node and the at least one neighboring node. At least a first node of the plurality of nodes represents a textual content object and at least a second node of the plurality of nodes represents a sketch content object. Each node representing a corresponding sketch content object is associated with a respective command sequence used to create internal content of the corresponding sketch content object. The processing unit 1304 is further configured to, during a respective synchronization period, receive (e.g., with the receiving unit 1308) one or more editing inputs from one or more devices of the multiple collaborating devices. The processing unit 1304 is further configured to modify (e.g., with the modifying unit 1310) the directed acyclic graph based on relationships between the editing inputs and existing content objects embodied in the directed acyclic graph. The processing unit 1304 is further configured to traverse (e.g., with the traversing unit 1312) the directed acyclic graph in accordance with a predetermined ordering rule to obtain an object sequence. The processing unit 1304 is further configured to determine (e.g., with the determining unit 1314) whether the one or more editing inputs modifies an existing sketch content object represented in the directed acyclic graph. The processing unit 1304 is further configured to, in accordance with a determination that a first editing input of the one or more editing inputs modifies a first existing sketch content object represented in the directed acyclic graph, update (e.g., with the updating unit 1316) a command sequence associated with the first existing sketch content object by merging each individual drawing command included the first editing input with the command sequence associated with the first existing sketch content object.

In some embodiments, the processing unit 1304 is further configured to render (e.g., with the rendering unit 1318) the first existing sketch content object represented in the modified directed acyclic graph, the rendering comprising: determining a global position or state of the first existing sketch content object in the content in accordance with a topological traversal of the directed acyclic graph; determining an internal appearance of the first existing sketch content object in accordance with the updated command sequence associated with the first existing sketch content object; and rendering the first existing sketch content in accordance with the determined global position or state of the first existing sketch content object and in accordance with the determined internal appearance of the first existing sketch content object.

In some embodiments, the directed acyclic graph includes multiple parallel paths each including at least one node that represents a respective one of multiple concurrent editing inputs received from distinct devices of the multiple collaborating devices.

In some embodiments, each node in the directed acyclic graph includes a unique object sequence number for the respective content object associated with the node, and the unique object sequence number includes (1) a unique device identifier for a respective device at which the respective content object was first created, and (2) a local sequence number assigned to the respective content object in accordance with a local order by which the respective content object was first created at said respective device.

In some embodiments, for each node representing a sketch content object, the node is associated with a sequence of one or more drawing commands directed to the sketch content object, each of the one or more drawing commands has a respective command sequence number, and the respective command sequence number includes (1) a device identifier for a device at which the drawing command was first received, (2) a primary local sequence number representing a local synchronization epoch during which the drawing command was first received, and (3) a secondary local sequence number representing an order of the drawing command within the local synchronization epoch.

In some embodiments, modifying the directed acyclic graph based on relationships between the editing inputs and existing content objects embodied in the directed acyclic graph further comprises: detecting that the one or more editing inputs include at least two concurrent insertion inputs between a first node and a second node in the directed acyclic graph from multiple ones of the multiple collaborating devices, and for each of the concurrent insertion inputs, creating a respective path from the first node to the second node in the directed acyclic graph to include one or more nodes represented in the insertion input.

In some embodiments, modifying the directed acyclic graph based on relationships between the editing inputs and existing content objects embodied in the directed graph further comprises: detecting that the one or more editing inputs include a deletion input deleting a content object represented by a respective node in the directed acyclic graph; and in response to the deletion input, changing a status of the respective node for the object to "deleted", wherein the respective node having the "deleted" status is omitted during display rendering of the content based on the modified directed acyclic graph.

In some embodiments, modifying the directed acyclic graph based on relationships between the editing inputs and existing content objects embodied in the directed acyclic graph further comprises: detecting that the one or more editing inputs include an undo input restoring a deleted content object represented by a respective node in the directed acyclic graph, wherein a status of the respective node is a "deleted" status; and in response to the undo input, removing the "deleted" status from the respective node for the deleted content object in the directed acyclic graph; and updating a unique object sequence number of the respective node for the deleted content object in the directed acyclic graph based on a respective timestamp and a respective source device associated with the undo input.

In some embodiments, modifying the directed acyclic graph based on relationships between the editing inputs and existing content objects embodied in the directed acyclic graph further comprises: detecting that the one or more editing inputs include a style input changing a style of a content object represented by a respective node in the directed acyclic graph; and in response to the style input, changing a style attribute of the respective node for the content object in the directed acyclic graph, the style attribute includes a respective style and a respective timestamp associated with the style input.

In some embodiments, modifying the directed acyclic graph based on relationships between the editing inputs and existing content objects embodied in the directed acyclic graph further comprises: detecting that the one or more editing inputs include at least two concurrent style inputs changing a style of a content object represented by a respective node in the directed acyclic graph, wherein the concurrent style inputs are associated with difference devices and timestamps; and in response to receiving the concurrent style inputs, changing a style attribute of the respective node for said content object in the directed acyclic graph in accordance with the style input having the latest timestamp among the concurrent style inputs.

In some embodiments, the processing unit 1304 is further configured to: topologically traverse (e.g., with the traversing unit 1312) the directed acyclic graph in accordance with a predetermined ordering rule to deterministically sort the plurality of nodes in the directed acyclic graph into an object sequence; and render (e.g., with the rendering unit 1314) the content in accordance with the deterministically obtained object sequence for display at the first device.

In some embodiments, topologically traversing the directed acyclic graph in accordance with the predetermined ordering rule to deterministically sort the plurality of nodes in the directed acyclic graph into the object sequence further includes: sorting nodes between a starting node to an end node of a set of multiple parallel paths by traversing the set of multiple parallel paths in an order based on a comparison between respective lowest object sequence numbers present in each of the set of multiple parallel paths.

In some embodiments, the predetermined ordering rule specifies a fixed order between the unique device numbers of the multiple collaborating devices, and affords a higher significance to the unique device numbers than the local sequence numbers when comparing unique object sequence numbers.

In some embodiments, in accordance with a determination that a first editing input of the one or more editing inputs modifies the first existing sketch content object represented in the directed acyclic graph, updating the command sequence associated with the first existing sketch content object by merging each individual drawing command included the first editing input with the command sequence associated with the first existing sketch content object further comprises: merging and sorting each individual drawing command and one or more past drawing commands in the command sequence in accordance with an ordering rule based on respective command sequence numbers of the one or more past drawing commands and said each individual drawing command, wherein the ordering rule gives more significance to the primary local sequence number than the device identifier, and gives more significance to the device identifier than to the secondary local sequence number when comparing command sequence numbers.

In some embodiments, in accordance with a determination that a first editing input of the one or more editing inputs modifies the first existing sketch content object represented in the directed acyclic graph, updating the command sequence associated with the first existing sketch content object by merging each individual drawing command included the first editing input with the command sequence associated with the first existing sketch content object further comprises: detecting that the first editing input is an undo command directed to a respective past drawing command in the command sequence; and changing a visibility attribute of the respective past drawing command in the command sequence to "invisible," wherein the "invisible" attribute of the respective past drawing command causes said past drawing command to be skipped during a re-rendering of the existing first sketch content object at the first device.

In some embodiments, processing unit 1304 is further configured to receive (e.g., with the receiving unit 1308) a redo command directed to the undo command in a later synchronization period; and, in response receiving the redo command, processing unit 1304 is further configured to change (e.g., with the changing unit 1320) the visibility attribute of the respective past drawing command in the command sequence to "visible," wherein the "visible" attribute of the respective past drawing command causes said past drawing command to be rendered in a next re-rendering of the existing first sketch object associated with the later synchronization period.

In some embodiments, in accordance with a determination that a first editing input of the one or more editing inputs modifies the first existing sketch content object represented in the directed acyclic graph, updating the command sequence associated with the first existing sketch content object by merging each individual drawing command included the first editing input with the command sequence associated with the first existing sketch content object further comprises: detecting that the first editing input is an "erase all" command; identifying all past drawing commands in the command sequence that were present at the first device before receipt of the "erase all" command; and changing respective visibility attributes of the identified past drawing commands in the command sequence to "invisible," wherein the respective "invisible" attributes of the identified past drawing commands cause said identified past drawing commands to be skipped during a re-rendering of the first existing sketch content object.

In some embodiments, in accordance with a determination that a first editing input of the one or more editing inputs modifies the first existing sketch content object represented in the directed acyclic graph, updating the command sequence associated with the first existing sketch content object by merging each individual drawing command included the first editing input with the command sequence associated with the first existing sketch content object further comprises: detecting that the first editing input is an erase command to erase one or more existing pixels in the first existing sketch content object; and sorting the erase command against at least a first additional drawing command in the editing inputs based on the ordering rule, wherein the sorting places the erase command after the first additional drawing in the updated command sequence, and wherein re-rendering the first existing sketch content object includes erasing at least some pixels that would have been drawn in accordance with the first additional drawing command.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8D, 9A-9C, and 10A-10F are, optionally, implemented by components depicted in FIGS. 1A-1B or FIG. 3. For example, receiving one or more editing inputs operation 1004 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method of supporting collaborative editing, including:
at a first device of multiple collaborating devices, wherein the first device comprises one or more processors, memory, and a display, and the first device includes one or more user-interface devices for receiving editing inputs from a user of the first device:
maintaining a directed acyclic graph to represent content collaboratively edited by the first device and one or more second devices of the multiple collaborating devices, wherein the directed acyclic graph includes a plurality of nodes each representing a respective content object that is created or edited by one or more of the multiple collaborating devices, wherein at least a first node of the plurality of nodes represents a textual content object and at least a second node of the plurality of nodes represents a sketch content object, and wherein each node representing a corresponding sketch content object includes a respective command sequence used to create content of the corresponding sketch content object;
during a respective synchronization period, receiving one or more editing inputs from one or more devices of the multiple collaborating devices;
modifying the directed acyclic graph based on relationships between the editing inputs and existing content objects embodied in the directed acyclic graph;
determining whether the one or more editing inputs modifies an existing sketch content object represented in the directed acyclic graph; and
in accordance with a determination that a first editing input of the one or more editing inputs modifies a first existing sketch content object represented by a first command sequence in a first respective node in the directed acyclic graph, updating the first command sequence in the first respective node by merging each individual drawing command included in the first editing input with the first command sequence to produce, in the first respective node, an updated first command sequence of two or more commands that represents the first existing sketch content object as modified by the first editing input.

2. The method of claim 1, further comprising:
rendering the first existing sketch content object represented in the modified directed acyclic graph, the rendering comprising:
determining a global position or state of the first existing sketch content object in the content in accordance with a topological traversal of the directed acyclic graph;
determining an internal appearance of the first existing sketch content object in accordance with the updated first command sequence in the first respective node; and
rendering the first existing sketch content in accordance with the determined global position or state of the first existing sketch content object and in accordance with the determined internal appearance of the first existing sketch content object.

3. The method of claim 1, wherein the directed acyclic graph includes multiple parallel paths each including at least one node that represents a respective one of multiple concurrent editing inputs received from distinct devices of the multiple collaborating devices.

4. The method of claim 1, wherein each node in the directed acyclic graph includes a unique object sequence number for the respective content object associated with the node, and wherein the unique object sequence number includes (1) a unique device identifier for a respective device at which the respective content object was first created, and (2) a local sequence number assigned to the respective content object in accordance with a local order by which the respective content object was first created at said respective device.

5. The method of claim 1, including traversing the directed acyclic graph in accordance with a predetermined ordering rule to obtain an object sequence, said traversing including:
sorting nodes between a starting node to an end node of a set of multiple parallel paths in the directed acyclic graph by traversing the set of multiple parallel paths in an order based on a comparison between respective lowest object sequence numbers present in each of the set of multiple parallel paths.

6. The method of claim 1, wherein, for each node representing a sketch content object, the node includes a sequence of one or more drawing commands directed to the sketch content object, each of the one or more drawing commands has a respective command sequence number, and the respective command sequence number includes (1) a device identifier for a device at which the drawing command was first received, (2) a primary local sequence number representing a local synchronization epoch during which the drawing command was first received, and (3) a secondary local sequence number representing an order of the drawing command within the local synchronization epoch.

7. The method of claim 6, wherein updating the first command sequence in the first respective node comprises:
merging and sorting each individual drawing command and one or more past drawing commands in the first command sequence in accordance with an ordering rule based on respective command sequence numbers of the one or more past drawing commands and said each individual drawing command, wherein the ordering rule gives more significance to the primary local sequence number than the device identifier, and gives more significance to the device identifier than to the secondary local sequence number when comparing command sequence numbers.

8. The method of claim 1, wherein modifying the directed acyclic graph based on relationships between the editing inputs and existing content objects embodied in the directed acyclic graph further comprises:
detecting that the one or more editing inputs include at least two concurrent insertion inputs between a first node and a second node in the directed acyclic graph from multiple ones of the multiple collaborating devices, and
for each of the concurrent insertion inputs, creating a respective path from the first node to the second node in the directed acyclic graph to include one or more nodes represented in the insertion input.

9. The method of claim 1, wherein modifying the directed acyclic graph based on relationships between the editing inputs and existing content objects embodied in the directed graph further comprises:
detecting that the one or more editing inputs include a deletion input deleting a content object represented by a second respective node in the directed acyclic graph; and
in response to the deletion input, changing a status of the second respective node for the object to "deleted", wherein the second respective node having the "deleted" status is omitted during display rendering of the content based on the modified directed acyclic graph.

10. The method of claim 1, wherein modifying the directed acyclic graph based on relationships between the editing inputs and existing content objects embodied in the directed acyclic graph further comprises:
detecting that the one or more editing inputs include an undo input restoring a deleted content object represented by a second respective node in the directed acyclic graph, wherein a status of the second respective node is a "deleted" status; and
in response to the undo input,
removing the "deleted" status from the second respective node for the deleted content object in the directed acyclic graph; and
updating a unique object sequence number of the second respective node for the deleted content object in the directed acyclic graph based on a respective timestamp and a respective source device associated with the undo input.

11. The method of claim 1, wherein modifying the directed acyclic graph based on relationships between the editing inputs and existing content objects embodied in the directed acyclic graph further comprises:
detecting that the one or more editing inputs include a style input changing a style of a content object represented by a second respective node in the directed acyclic graph; and
in response to the style input, changing a style attribute of the second respective node for the content object in the directed acyclic graph, wherein the style attribute includes a respective style and a respective timestamp associated with the style input.

12. The method of claim 1, wherein modifying the directed acyclic graph based on relationships between the editing inputs and existing content objects embodied in the directed acyclic graph further comprises:
detecting that the one or more editing inputs include at least two concurrent style inputs changing a style of a content object represented by a second respective node in the directed acyclic graph, wherein the concurrent style inputs are associated with difference devices and timestamps; and
in response to receiving the concurrent style inputs, changing a style attribute of the second respective node for said content object in the directed acyclic graph in accordance with the style input having a latest timestamp among the concurrent style inputs.

13. The method of claim 1, wherein updating the first command sequence in the first respective node comprises:
detecting that the first editing input is an undo command directed to a respective past drawing command in the first command sequence; and
changing a visibility attribute of the respective past drawing command in the first command sequence to "invisible", wherein the "invisible" attribute of the respective past drawing command causes said past drawing command to be skipped during a re-rendering of the first existing sketch content object at the first device.

14. The method of claim 13, further comprising:
receiving a redo command directed to the undo command in a later synchronization period; and
in response receiving the redo command, changing the visibility attribute of the respective past drawing command in the first command sequence to "visible", wherein the "visible" attribute of the respective past drawing command causes said past drawing command to be rendered in a next re-rendering of the first existing sketch object associated with the later synchronization period.

15. A first electronic device, comprising:
a display;
one or more processors;
memory; and
one or more programs, wherein the first electronic device includes one or more user-interface devices for receiving editing inputs from a user of the first electronic device, and the one or more programs are stored in the memory and configured to be executed by the one or more processors, the one or more programs including instructions for:
maintaining a directed acyclic graph to represent content collaboratively edited by the first electronic device and one or more second electronic devices of multiple collaborating devices, wherein the directed acyclic graph includes a plurality of nodes each representing a respective content object that is created or edited by one or more of the multiple collaborating devices, wherein at least a first node of the plurality of nodes represents a textual content object and at least a second node of the plurality of nodes represents a sketch content object, and wherein each node representing a corresponding sketch content object includes a respective command sequence used to create content of the corresponding sketch content object;

during a respective synchronization period, receiving one or more editing inputs from one or more devices of the multiple collaborating devices;

modifying the directed acyclic graph based on relationships between the editing inputs and existing content objects embodied in the directed acyclic graph;

determining whether the one or more editing inputs modifies an existing sketch content object represented in the directed acyclic graph; and in accordance with a determination that a first editing input of the one or more editing inputs modifies a first existing sketch content object represented by a first command sequence in a first respective node in the directed acyclic graph, updating the first command sequence in the first respective node by merging each individual drawing command included in the first editing input with the first command sequence to produce, in the first respective node, an updated first command sequence of two or more commands that represents the first existing sketch content object as modified by the first editing input.

16. The first electronic device of claim 15, wherein the one or more programs further include instructions for:

rendering the first existing sketch content object represented in the modified directed acyclic graph, the rendering comprising:

determining a global position or state of the first existing sketch content object in the content in accordance with a topological traversal of the directed acyclic graph;

determining an internal appearance of the first existing sketch content object in accordance with the updated first command sequence in the first respective node; and rendering the first existing sketch content in accordance with the determined global position or state of the first existing sketch content object and in accordance with the determined internal appearance of the first existing sketch content object.

17. The first electronic device of claim 15, wherein the directed acyclic graph includes multiple parallel paths each including at least one node that represents a respective one of multiple concurrent editing inputs received from distinct devices of the multiple collaborating devices.

18. The first electronic device of claim 15, wherein each node in the directed acyclic graph includes a unique object sequence number for the respective content object associated with the node, and wherein the unique object sequence number includes (1) a unique device identifier for a respective device at which the respective content object was first created, and (2) a local sequence number assigned to the respective content object in accordance with a local order by which the respective content object was first created at said respective device.

19. The first electronic device of claim 15, wherein the one or more programs include instructions for traversing the directed acyclic graph in accordance with a predetermined ordering rule to obtain an object sequence, said traversing including:

sorting nodes between a starting node to an end node of a set of multiple parallel paths in the directed acyclic graph by traversing the set of multiple parallel paths in an order based on a comparison between respective lowest object sequence numbers present in each of the set of multiple parallel paths.

20. The first electronic device of claim 15, wherein, for each node representing a sketch content object, the node includes a sequence of one or more drawing commands directed to the sketch content object, each of the one or more drawing commands has a respective command sequence number, and the respective command sequence number includes (1) a device identifier for a device at which the drawing command was first received, (2) a primary local sequence number representing a local synchronization epoch during which the drawing command was first received, and (3) a secondary local sequence number representing an order of the drawing command within the local synchronization epoch.

21. The first electronic device of claim 20, wherein updating the first command sequence in the first respective node comprises:

merging and sorting each individual drawing command and one or more past drawing commands in the first command sequence in accordance with an ordering rule based on respective command sequence numbers of the one or more past drawing commands and said each individual drawing command, wherein the ordering rule gives more significance to the primary local sequence number than the device identifier, and gives more significance to the device identifier than to the secondary local sequence number when comparing command sequence numbers.

22. A non-transitory computer readable storage medium storing one or more programs, the one or more programs comprising instructions, which when executed by a first electronic device with a display, the first electronic device including one or more user-interface devices for receiving editing inputs from a user of the first electronic device, cause the first electronic device to:

maintain a directed acyclic graph to represent content collaboratively edited by the first electronic device and one or more second electronic devices of multiple collaborating devices, wherein the directed acyclic graph includes a plurality of nodes each representing a respective content object that is created or edited by one or more of the multiple collaborating devices, wherein at least a first node of the plurality of nodes represents a textual content object and at least a second node of the plurality of nodes represents a sketch content object, and wherein each node representing a corresponding sketch content object includes a respective command sequence used to create content of the corresponding sketch content object;

during a respective synchronization period, receive one or more editing inputs from one or more devices of the multiple collaborating devices;

modify the directed acyclic graph based on relationships between the editing inputs and existing content objects embodied in the directed acyclic graph;

determine whether the one or more editing inputs modifies an existing sketch content object represented in the directed acyclic graph; and in accordance with a determination that a first editing input of the one or more editing inputs modifies a first existing sketch content object represented by a first command sequence in a first respective node in the directed acyclic graph, update the first command sequence in the first respective node by merging each individual drawing command included in the first editing input with the first command sequence to produce, in the first respective node, an updated first command sequence of two or more commands that represents the first existing sketch content object as modified by the first editing input.

23. The non-transitory computer readable storage medium of claim 22, wherein the one or more programs further include instructions, which when executed by the first electronic device with a display, cause the first electronic device to:

render the first existing sketch content object represented in the modified directed acyclic graph, the rendering comprising:
determining a global position or state of the first existing sketch content object in the content in accordance with a topological traversal of the directed acyclic graph;
determining an internal appearance of the first existing sketch content object in accordance with the updated first command sequence in the first respective node; and
rendering the first existing sketch content in accordance with the determined global position or state of the first existing sketch content object and in accordance with the determined internal appearance of the first existing sketch content object.

24. The non-transitory computer readable storage medium of claim 22, wherein the directed acyclic graph includes multiple parallel paths each including at least one node that represents a respective one of multiple concurrent editing inputs received from distinct devices of the multiple collaborating devices.

25. The non-transitory computer readable storage medium of claim 22, wherein each node in the directed acyclic graph includes a unique object sequence number for the respective content object associated with the node, and wherein the unique object sequence number includes (1) a unique device identifier for a respective device at which the respective content object was first created, and (2) a local sequence number assigned to the respective content object in accordance with a local order by which the respective content object was first created at said respective device.

26. The non-transitory computer readable storage medium of claim 22, wherein the one or more programs include instructions for traversing the directed acyclic graph in accordance with a predetermined ordering rule to obtain an object sequence, said traversing including:

sorting nodes between a starting node to an end node of a set of multiple parallel paths in the directed acyclic graph by traversing the set of multiple parallel paths in an order based on a comparison between respective lowest object sequence numbers present in each of the set of multiple parallel paths.

27. The non-transitory computer readable storage medium of claim 22, wherein, for each node representing a sketch content object, the node includes a sequence of one or more drawing commands directed to the sketch content object, each of the one or more drawing commands has a respective command sequence number, and the respective command sequence number includes (1) a device identifier for a device at which the drawing command was first received, (2) a primary local sequence number representing a local synchronization epoch during which the drawing command was first received, and (3) a secondary local sequence number representing an order of the drawing command within the local synchronization epoch.

28. The non-transitory computer readable storage medium of claim 27, wherein updating the first command sequence in the first respective node comprises:

merging and sorting each individual drawing command and one or more past drawing commands in the first command sequence in accordance with an ordering rule based on respective command sequence numbers of the one or more past drawing commands and said each individual drawing command, wherein the ordering rule gives more significance to the primary local sequence number than the device identifier, and gives more significance to the device identifier than to the secondary local sequence number when comparing command sequence numbers.

* * * * *